US010522140B2

(12) United States Patent
Kawano et al.

(10) Patent No.: US 10,522,140 B2
(45) Date of Patent: Dec. 31, 2019

(54) INFORMATION PROCESSING SYSTEM AND INFORMATION PROCESSING METHOD

(71) Applicant: SONY CORPORATION, Tokyo (JP)

(72) Inventors: Shinichi Kawano, Tokyo (JP); Yuhei Taki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/548,977

(22) PCT Filed: Nov. 11, 2015

(86) PCT No.: PCT/JP2015/081751
§ 371 (c)(1),
(2) Date: Aug. 4, 2017

(87) PCT Pub. No.: WO2016/136044
PCT Pub. Date: Sep. 1, 2016

(65) Prior Publication Data
US 2018/0033430 A1 Feb. 1, 2018

(30) Foreign Application Priority Data

Feb. 23, 2015 (JP) ................. 2015-033059
Mar. 23, 2015 (JP) ................. 2015-059566

(51) Int. Cl.
G10L 15/20 (2006.01)
G10L 15/22 (2006.01)
G10L 15/28 (2013.01)
G10L 25/84 (2013.01)

(52) U.S. Cl.
CPC .............. G10L 15/22 (2013.01); G10L 15/28 (2013.01); G10L 25/84 (2013.01); G10L 15/20 (2013.01)

(58) Field of Classification Search
CPC combination set(s) only.
See application file for complete search history.

(56) References Cited

U.S. PATENT DOCUMENTS

| 4,558,459 A | * | 12/1985 | Noso | ................. B60R 16/0373 381/57 |
| 9,445,209 B2 | * | 9/2016 | Dadu | ..................... G06F 3/167 |
| 9,940,949 B1 | * | 4/2018 | Vitaladevuni | .......... G10L 25/78 |
| 2013/0085757 A1 | * | 4/2013 | Nakamura | ............. G10L 15/22 704/254 |

(Continued)

FOREIGN PATENT DOCUMENTS

| JP | 6-35497 A | 2/1994 |
| JP | 2003-177789 A | 6/2003 |
| WO | 2007/077703 A1 | 7/2007 |

OTHER PUBLICATIONS

International Search Report and Written Opinion of PCT Application No. PCT/JP2015/081751, dated Dec. 22, 2015, 01 pages of English Translation and 06 pages of ISRWO.

Primary Examiner — Abul K Azad
(74) Attorney, Agent, or Firm — Chip Law Group

(57) ABSTRACT

An information processing system includes an output controller that causes an output portion to output a start condition for speech recognition processing to be performed by a speech recognition portion on sound information input from a sound collecting portion, in which the output controller dynamically changes the start condition for the speech recognition processing to be output from the output portion.

16 Claims, 51 Drawing Sheets

(56) References Cited

U.S. PATENT DOCUMENTS

| | | | | |
|---|---|---|---|---|
| 2014/0249812 A1* | 9/2014 | Bou-Ghazale | ............ | G10L 25/84 704/233 |
| 2014/0257821 A1* | 9/2014 | Adams | ..................... | G10L 25/93 704/275 |
| 2014/0365225 A1* | 12/2014 | Haiut | ...................... | G10L 15/22 704/275 |
| 2015/0039305 A1* | 2/2015 | Huang | ..................... | G10L 15/20 704/233 |
| 2015/0039310 A1* | 2/2015 | Clark | ..................... | G10L 15/063 704/244 |
| 2015/0112689 A1* | 4/2015 | Nandy | .................. | G10L 19/002 704/270 |

* cited by examiner

FIG. 22
| FILLER | SPEECH WAVEFORM |
|---|---|
| oh |  |
| Uh |  |
| well |  |
| you know | 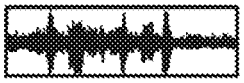 |

INFORMATION PROCESSING SYSTEM AND INFORMATION PROCESSING METHOD

CROSS REFERENCE TO RELATED APPLICATIONS

This application is a U.S. National Phase of International Patent Application No. PCT/JP2015/081751 filed on Nov. 11, 2015, which claims priority benefit of Japanese Patent Application No. JP 2015-033059 filed in the Japan Patent Office on Feb. 23, 2015 and JP 2015-059566 filed in the Japan Patent Office on Mar. 23, 2015. Each of the above-referenced applications is hereby incorporated herein by reference in its entirety.

TECHNICAL FIELD

The present disclosure relates to an information processing system and an information processing method.

BACKGROUND ART

In recent years, a technology of obtaining results of speech recognition processing by performing speech recognition processing on sound information collected by a microphone has become known. The results of the speech recognition processing are output in various forms in which a user can perceive the results. For example, speech recognition processing on sound information collected by a microphone can be triggered by an input of a start operation from the user (see Patent Literature 1, for example).

CITATION LIST

Patent Literature

Patent Literature 1: JP 2004-094077A

DISCLOSURE OF INVENTION

Technical Problem

Here, if conditions under which the speech recognition processing performed on the sound information collected by the microphone is started are invariable, it is difficult to flexibly start the speech recognition processing in accordance with a situation. Thus, it is desirable to provide a technology capable of flexibly starting the speech recognition processing in accordance with a situation.

Solution to Problem

According to the present disclosure, there is provided an information processing system including: an output controller that causes an output portion to output a start condition for speech recognition processing to be performed by a speech recognition portion on sound information input from a sound collecting portion, in which the output controller dynamically changes the start condition for the speech recognition processing to be output from the output portion.

According to the present disclosure, there is provided an information processing method including: causing an output portion to output a start condition for speech recognition processing performed by a speech recognition portion on sound information input from a sound collecting portion; and dynamically changing, by a processor, the start condition for the speech recognition processing to be output from the output portion.

Advantageous Effects of Invention

According to the present disclosure, a technology capable of flexibly starting speech recognition processing in accordance with a situation is provided. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 22 is a diagram showing an example of correspondence between a filler and a speech waveform thereof.

MODE(S) FOR CARRYING OUT THE INVENTION

Figure 1:
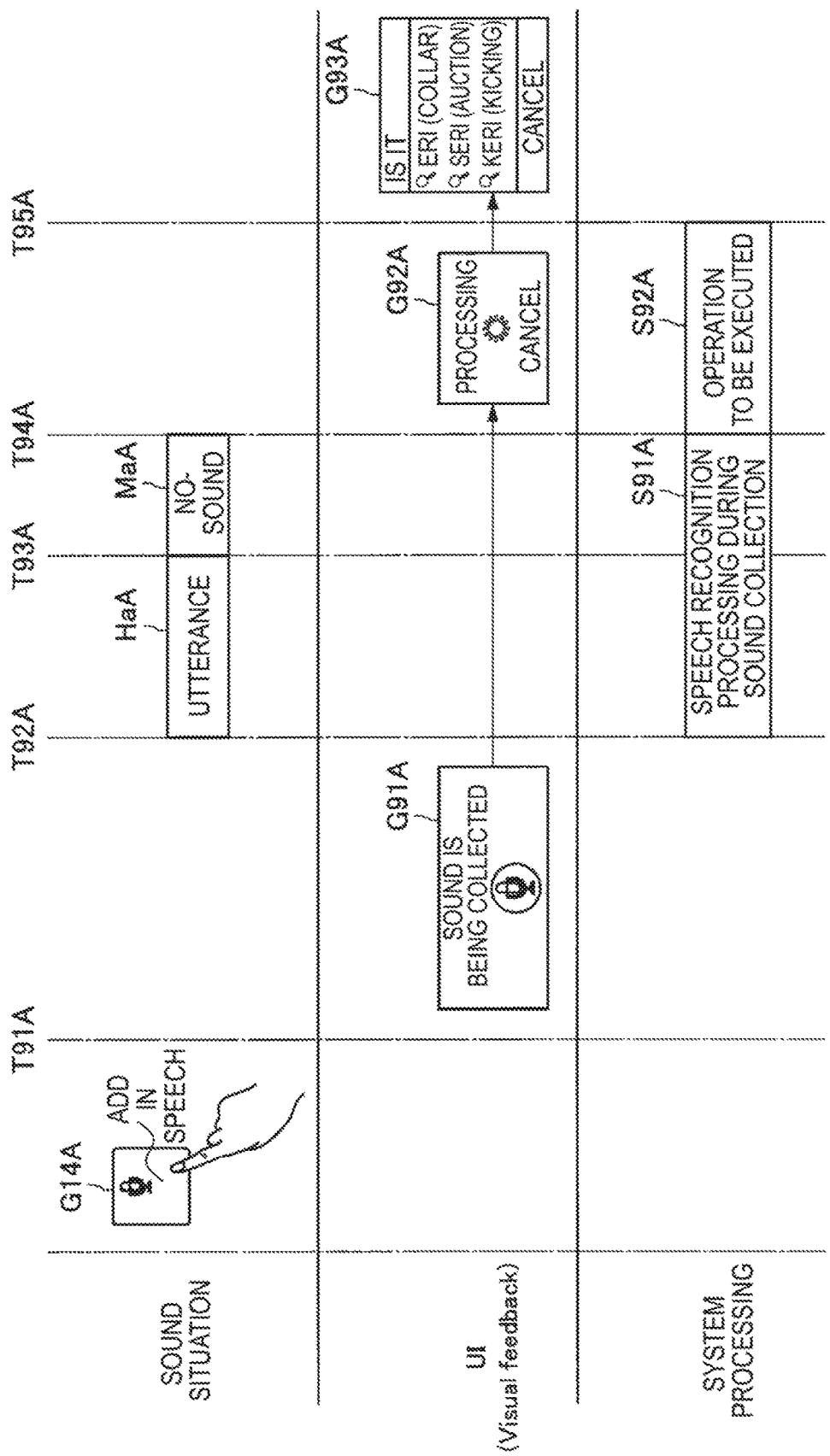
FIG. 1 is a diagram illustrating speech recognition processing in a typical system.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that, in this description and the drawings, structural elements that have substantially the same function and structure are sometimes distinguished from each other using different alphabets after the same reference sign. However, when there is no need in particular to distinguish structural elements that have substantially the same function and structure, the same reference sign alone is attached.

Description will be given in the following order.
0. Background
1. Embodiment of the present disclosure
1.1 System configuration example
1.2 Functional configuration example
1.3 Functional details of information processing system
1.4 Modification example of system configuration
1.5 Hardware configuration example
2. Conclusion

0. BACKGROUND

First, a background of an embodiment of the present disclosure will be described with reference to the drawings. FIG. 1 is a diagram illustrating speech recognition processing in a typical system. In the following description, voice or speech and sound will be used in a manner of being distinguished from each other. Also, utterance indicates a state in which a user utters speech while no-sound indicates a state in which sound information with volume below a threshold value is collected.

As illustrated in FIG. 1, if an operation of selecting a speech recognition start operation object G14A for starting speech recognition processing is input from the user, a typical system (hereinafter, also simply referred to as a "system") detects such an operation as an activation trigger of the speech recognition processing and displays a sound collection start screen G91A (time T91A). If the sound collection start screen G91A is displayed, the user starts utterance (time T92A), and the system performs the speech recognition processing on collected sound information while collecting sound by a microphone (S91A).

If an utterance section HaA is completed (time T93A), a no-sound state starts. Then, if a section (hereinafter, also referred to as a "no-sound section") MaA of duration time, in which the volume of the sound information collected by the microphone is continuously below reference volume, reaching predetermined target time is detected (time T94A), the system executes a predetermined operation to be executed on the basis of a result of the speech recognition processing performed on the sound information collected in the utterance section HaA (S92A).

Here, the operation to be executed on the basis of the result of the speech recognition processing is not particularly limited. For example, the operation to be executed on the basis of the speech recognition processing may include any one of an operation of outputting a search result in accordance with a character string which is the result of the speech recognition processing, an operation of outputting the character string which is the result of the speech recognition processing, an operation of outputting processing result candidates obtained in the process of the speech recognition processing, and an operation of outputting a character string for responding to the content of utterance extracted from the character string which is the result of the speech recognition processing.

Here, a method of extracting the content of utterance from the character string which is the result of the speech recognition processing is not limited. For example, the content of the utterance may be extracted by performing natural language processing (for example, language analysis or semantic analysis) on the character string which is the result of the speech recognition processing, as the method of extracting the content of the utterance from the character string which is the result of the speech recognition processing.

The system displays a screen G92A indicating that the processing of the operation to be executed is being performed during the processing of the operation to be executed. If the operation to be executed is completed (time T95A), the system displays a screen G93A indicating a result of the operation to be executed. In the example illustrated in FIG. 1, "eri (collar)", "seri (auction)" and "keri (kicking)" are included as search results in accordance with the character string which is the result of the speech recognition processing in the screen G93A indicating the result of the operation to be executed.

As described above, the speech recognition processing is started before a start condition for the speech recognition processing is output in the typical system. Therefore, if a user who considers the content of utterance after performing an operation of selecting the speech recognition start operation object G14A is present, sound information collected before the start of the utterance is also regarded as a target of the speech recognition processing, and there is a possibility that the sound information may affect the speech recognition processing.

For example, a filler, unnecessary utterance, or the like uttered by the user themselves may be present in the sound information collected before the start of the utterance. A filler means a word inserted between utterance and utterance by the user, such as a word like "uh", "you know", or "well". Also, noise and the like may be present in the sound information collected before the start of the utterance. As described above, noise may mean sound information corresponding to a part obtained by excluding speech uttered by the user from sound information input from a sound collecting portion 120A.

There may also be a case where the result of the speech recognition processing performed on the sound information collected before the start of the utterance affects speech recognition processing performed on sound information collected after the start of the utterance. If the speech recognition processing is performed on the basis of the sound information collected before the start of the utterance and a no-sound section is detected before the start of the utterance, there is also a possibility that the operation to be executed on the basis of the result of the speech recognition processing may start before the start of the utterance.

Thus, a technology of outputting the start condition for the speech recognition processing before the start of the speech recognition processing will be proposed in this specification. Also, it is difficult to flexibly start the speech recognition processing in accordance with a situation if a certain start condition is output irrespective of the situation. Thus, a technology capable of flexibly starting the speech recognition processing in accordance with the situation will be proposed in this specification.

The background of the embodiment of the present disclosure has been described hitherto.

1. EMBODIMENT OF PRESENT DISCLOSURE

[1.1. System Configuration Example]

Figure 2:
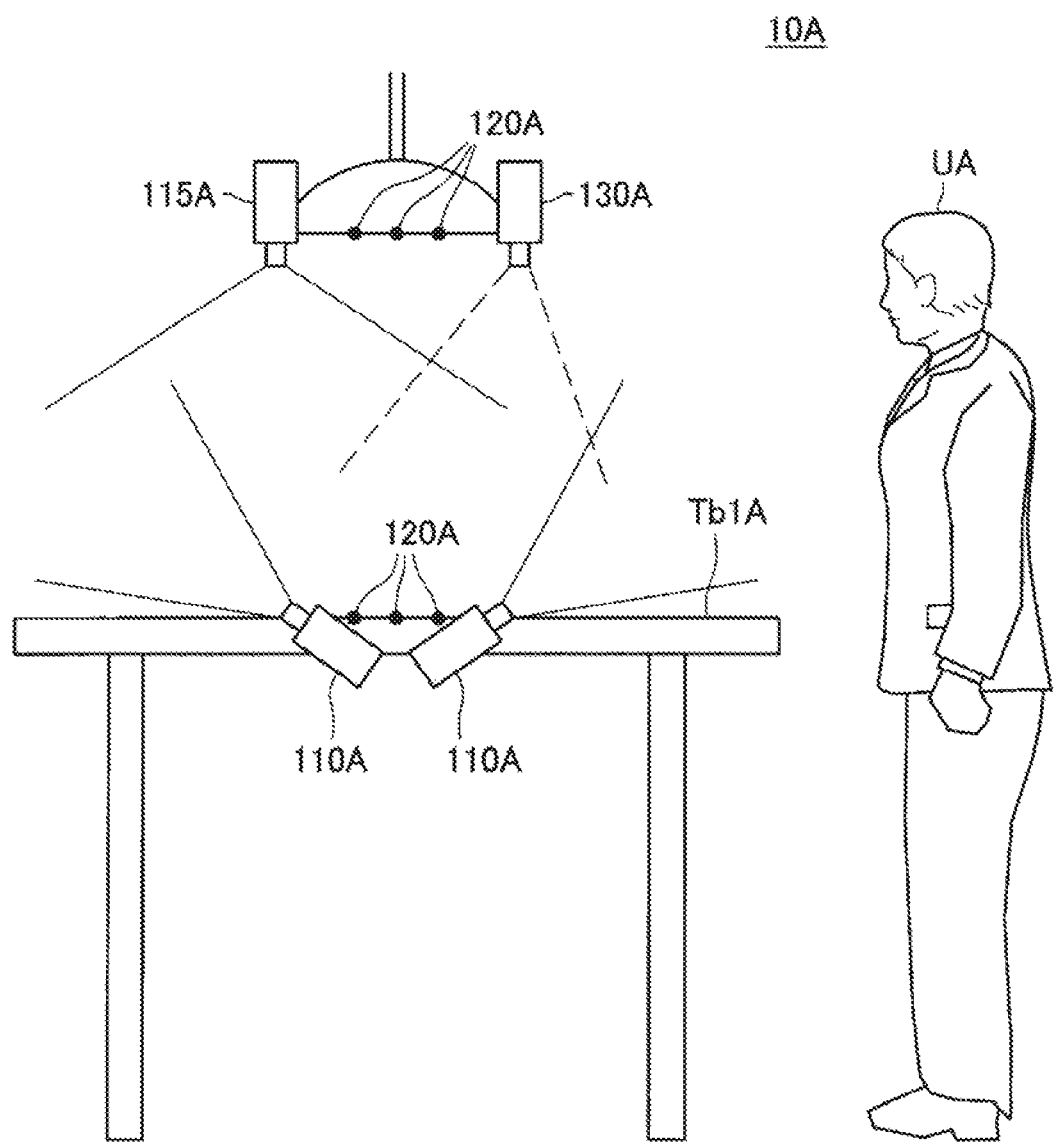
FIG. 2 is a diagram showing a configuration example of an information processing system according to an embodiment of the present disclosure.

Subsequently, a configuration example of an information processing system 10A according to an embodiment of the present disclosure is described with reference to the drawings. FIG. 2 is a diagram illustrating a configuration example of the information processing system 10A according to an embodiment of the present disclosure. As illustrated in FIG. 2, the information processing system 10A according to the embodiment of the present disclosure is configured to include an image input portion 110A, an operation input portion 115A, a sound collecting portion 120A, and an output portion 130A. The information processing system 10A is capable of performing speech recognition processing on the speech uttered by a user UA (hereinafter also simply referred to as "user").

The image input portion 110A has a function of inputting an image. In the example illustrated in FIG. 2, the image input portion 110A includes two cameras embedded in a table TblA. However, the number of cameras included in the image input portion 110A is not limited to the particular number as long as it is one or more. In such a case, the position where each of one or more cameras included in the image input portion 110A is provided is also not limited to a particular position. In addition, one or more cameras may include a monocular camera or a stereo camera.

The operation input portion 115A has a function of inputting an operation of the user UA. In the example illustrated in FIG. 2, the operation input portion 115A includes one camera suspended from the ceiling above the table TblA. However, the position at which the camera included in the operation input portion 115A is provided is not limited to a particular position. In addition, the camera may include a monocular camera or a stereo camera. In addition, the operation input portion 115A may be anything other than a camera as long as it has a function of inputting the operation of the user U, and may be, for example, a touch panel or a hardware button.

The output portion 130A has a function of displaying a screen on the table TblA. In the example illustrated in FIG. 2, the output portion 130A is suspended from the ceiling above the table TblA. However, the position at which the output portion 130A is provided is not limited to a particular position. In addition, the output portion 130A may typically be a projector capable of projecting a screen onto the top surface of the table TblA, but it may be other types of display as long as it has a function of displaying a screen.

Moreover, although the case where the top surface of the table TblA is the display surface of the screen is mainly described herein, the display surface of the screen may be other than the top surface of the table TblA. An example of the display surface of the screen may include a wall, a building, a floor surface, a ground surface, or a ceiling. Alternatively, the display surface of the screen may include a non-plane such as pleat of a curtain or a surface at other place. In addition, in the case where the output portion 130A has its own display surface, the display surface of the screen may be a display surface of the output portion 130A.

The sound collecting portion 120A has a function of collecting sound. In the example illustrated in FIG. 2, the sound collecting portion 120A includes a total of six microphones, that is, three microphones above the table TblA and three microphones present on the upper surface of the table TblA. However, the number of microphones included in the sound collecting portion 120A is not limited to the particular number as long as it is one or more. In such a case, the position where one or more microphones included in the sound collecting portion 120A are provided is also not limited to a particular position.

However, if the sound collecting portion 120A includes a plurality of microphones, an arrival direction of sound can be estimated on the basis of sound information collected by each of the plurality of microphones. If the sound collecting portion 120A includes a microphone with directivity, the arrival direction of sound can be estimated on the basis of sound information collected by the microphone with directivity.

The above description is given as to the configuration example of the information processing system 10A according to an embodiment of the present disclosure.

[1.2. Functional Configuration Example]

Figure 3:
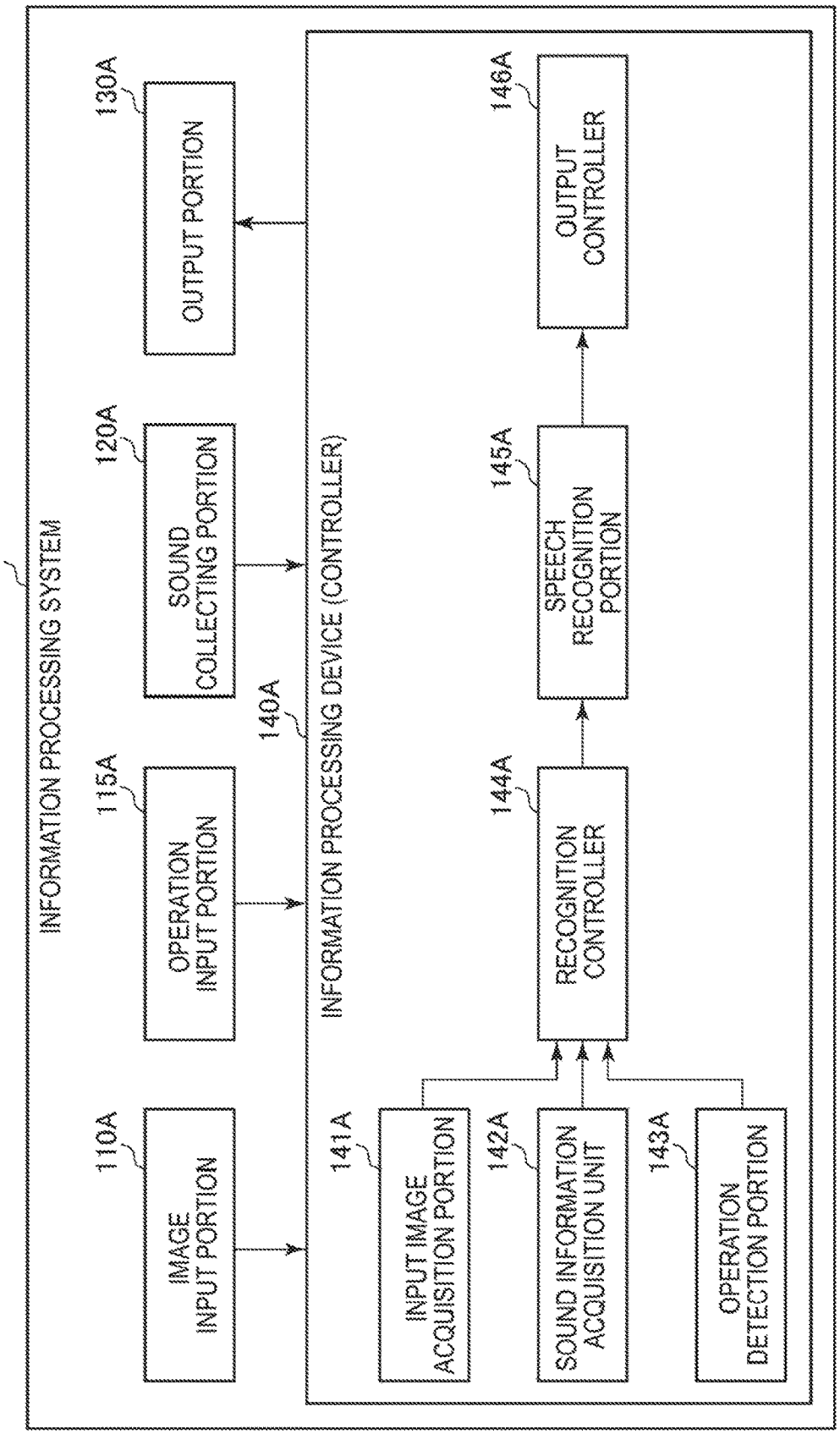
FIG. 3 is a block diagram showing a functional configuration example of the information processing system according to the embodiment of the invention.

Subsequently, a functional configuration example of the information processing system 10A according to an embodiment of the present disclosure is described. FIG. 3 is a block diagram illustrating a functional configuration example of the information processing system 10A according to an embodiment of the present disclosure. As illustrated in FIG. 3, the information processing system 10A according to an embodiment of the present disclosure is configured to include the image input portion 110A, the operation input portion 115A, the sound collecting portion 120A, the output portion 130A, and an information processing device 140A (hereinafter also referred to as "controller 140A").

The information processing device 140A controls each component of the information processing system 10A. In one example, the information processing device 140A generates information to be output from the output portion 130A. In addition, in one example, the information processing device 140A incorporates the information, which is input by each of the image input portion 110A, the operation input portion 115A, and the sound collecting portion 120A, in the information to be output from the output portion 130A. As illustrated in FIG. 3, the information processing device 140A includes an input image acquisition portion 141A, a sound information acquisition portion 142A, an operation detection portion 143A, a recognition controller 144A, a speech recognition portion 145A, and an output controller 146A. These respective functional blocks will be described later in detail.

Moreover, the information processing device 140A may be composed of, for example, a central processing unit (CPU). In the case where the information processing device 140A is composed of a processing device such as CPU, this processing device can be composed of an electronic circuit.

The above description is given as to the functional configuration example of the information processing system 10A according to an embodiment of the present disclosure.

[1.3 Functional Details of Information Processing System]

Figure 4:
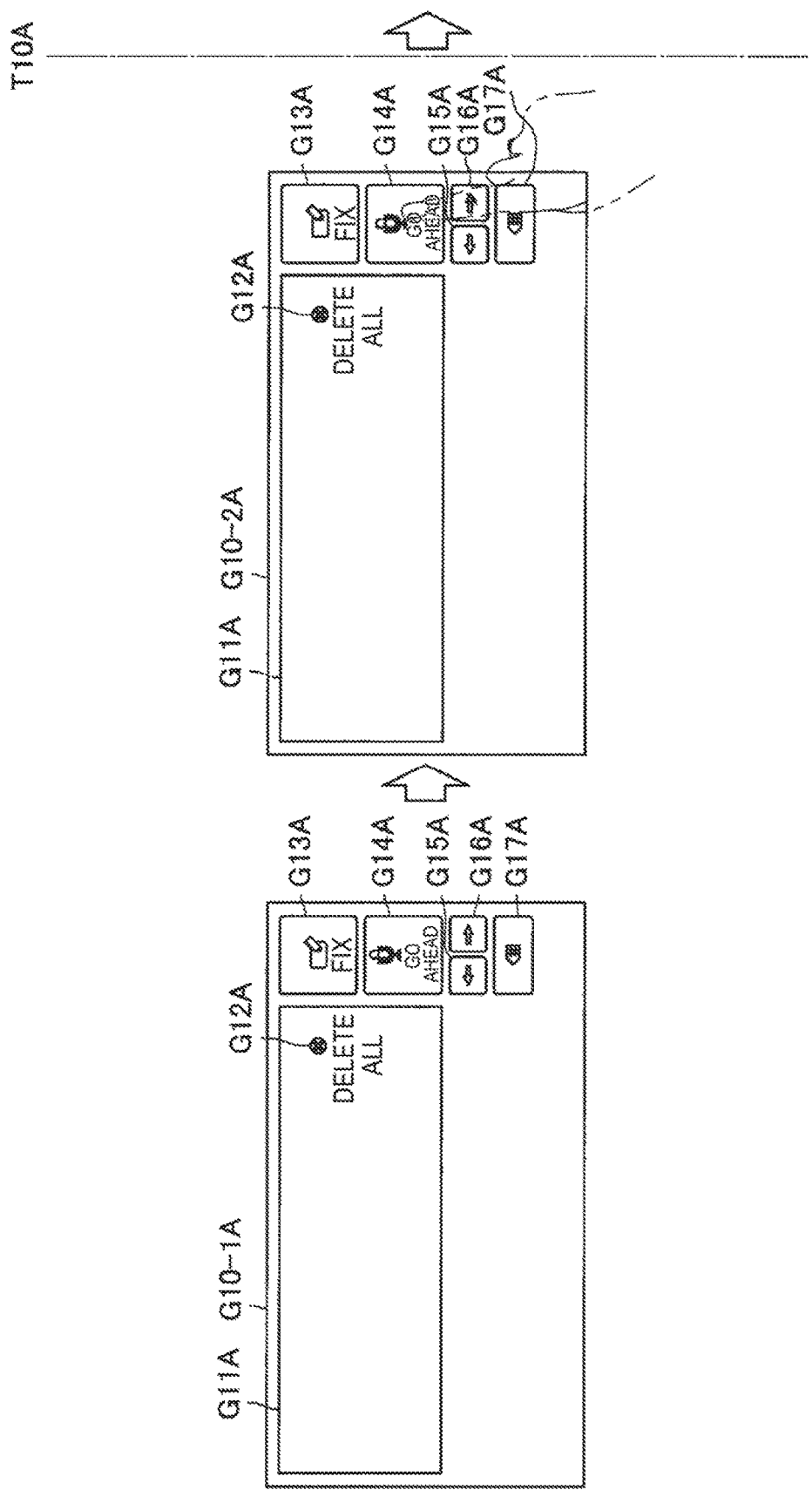
FIG. 4 is a diagram showing an example of a screen transition before an activation trigger of speech recognition processing is detected after an initial screen is displayed.

Next, functional details of the information processing system 10A according to the embodiment of the present disclosure will be described. FIG. 4 is a diagram showing an example of a screen transition before an activation trigger of speech recognition processing is detected after an initial screen is displayed. Referring to FIG. 4, the output controller 146A causes an initial screen G10-1A to be displayed. The initial screen G10-1A include a speech recognition start operation object G14A for starting the speech recognition processing and a recognized character string display section G11A as a display section of a character string acquired by the speech recognition processing (hereinafter, also referred to as a "recognized character string").

Also, the initial screen G10-1A include an all-deletion operation object G12A for deleting the entirety of the recognized character string and a decision operation object G13A for deciding the recognized character string. Also, the initial screen G10-1A includes a forward moving operation object G15A for moving a cursor position at the recognized character string backward, a rearward moving operation object G16A for moving the cursor position at the recognized character string forward, and a deletion operation object G17A for deleting a character or a word at the cursor position.

First, if an operation of selecting the speech recognition start operation object G14A is input from the user to the operation input portion 115A as illustrated in a screen G10-2A, the operation is detected as an activation trigger of the speech recognition processing by the operation detection portion 143A (time T10A). If the activation trigger of the speech recognition processing is detected, the output controller 146A outputs the start condition for the speech recognition processing. Although the operation of selecting the speech recognition start operation object G14A will be exemplified as the activation trigger of the speech recognition processing herein, the activation trigger of the speech recognition processing is not limited to such an example.

For example, the activation trigger of the speech recognition processing may be an operation of pressing a hardware button for activating the speech recognition processing. At this time, the speech recognition processing may be activated between start and release of the pressing of the hardware button (push-to-talk type). Alternatively, the activation trigger of the speech recognition processing may be execution of an activation command (for example, utterance of "speech") of the speech recognition processing.

Alternatively, the activation trigger of the speech recognition processing may be a predetermined activation gesture (for example, swinging-up of hands, swinging-down of hands, or face motion (for example, nodding or an operation of tilting a face in the left-right direction)) of the speech recognition processing. The activation trigger of the speech recognition processing may include acquisition of sound information with likelihood of speech exceeding a threshold value from the sound collecting portion 120A.

First, an example in which remaining time until the speech recognition processing is started is output as a start condition will be described.

Figure 5:
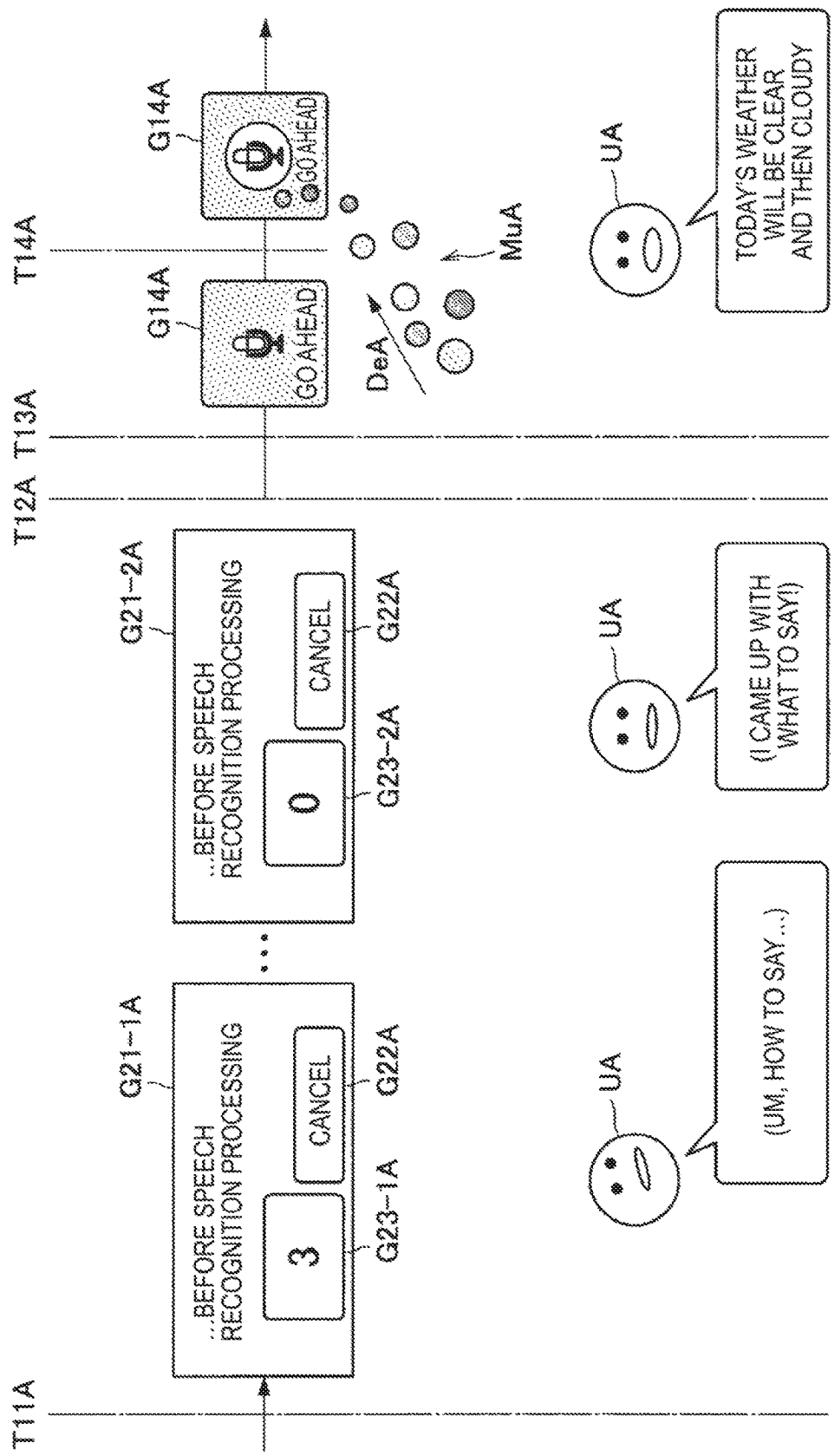
FIG. 5 is a diagram showing an example of a screen transition before the speech recognition processing is started after remaining time until the speech recognition processing is started is output as a start condition.

FIG. 5 is a diagram showing an example of a screen transition before the speech recognition processing is started after the remaining time until the speech recognition processing is started is output as the start condition. If the activation trigger of the speech recognition processing is detected, the output controller 146A starts an output of a remaining time notification screen G21-1A (time T11A). The remaining time notification screen G21-1A includes remaining time G23-1A until the speech recognition processing is started and a cancellation object G22A for stopping the output of the start condition.

Subsequently, the output controller 146A reduces the remaining time G23-1A with the elapse of time. For example, the output controller 146A outputs a remaining time notification screen G21-2A including remaining time G23-2A after being reduced from the remaining time G23-1A. Subsequently, if the remaining time until the speech recognition processing is started becomes zero and the start condition is satisfied (time T12A), the output controller 146A stops the output of the start condition (time T13A). If the output of the start condition is stopped, the user starts utterance toward the sound collecting portion 120A (time T14A).

If the sound information collected by the sound collecting portion 120A is acquired by the sound information acquisition portion 142A, the output controller 146A causes a predetermined object (hereinafter, also referred to as a "display object") MuA to be displayed during the sound collection. The display object MuA may remain stationary or may have movement. When the display object MuA has movement, for example, a moving direction DeA of the display object MuA may depend on an arrival direction of voice of utterance by the user from a sound source to the sound collecting portion 120A. A method of estimating the arrival direction of the voice of utterance by the user is also not particularly limited.

For example, the recognition controller 144A may estimate one arrival direction that coincides with or is similar to a direction of a finger of the user (a direction from the root to the tip of the finger, for example) who has performed the operation of selecting the speech recognition start operation object G14A as the arrival direction of the voice of utterance by the user. A range of similarity may be determined in advance. The direction of the finger may be acquired by analyzing an input image.

Alternatively, the recognition controller 144A may estimate an arrival direction of sound input by the sound collecting portion 120A as the arrival direction of the voice of utterance by the user. If there are a plurality of arrival directions of sound, an arrival direction of sound initially input from among the plurality of arrival directions may be estimated as the arrival direction of the voice of utterance by the user, or one arrival direction that coincides with or is similar to the direction of the finger of the user who has performed the operation of selecting the speech recognition start operation object G14A from among the plurality of arrival directions may be estimated as the arrival direction of the voice of utterance by the user.

Alternatively, the recognition controller 144A may estimate an arrival direction of sound with the largest volume input by the sound collecting portion 120A from among the plurality of arrival directions as the arrival direction of the voice of utterance by the user. In this manner, the arrival direction of the voice of utterance by the user can be estimated. In contrast, the recognition controller 144A may acquire, as noise, sound input by the sound collecting portion 120A from directions other than the arrival direction of the voice of utterance by the user. Therefore, noise can include sound output from the information processing system 10A.

Further, FIG. 5 illustrates an example in which the output controller 146A moves the display objects MuA in the arrival direction (moving direction DeA) of the voice of utterance by the user. In this manner, the user can intuitively recognize that the voice of utterance by the user themselves is being collected by the sound collecting portion 120A. However, the movement of the display objects MuA is not limited to such movement. FIG. 5 illustrates an example in which the destination of the display objects MuA is the speech recognition start operation object G14A. However, the destination of the display objects MuA is not limited to such an example.

Further, although FIG. 5 illustrates the example in which the output controller 146A causes the circular display objects MuA that have appeared one after another to be moved in accordance with the sound collection performed by the sound collecting portion 120A, the display state of the display objects MuA is not limited to such an example. For example, the output controller 146A may control various parameters of the display objects MuA on the basis of predetermined information (likeliness of speech of the sound information and volume, for example) in accordance with the sound information. The sound information used at this time may be sound information from the arrival direction of the voice of utterance by the user. The parameters of the display objects MuA may include at least any one of the shape, the transparency, the color, the size, and the motion of the display objects MuA.

Note that a method of evaluating the likelihood of speech in the sound information is not particularly limited. For example, it is also possible to employ a method described in a patent literature (JP 2010-38943A) as the method of evaluating the likelihood of speech in the sound information. It is also possible to employ a method described in a patent literature (JP 2007-328228A) as the method of evaluating the likelihood of speech in the sound information. Although an example in which the evaluation of the likelihood of speech is performed by the output controller 146 will be described herein, the evaluation of the likelihood of speech may be performed by a server which is not illustrated in the drawing.

If the start condition is satisfied, the recognition controller 144A causes the speech recognition portion 145A to start the speech recognition processing on the sound information acquired by the sound information acquisition portion 142A. Timing at which the speech recognition processing is started is not limited. For example, the recognition controller 144A may cause the speech recognition portion 145A to start the speech recognition processing after sound information with likelihood of speech exceeding a predetermined threshold value is collected, or may cause the speech recognition portion 145A to start the speech recognition processing on sound information corresponding to a display object MuA after the display object MuA reaches the speech recognition start operation object G14A.

The user may select the cancellation object G22A if the user desires to cancel the start of the speech recognition processing. If the user selects the cancellation object G22A, such an operation is input as an output stop operation by the operation input portion 115A, and the output stop operation is detected by the operation detection portion 143A. If the output stop operation is detected by the operation detection portion 143A, the output controller 146A stops the output of the start condition.

An example in which the remaining time until the speech recognition processing is started is output as the start condition has been described hitherto. Next, an example in which information related to a user operation required for starting the speech recognition processing is output as a start condition will be described.

Figure 6:
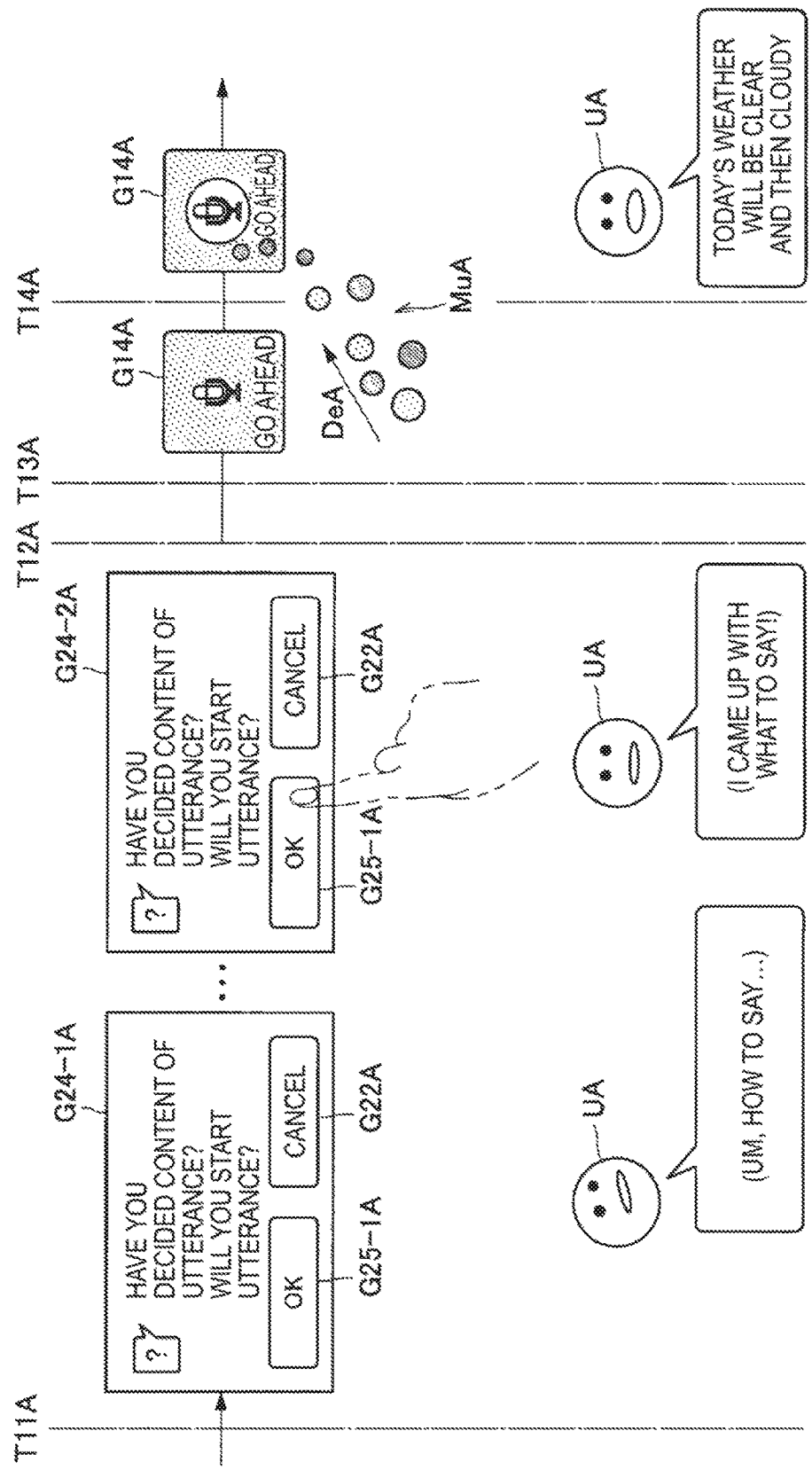
FIG. 6 is a diagram showing an example of a screen transition before the speech recognition processing is started after information related to a user operation required for starting the speech recognition processing is output as the start condition.

FIG. 6 is a diagram showing an example of a screen transition before the speech recognition processing is started after information related to a user operation required for starting the speech recognition processing is output as the start condition. If the activation trigger of the speech recognition processing is detected, the output controller 146A starts an output of an utterance start confirmation screen G24-1A (time T11A). The utterance start confirmation screen G24-1A includes a speech recognition processing start object G25-1A as the information related to the user operation required for starting the speech recognition and the cancellation object G22A.

Subsequently, if the user performs an operation of selecting the speech recognition processing start object G25-1A (utterance start confirmation screen G24-2G), the operation is input by the operation input portion 115A and is then detected by the operation detection portion 143A. If the operation of selecting the speech recognition processing start object G25-1A is detected and the start condition is satisfied (time T12A), the output controller 146A stops the output of the start condition (time T13A). If the output of the start condition is stopped, the user starts utterance toward the sound collecting portion 120A (time T14A). The following operations can be executed in the same manner as in the example in which the remaining time until the speech recognition processing is started is output as the start condition as described above.

An example in which information related to a user operation required for starting the speech recognition processing is output as the start condition has been described hitherto. By outputting the start condition for the speech recognition processing, the user can reduce the influence of the sound information (for example, a filler and unnecessary utterance) collected before the start of the utterance on the speech recognition processing as also illustrated in FIGS. 5 and 6.

Although the start condition can be output as described above, it is difficult to flexibly start the speech recognition processing in accordance with a situation if the start condition is invariable. Thus, the output controller 146A dynamically changes the start condition for the speech recognition processing to be output from the output portion 130A in the embodiment according to the present disclosure. With such a configuration, it is possible to flexibly start the speech recognition processing in accordance with a situation. For example, the output controller 146A may dynamically change the start condition for the speech recognition processing to be output from the output portion 130A on the basis of predetermined information.

Figure 7:
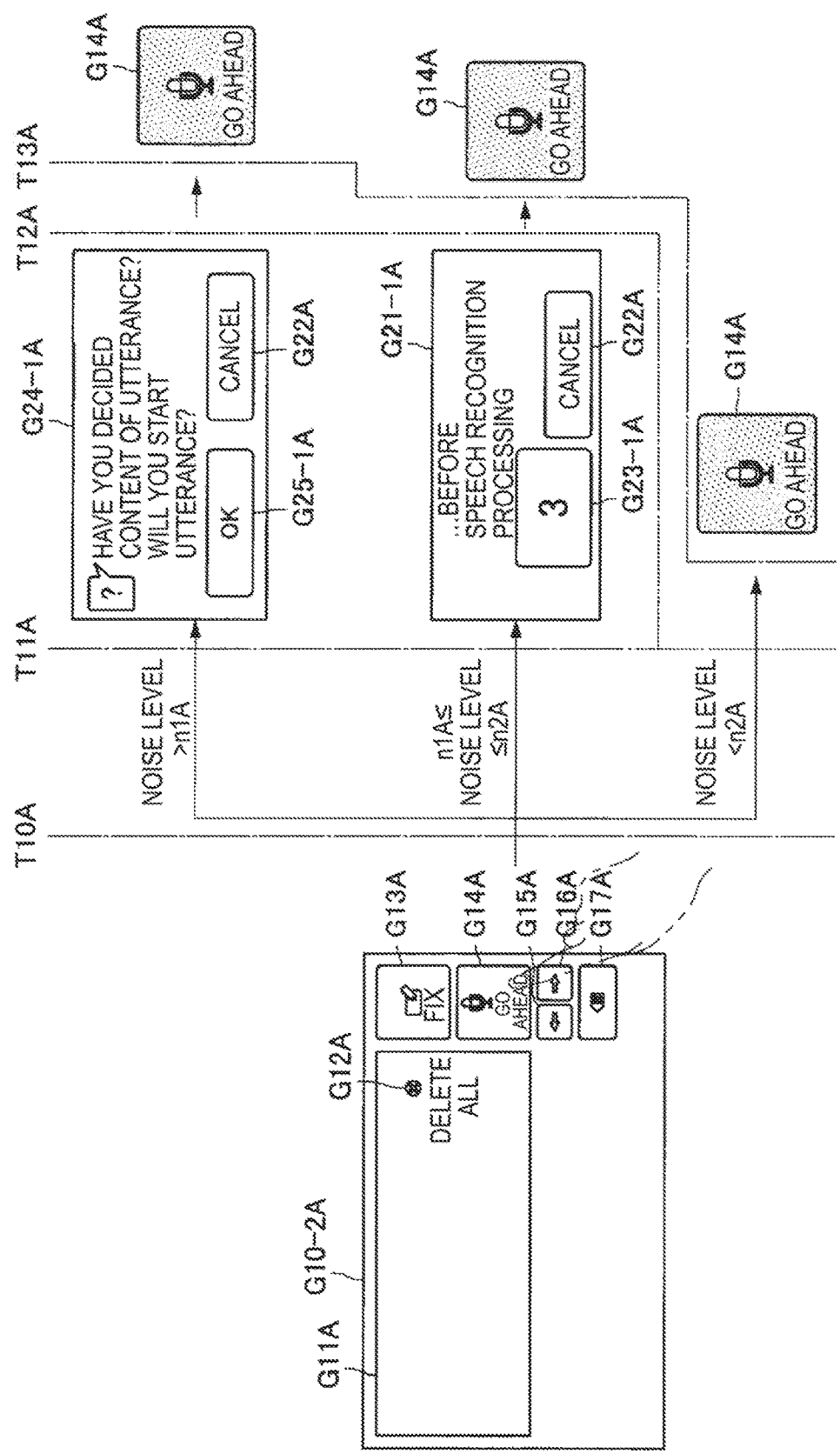
FIG. 7 is a diagram illustrating an example in which a start condition is dynamically changed on the basis of sound information input from a sound collecting portion after the activation trigger of the speech recognition processing is detected.

The predetermined information is not particularly limited. First, an example in which the start condition to be output from the output portion 130A is dynamically changed on the basis of sound information input from the sound collecting portion 120A after the activation trigger of the speech recognition processing is detected will be described. FIG. 7 is a diagram illustrating an example in which the start condition is dynamically changed on the basis of the sound information input from the sound collecting portion 120A after the activation trigger of the speech recognition processing is detected.

As illustrated in FIG. 7, if the user operation of selecting the speech recognition start operation object G14A is input by the operation input portion 115A, the operation is detected as an activation trigger of the speech recognition processing by the operation detection portion 143A (time T10A). If the activation trigger of the speech recognition processing is detected, the output controller 146A dynamically changes the start condition to be output from the output portion 130A on the basis of first type sound information included in the sound information input from the sound collecting portion 120A.

Here, the first type sound information is not particularly limited. For example, the first type sound information may include at least noise. This is because there is a possibility that noise will disturb the speech recognition processing performed on the utterance of the user. Here, description will be continued with an example in which the first type sound information is noise.

First, since a success rate of the speech recognition processing performed on the utterance of the user is low if the volume of the noise (hereinafter, also referred to as a "noise level") exceeds a first threshold value n1A, it is then considered to be desirable to allow the user to input start timing of the speech recognition processing. Thus, if the noise level exceeds the first threshold value n1A, it is preferable for the output controller 146A to change the start condition to the information related to the user operation required for starting the speech recognition processing.

More specifically, if the noise level exceeds the first threshold value n1A, it is preferable for the output controller 146A to output the utterance start confirmation screen G24-1A. In the same manner as in the aforementioned example, the utterance start confirmation screen G24-1A includes the speech recognition processing start object G2501A as the information related to the user operation required for starting the speech recognition processing and the cancellation object G22A.

Subsequently, if the user performs the operation of selecting the speech recognition processing start object G25-1A, the operation is input by the operation input portion 115A and is then detected by the operation detection portion 143A. If the operation of selecting the speech recognition processing start object G25-1A is detected and the start condition is satisfied (time T12A), the output controller 146A stops the output of the start condition (time T13A). The following operations are as described above.

Second, since the success rate of the speech recognition processing performed on the utterance of the user is in a middle level if the noise level is equal to or less than the first threshold value n1A and the noise level is equal to or greater than a second threshold value n2A (that is less than the first threshold value n1A), it is then considered to be desirable to automatically start the speech recognition processing after the elapse of predetermined time. Thus, if the volume of the noise is below the first threshold value n1A and the noise level exceeds the second threshold value n2A, it is preferable for the output controller 146A to change the start condition during remaining time until the speech recognition processing is started.

In the same manner as in the aforementioned example, the remaining time notification screen G21-1A includes the remaining time G23-1A until the speech recognition processing is started and the cancellation object G22A for stopping the output of the start condition. If the remaining time until the speech recognition processing is started becomes zero and the start condition is satisfied (time T12A), the output controller 146A stops the output of the start condition (time T13A). The output of the start condition is stopped. The following operations are as described above.

Third, since the success rate of the speech recognition processing performed on the utterance of the user is high if the noise level is below the second threshold value n2A, it is then desirable to start the speech recognition processing without outputting the start condition. Thus, if the noise level is below the second threshold value n2A, it is desirable for the output controller 146A to omit causing the output portion 130A to output the start condition.

Although the case where the noise level is equal to the first threshold value n1A is handled in the same manner as in the case where the noise level is equal to or less than the first threshold value n1A and is equal to or greater than the second threshold value n2A in the above description, the case where the noise level is equal to the first threshold value n1A may be handled in the same manner as in the case where the noise level exceeds the first threshold value n1A. Although the case where the noise level is equal to the second threshold value n2A is handled in the same manner as in the case where the noise level is equal to or less than the first threshold value n1A and is equal to or greater than the second threshold value n2A in the above description, the case where the noise level is equal to the second threshold value n2A may be handled in the same manner as in the case where the noise level is below the second threshold value n2A.

Figure 8:
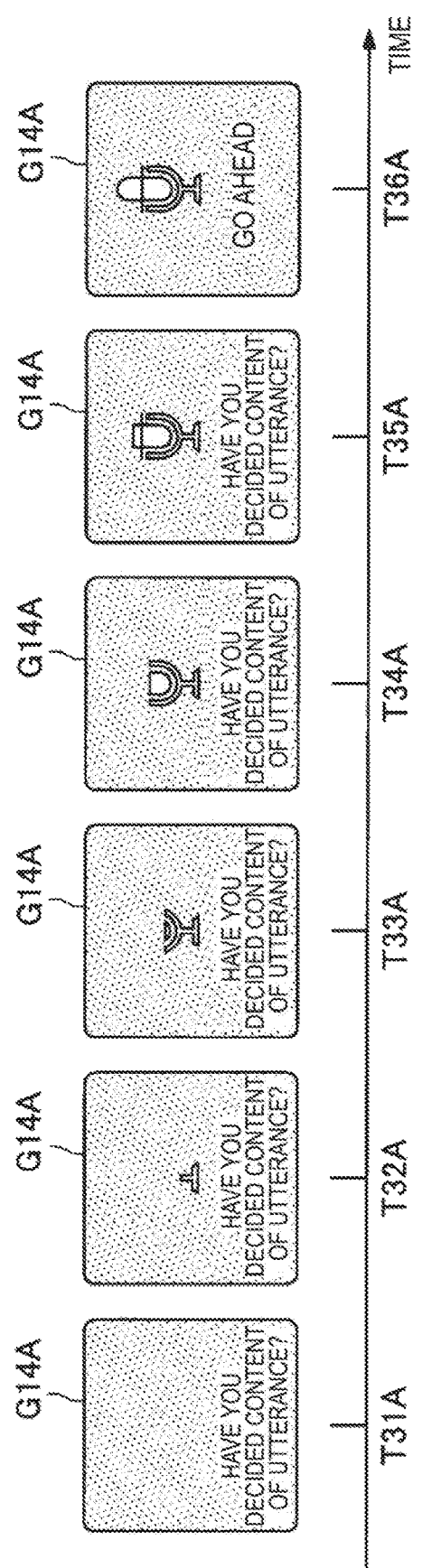
FIG. 8 is a diagram illustrating an example in which an output portion is made to output display information as the start condition.
Figure 9:
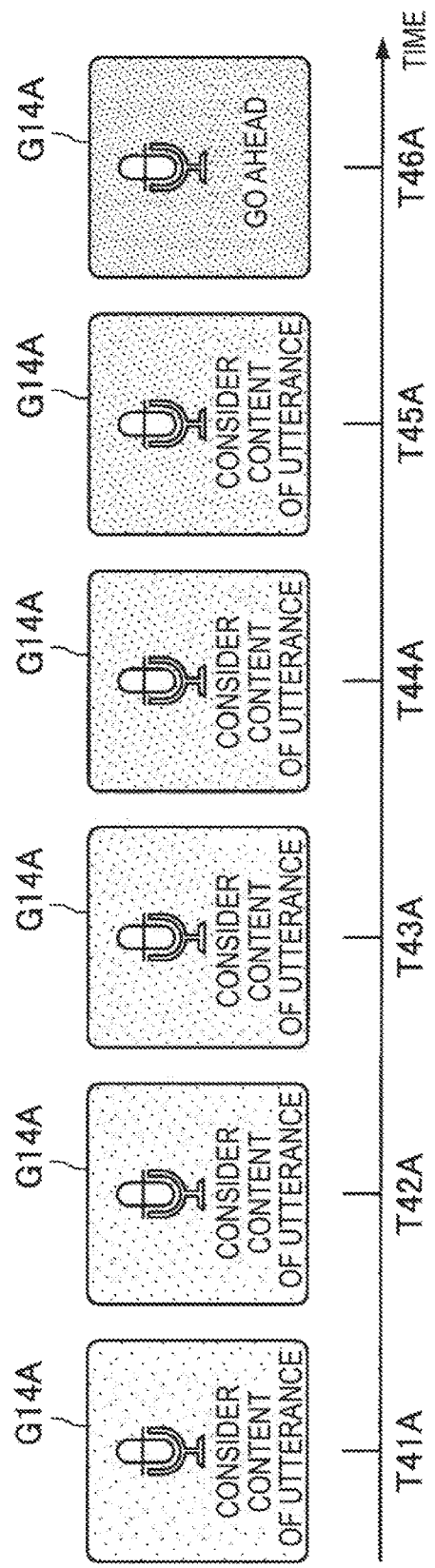
FIG. 9 is a diagram illustrating an example in which an output portion is made to output display information as the start condition.

The output controller 146A may cause the output portion 130A to output predetermined display information as the start condition. FIGS. 8 and 9 are diagrams showing examples in which the output portion 130A is made to output the display information as the start condition. FIG. 8 shows an example in which content of display is slowly made to appear in the speech recognition start operation object G14A (time T31A to time T36A). FIG. 9 shows an example in which the color of the speech recognition start operation object G14A is slowly changed (time T41A to time T46A).

Figure 10:
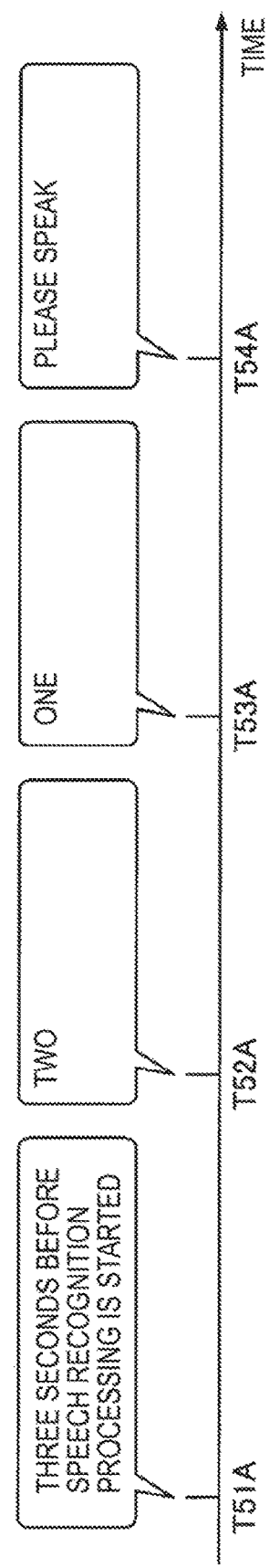
FIG. 10 is a diagram illustrating an example in which the output portion is made to output speech information as the start condition.
Figure 11:
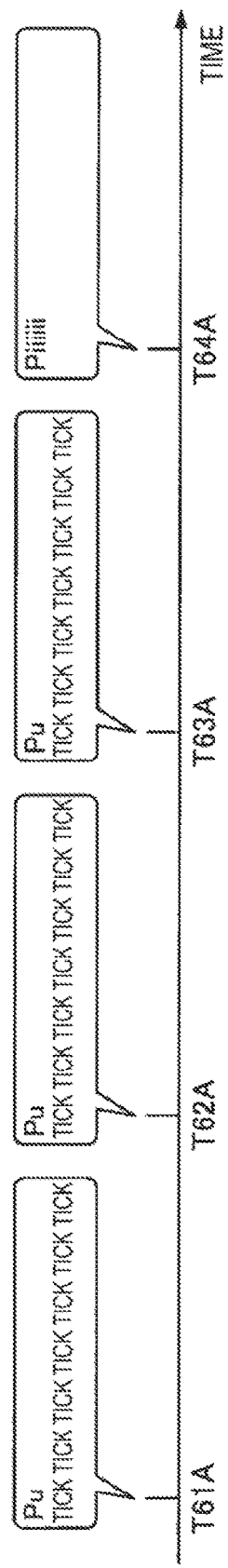
FIG. 11 is a diagram illustrating an example in which the output portion is made to output speech information as the start condition.

The output controller 146A may cause the output portion 130A to output predetermined speech information as the start condition. FIGS. 10 and 11 are diagrams showing examples in which the output portion 130A is made to output the speech information as the start condition. FIG. 10 shows an example in which speech information indicating start timing (time T54a) of the speech recognition information is output from time T51A to time T54A. FIG. 11 shows an example in which speech information indicating start timing (time T64A) of the speech recognition processing is output from time T61A to time T64A.

Next, a flow of operations for dynamically changing the start condition to be output from the output portion 130A on the basis of sound information input from the sound collecting portion 120A after the activation trigger of the speech recognition processing is detected will be described with reference to FIGS. 12 and 13. Since the flowcharts in FIGS. 12 and 13 are only examples of a flow of operations for dynamically changing the start condition to be output from the output portion 130A on the basis of the sound information input from the sound collecting portion 120A after the activation trigger of the speech recognition processing is detected, such a flow of operations is not limited to the examples illustrated in the flowchart in FIGS. 12 and 13.

Figure 12:
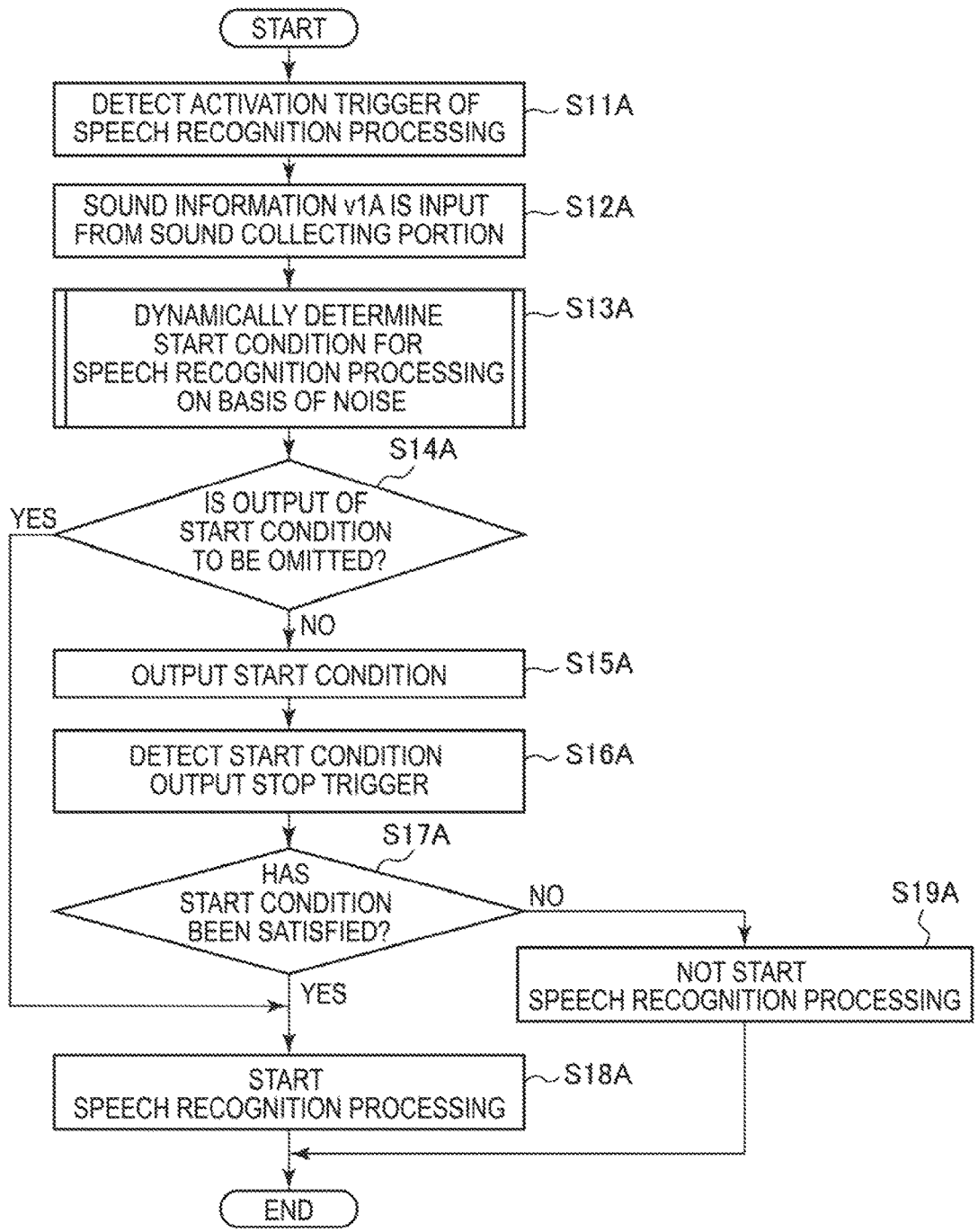
FIG. 12 is a flowchart showing an example of a flow of operations of dynamically changing a start condition to be output from the output portion on the basis of sound information input from the sound collecting portion after the activation trigger of the speech recognition processing is detected.
Figure 13:
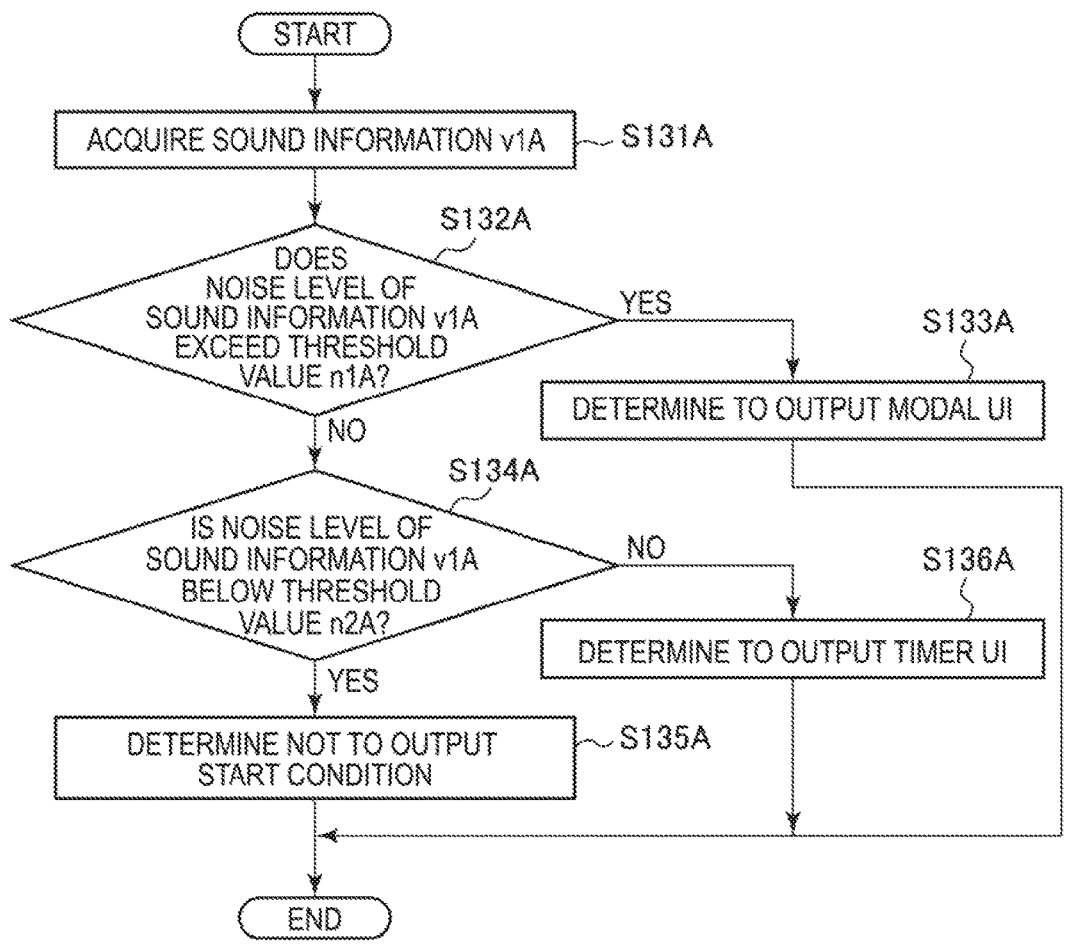
FIG. 13 is a flowchart showing an example of a flow of operations of dynamically changing a start condition to be output from the output portion on the basis of sound information input from the sound collecting portion after the activation trigger of the speech recognition processing is detected.

First, as illustrated in FIG. 12, the operation detection portion 143A detects an activation trigger of speech recognition processing (S11A), and sound information v1A is input from the sound collecting portion 120A (S12A). Then, the output controller 146A dynamically determines a start condition for the speech recognition processing on the basis of noise (S13A). Here, details of the operation of dynamically determining the start condition for the speech recognition processing on the basis of the noise will be described with reference to FIG. 13. First, the output controller 146A acquires the sound information v1A (S131A), and if the noise level of the sound information v1A exceeds the threshold value n1A ("Yes" in S132A), the output controller 146A determines to output a modal UI (the utterance start confirmation screen G24-1A in the aforementioned example) (S133A).

In contrast, the output controller 146A moves on to S134A if the noise level of the sound information v1A does not exceed the threshold value n1A ("No" in S132A), and determines not to output the start condition (S135A) if the noise level of the sound information v1A is below the threshold n2A ("Yes" in S134A) or determines to output a timer UI (remaining time notification screen G21-1A) (S136A) if the noise level of the sound information v1A is not below the threshold value n2A ("No" in S134A).

Returning to FIG. 12, description will be continued. If the output controller 146A determines to omit the output of the start condition ("Yes" in S14A), the output controller 146A moves on to the operation in S18A. In contrast, if the output controller 146A determines not to omit the output of the start condition ("No" in S14A), the output controller 146A causes the start condition to be output (S15A). Thereafter, the operation detection portion 143A detects a start condition output stop trigger (S16A). The start condition output stop trigger can include a fact that the start condition has been satisfied and an operation of selecting the cancellation object G22A for stopping the output of the start condition.

Next, the output controller 146A stops the output of the start condition. Then, if the start condition is not satisfied ("No" in S17A), the speech recognition portion 145A completes the operations without starting the speech recognition processing (S19A). In contrast, if the start condition is satisfied ("Yes" in S17A), the speech recognition portion 145A starts the speech recognition processing (S18A).

An example in which the start condition to be output from the output portion 130A is dynamically changed on the basis of the sound information input from the sound collecting portion 120A after the activation trigger of the speech recognition processing is detected has been described hitherto.

Figure 14:
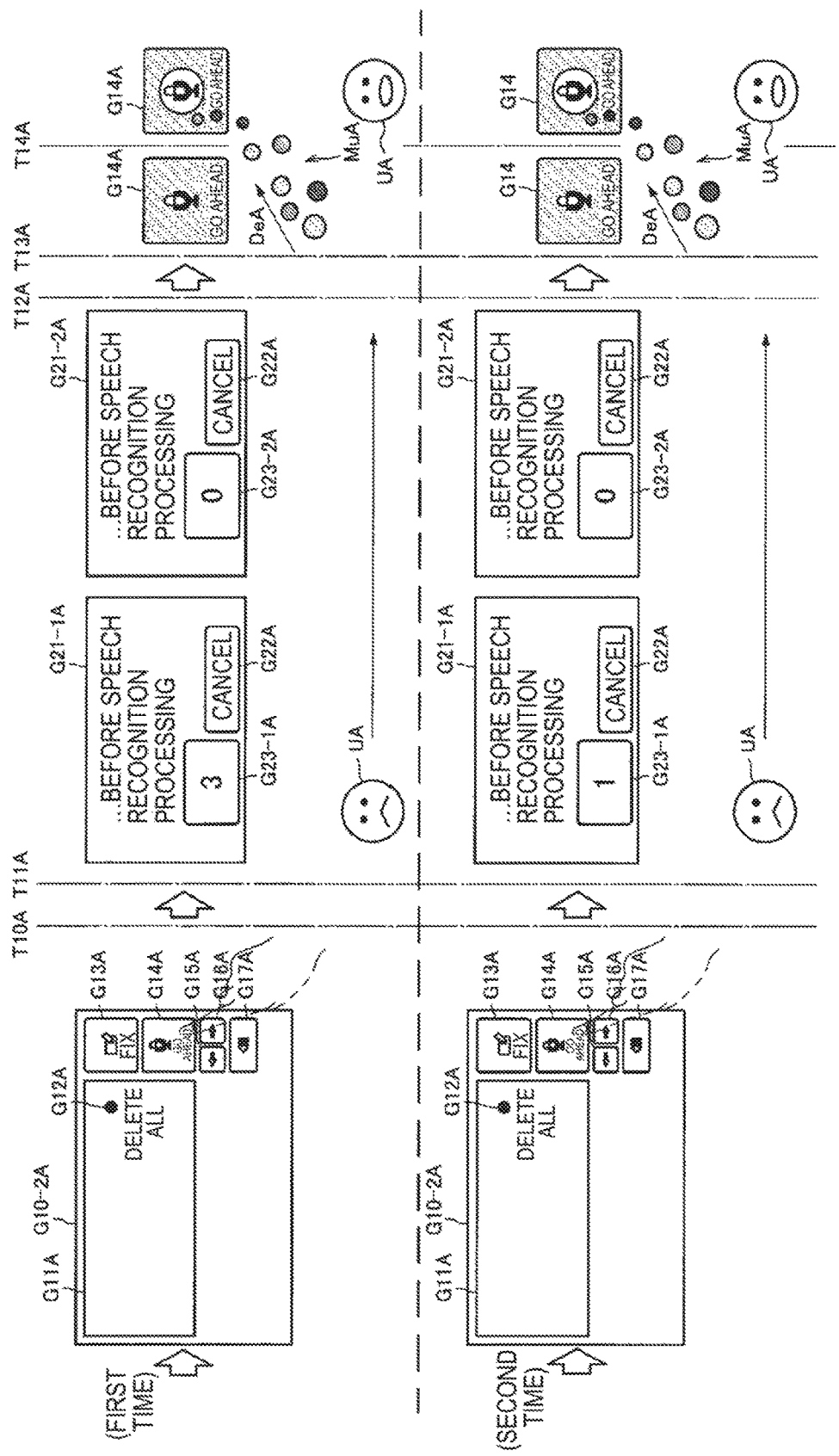
FIG. 14 is a diagram illustrating an example in which remaining time until the speech recognition processing is started is dynamically shortened on the basis of past sound information collected during predetermined time before the speech recognition processing is started after the activation trigger has been detected in the past.
Figure 15:
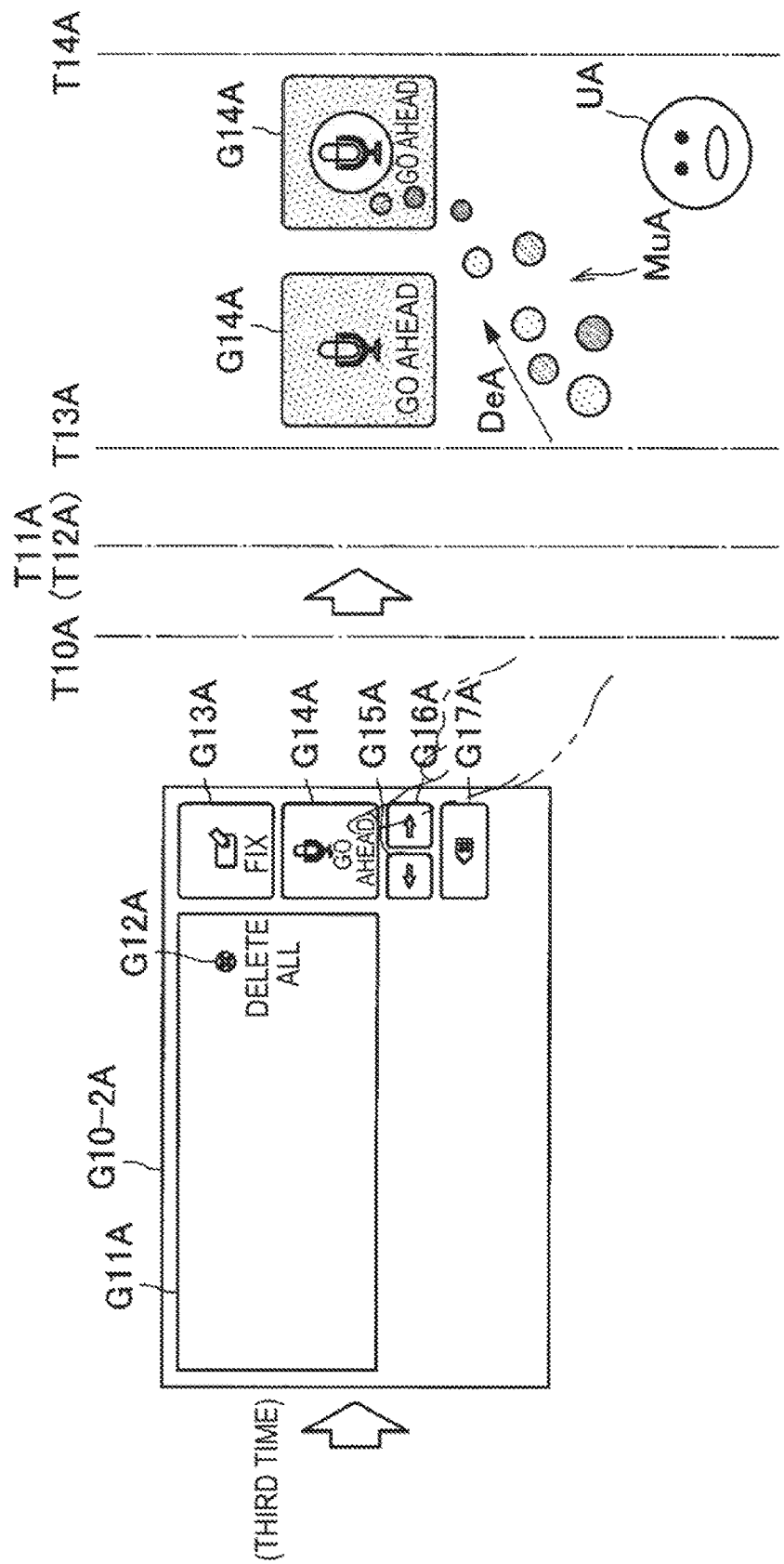
FIG. 15 is a diagram illustrating an example in which remaining time until the speech recognition processing is started is dynamically shortened on the basis of past sound information collected during predetermined time before the speech recognition processing is started after the activation trigger has been detected in the past.

Next, an example in which the start condition to be output from the output portion 130A is dynamically changed on the basis of past sound information collected during predetermined time before the speech recognition processing is started after the activation trigger has been detected in the past will be described. FIGS. 14 and 15 are diagrams illustrating an example in which remaining time until the speech recognition processing is started is dynamically shortened on the basis of past sound information collected during predetermined time before the speech recognition processing is started after the activation trigger has been detected in the past.

As illustrated in the upper section of FIG. 14, if the user operation of selecting the speech recognition start operation object G14A is input by the operation input portion 115A at the time of initial speech recognition processing, the operation is detected as the activation trigger of the speech recognition processing by the operation detection portion 143A (time T10A). If the activation trigger of the speech recognition processing is detected, the output controller 146A starts accumulation of the sound information input from the sound collecting portion 120A and starts the output of the remaining time notification screen G21-1A (time T11A). As described above, the remaining time notification screen G21-1A includes the remaining time G23-1A until the speech recognition processing is started and the cancellation object G22A for stopping the output of the start condition.

Subsequently, the output controller 146A reduces the remaining time G23-1A with the elapse of time. For example, the output controller 146A outputs the remaining time notification screen G21-2A that includes the remaining time G23-2A after being reduced from the remaining time G23-1A. Then, if the remaining time until the speech recognition processing is started becomes zero and the start condition is satisfied (time T12A), the output controller 146A stops the output of the start condition (time T13A).

If the output of the start condition is stopped, the output controller 146A completes the accumulation of the sound information input from the sound collection portion 120A. The sound information accumulated as described above is utilized as past sound information for subsequent speech recognition processing. Then, the user starts utterance toward the sound collecting portion 120A (time T14A). The following operations can be executed in the same manner as in the example in which the remaining time until the speech recognition processing is started is output as the start condition as described above.

Next, as illustrated in the lower section of FIG. 14, if the user operation of selecting the speech recognition start operation object G14A is input by the operation input portion 115A in second speech processing, the operation is detected as the activation trigger of the speech recognition processing by the operation detection portion 143A (time T10A). If the activation trigger of the speech recognition processing is detected, the output controller 146A acquires the accumulated past sound information, starts accumulation of the sound information input from the sound collecting portion 120A, and starts the output of the remaining time notification screen G21-1A (time T11A).

At this time, the output controller 146A dynamically changes the start condition to be output from the output portion 130A on the basis of second type sound information included in the past sound information. Here, the second type sound information is not particularly limited. For example, the second type sound information may include at least noise. This is because the noise may be disturbance of the speech recognition processing performed on the utterance of the user. Here, an example in which the second type sound information is noise will be continuously described.

Here, a case where the noise level is below the threshold value until the output of the start condition is stopped after the activation trigger of the speech recognition processing is detected at the time of the initial speech recognition processing is assumed as illustrated in the upper section of FIG. 14. In such a case, the noise level at the time of the initial speech recognition processing, which is acquired at the time of the second speech recognition processing, is below the threshold value. In such a case, the output controller 146A sets the remaining time until the speech recognition processing is started, which is to be output as the start condition, to be shorter than that at the time of the initial speech recognition processing.

More specifically, referring to FIG. 14, the output controller 146A sets the remaining time G23-1 until the speech recognition processing is started to "3" seconds at the time of the initial speech recognition processing while the output controller 146A sets the remaining time G23-1A to be as short as "1" second at the time of the second speech recognition processing. Although the remaining time G23-1A until the speech recognition processing is started becomes short immediately at the time of the second speech recognition processing in the example illustrated in FIG. 14, the remaining time G23-1A until the speech recognition processing is started may become short for the first time after the state in which the noise level is below the threshold value continues a plurality of times.

Subsequently, if the user operation of selecting the speech recognition start operation object G14A is input by the operation input portion 115A at the time of the third speech recognition processing, the operation is detected as the activation trigger of the speech recognition processing by the operation detection portion 143A (time T10A) as illustrated in FIG. 15. If the activation trigger of the speech recognition processing is detected, the output controller 146A starts accumulation of the sound information input from the sound collecting portion at the time of the second speech recognition processing on the accumulated sound information (time T11A).

Here, a case where the noise level is below the threshold value until the output of the start condition is stopped after the activation trigger of the speech recognition processing at the time of the second speech recognition processing is assumed as illustrated in the lower section of FIG. 14. In such a case, the noise level at the time of the speech recognition processing on the second day, which is acquired at the third speech recognition processing, is below the threshold value. In such a case, the output controller 146A sets the remaining time until the speech recognition processing, which is to be output as the start condition, to be shorter than that at the time of the speech recognition processing on the second day.

More specifically, referring to FIG. 15, the output controller 146A sets the remaining time G23-1A until the speech recognition processing is started to "1" second at the time of the speech recognition processing on the second day while the output controller 146A omits the output of the remaining time notification screen G21-1A at the time of the third speech recognition processing. Although the output of the remaining time notification screen G21-1A is omitted immediately at the time of the third speech recognition processing in the example illustrated in FIG. 15, the output of the remaining time notification screen G21-1A may be omitted for the first time after the state in which the noise level is below the threshold value continues a plurality of times.

Figure 16:
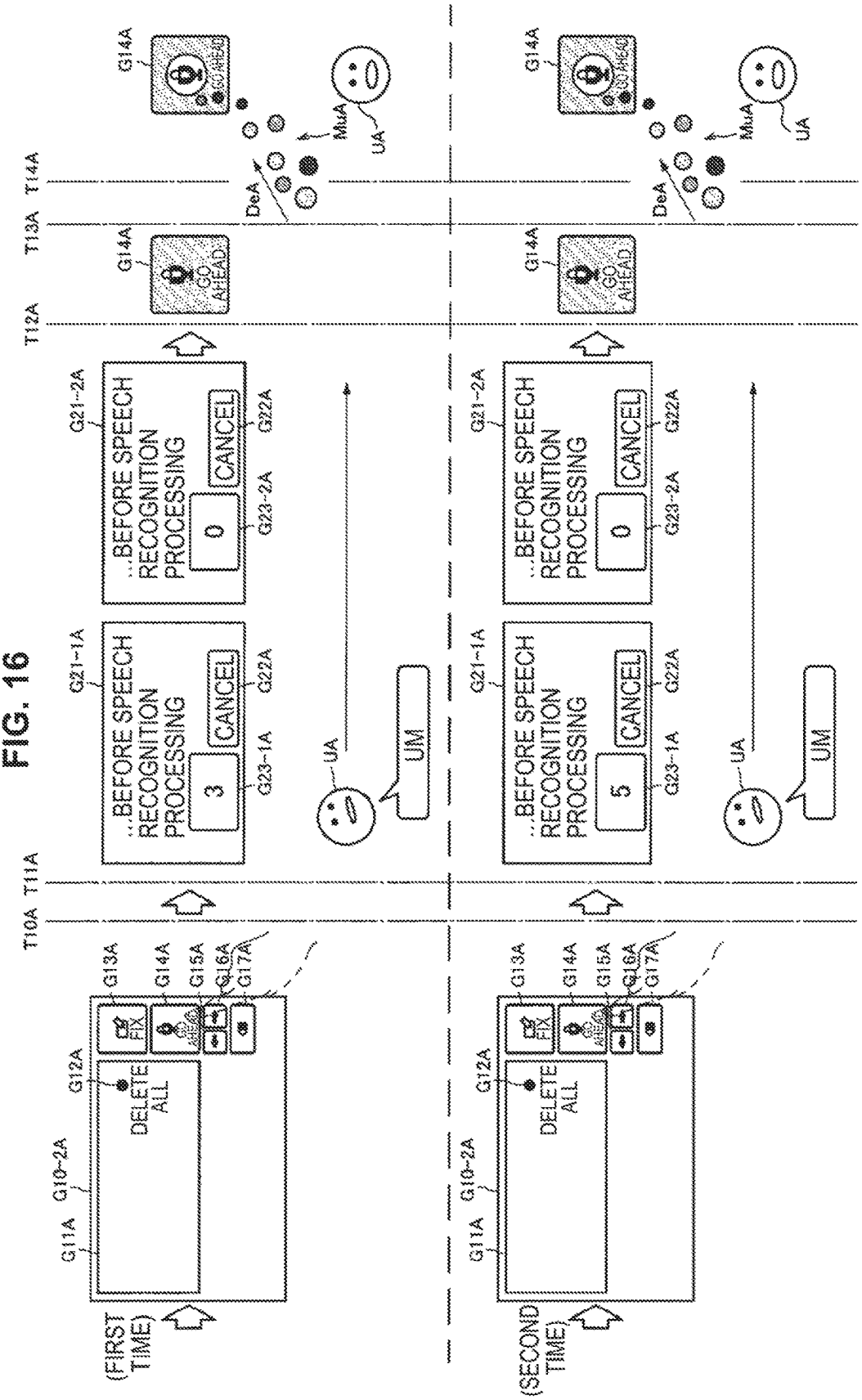
FIG. 16 is a diagram illustrating an example in which a remaining time until the speech recognition processing is started is dynamically extended on the basis of past sound information collected during the predetermined time before the speech recognition processing is started after the activation trigger has been detected in the past.
Figure 17:
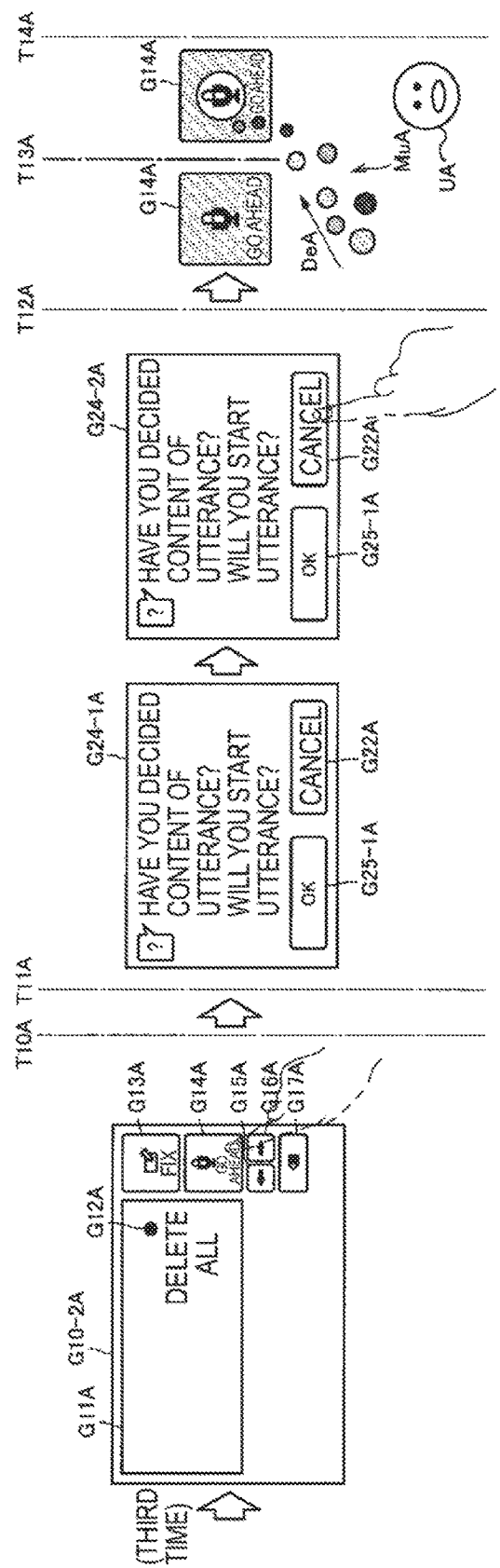
FIG. 17 is a diagram illustrating an example in which a remaining time until the speech recognition processing is started is dynamically extended on the basis of past sound information collected during the predetermined time before the speech recognition processing is started after the activation trigger has been detected in the past.

Next, an example in which the remaining time until the speech recognition processing is started is dynamically extended will be described. FIGS. 16 and 17 are diagrams illustrating an example in which the remaining time until the speech recognition processing is started is dynamically extended on the basis of past sound information collected during predetermined time before the speech recognition processing is started after the activation trigger has been detected in the past.

As illustrated in the upper section of FIG. 16, if the user operation of selecting the speech recognition start operation object G14A is input by the operation input portion 115 at the time of the initial speech recognition processing, the operation is detected as the activation trigger of the speech recognition processing by the operation detection portion 143A (time T10A). If the activation trigger of the speech recognition processing is detected, the output controller 146A starts accumulation of the sound information input from the sound collecting portion 120A and starts the output of the remaining time notification screen G21-1A (time T11A). The following operations can be executed in the same manner as in the example in which the remaining time until the speech recognition processing is output as the start condition as described above.

Subsequently, if the user operation of selecting the speech recognition start operation object G14A is input by the operation input portion 115A at the time of the second speech processing, the operation is detected as the activation trigger of the speech recognition processing by the operation detection portion 143A as illustrated in the lower section of FIG. 16 (time T10A). If the activation trigger of the speech recognition processing is detected, the output controller 146A acquires the accumulated past sound information, starts accumulation of the sound information input from the sound collecting portion 120A, and starts the output of the remaining time notification screen G21-1A (time T11A).

Here, a case where the noise level exceeds the threshold value until the output of the start condition is stopped after the activation trigger of the speech recognition processing is detected at the time of the initial speech recognition processing is assumed as illustrated in the upper section of FIG. 16. In such a case, the noise level at the time of the initial speech recognition processing, which is acquired at the time of the second speech recognition processing, exceeds the threshold value. In such a case, the output controller 146A sets the remaining time until the speech recognition processing is started, which is to be output as the start condition, to be longer than that at the time of the initial speech recognition processing.

More specifically, referring to FIG. 16, the output controller 146A sets the remaining time G23-1A until the speech recognition processing is started to "3" seconds at the time of the initial speech recognition processing while the output controller 146A sets the remaining time G23-1A to be as long as "5" seconds at the time of the second speech recognition processing. Although the remaining time G23-1A until the speech recognition processing is started becomes long immediately at the second speech recognition processing in the example illustrated in FIG. 16, the remaining time G23-1A until the speech recognition processing is started may become long for the first time after the state in which the noise level exceeds the threshold value continues a plurality of times.

Subsequently, if the user operation of selecting the speech recognition start operation object G14A is input by the operation input portion 115A at the time of the third speech recognition processing, the operation is detected as the activation trigger of the speech recognition processing by the operation detection portion 143A as illustrated in FIG. 17 (time T10A). If the activation trigger of the speech recognition processing is detected, the output controller 146A starts accumulation of the sound information input from the sound collecting portion 120A at the time of the second speech recognition processing on the accumulated sound information (time T11A).

Here, a case where the noise level exceeds the threshold value until the output of the start condition is stopped after the activation trigger of the speech recognition processing is detected at the time of the speech recognition processing is assumed as illustrated in the lower section of FIG. 16. In such a case, the noise level at the time of the speech recognition processing on the second day, which is acquired at the time of the third speech recognition processing, exceeds the threshold value. In such a case, the output controller 146A sets the remaining time until the speech recognition processing is started, which is to be output as the start condition, to be longer than that at the time of the speech recognition processing on the second day.

More specifically, referring to FIG. 17, the output controller 146A sets the remaining time G23-1A until the speech recognition processing is started to "5" seconds at the time of the speech recognition processing on the second day while the output controller 146A outputs the utterance start confirmation screen G24-2A at the time of the third speech recognition processing. Although the utterance start confirmation screen G24-2A is output immediately at the third speech recognition processing in the example illustrated in FIG. 17, the utterance start confirmation screen G24-2A may be output for the first time after the state in which the noise level exceeds the threshold value continues a plurality of times.

Here, the remaining time until the speech recognition processing is started can change as described above. Here, the display information output from the output portion 130A is preferably changed in association with the change during the remaining time until the speech recognition processing is started. In this manner, it is possible for the user to easily recognize that the start condition has been changed.

Figure 18:
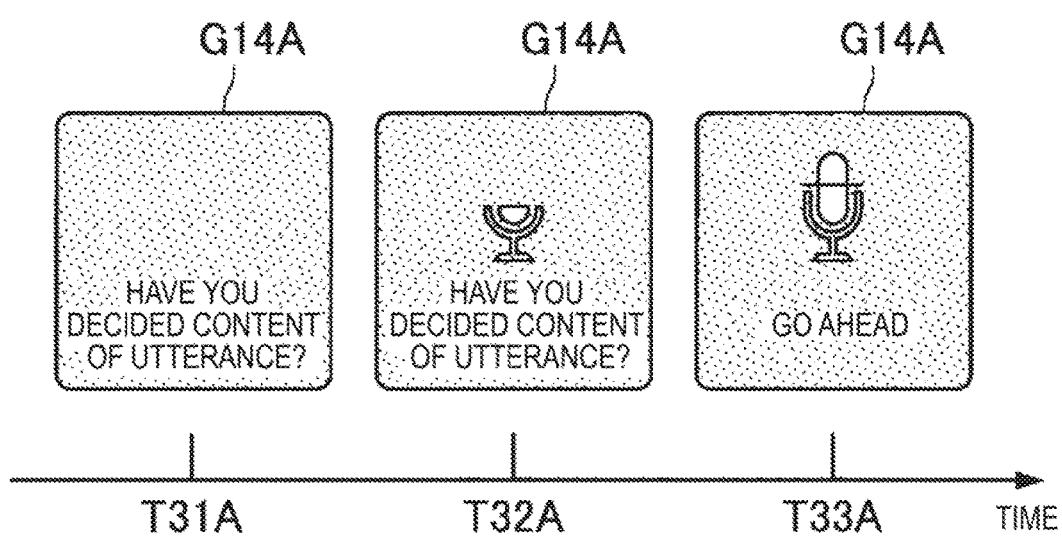
FIG. 18 is a diagram showing an example of the display information when the remaining time until the speech recognition processing is started is shortened.
Figure 19:
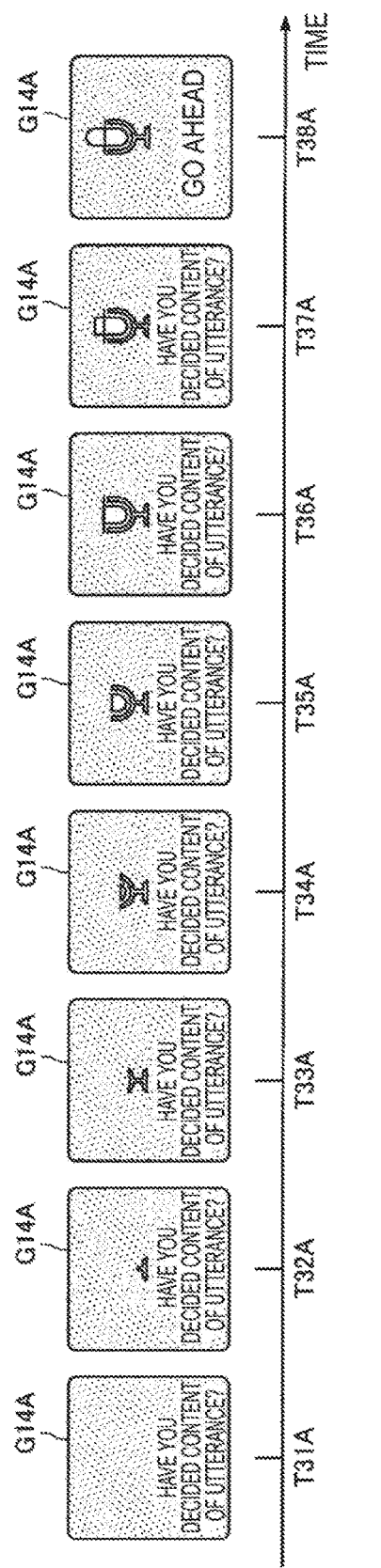
FIG. 19 is a diagram showing an example of the display information when the remaining time until the speech recognition processing is started is extended.

FIG. 18 is a diagram showing an example of display information when the remaining time until the speech recognition processing is shortened. As illustrated in FIG. 18, the output controller 146A may raise an appearance rate of the display content in the example in which the display content is made to slowly appear in the speech recognition start operation object G14A (time T31A to time T33A). FIG. 19 is a diagram showing an example of display information when the remaining time until the speech recognition processing is started is extended. As illustrated in FIG. 19, the output controller 146A may reduce the appearance rate of the display content in the example in which the display content is made to slowly appear in the speech recognition start operation object G14A (time T31A to time T38A).

Next, a flow of operations for dynamically changing the start condition to be output from the output portion 130A on the basis of past sound information collected during predetermined time before the speech recognition processing is started after the activation trigger has been detected in the past will be described with reference to FIGS. 20 and 21. Since the flowcharts in FIGS. 20 and 21 are only an example of a flow of operations for dynamically changing the start condition to be output from the output portion 130A on the basis of past sound information collected during predetermined time before the speech recognition processing is started after the activation trigger has been detected in the past, such a flow of operations is not limited to the example illustrated in the flowcharts of FIGS. 20 and 21.

Figure 20:
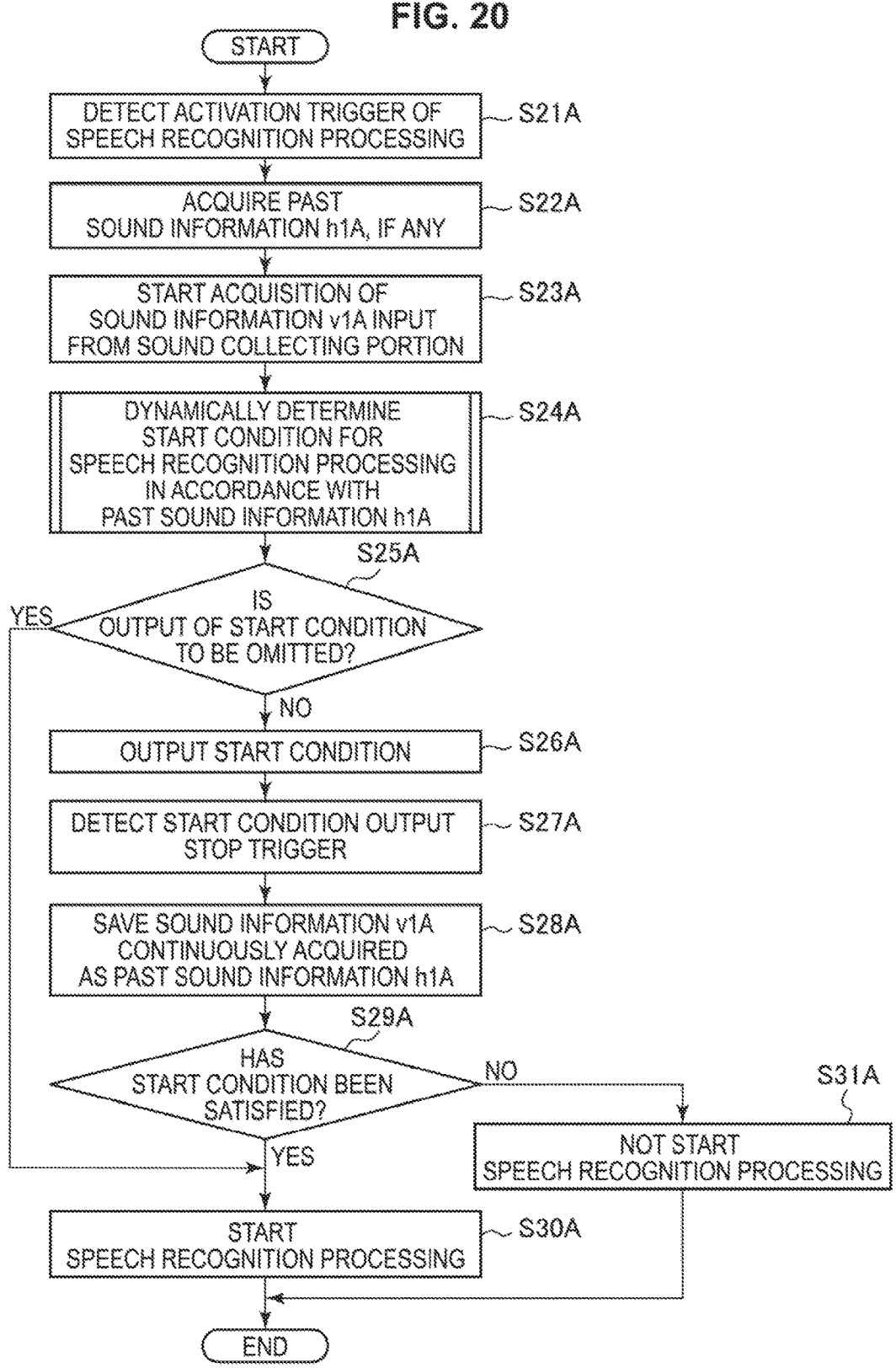
FIG. 20 is a flowchart showing an example of a flow of operations of dynamically changing the start condition to be output from the output portion on the basis of past sound information collected during the predetermined time before the speech recognition processing is started after the activation trigger has been detected in the past.
Figure 21:
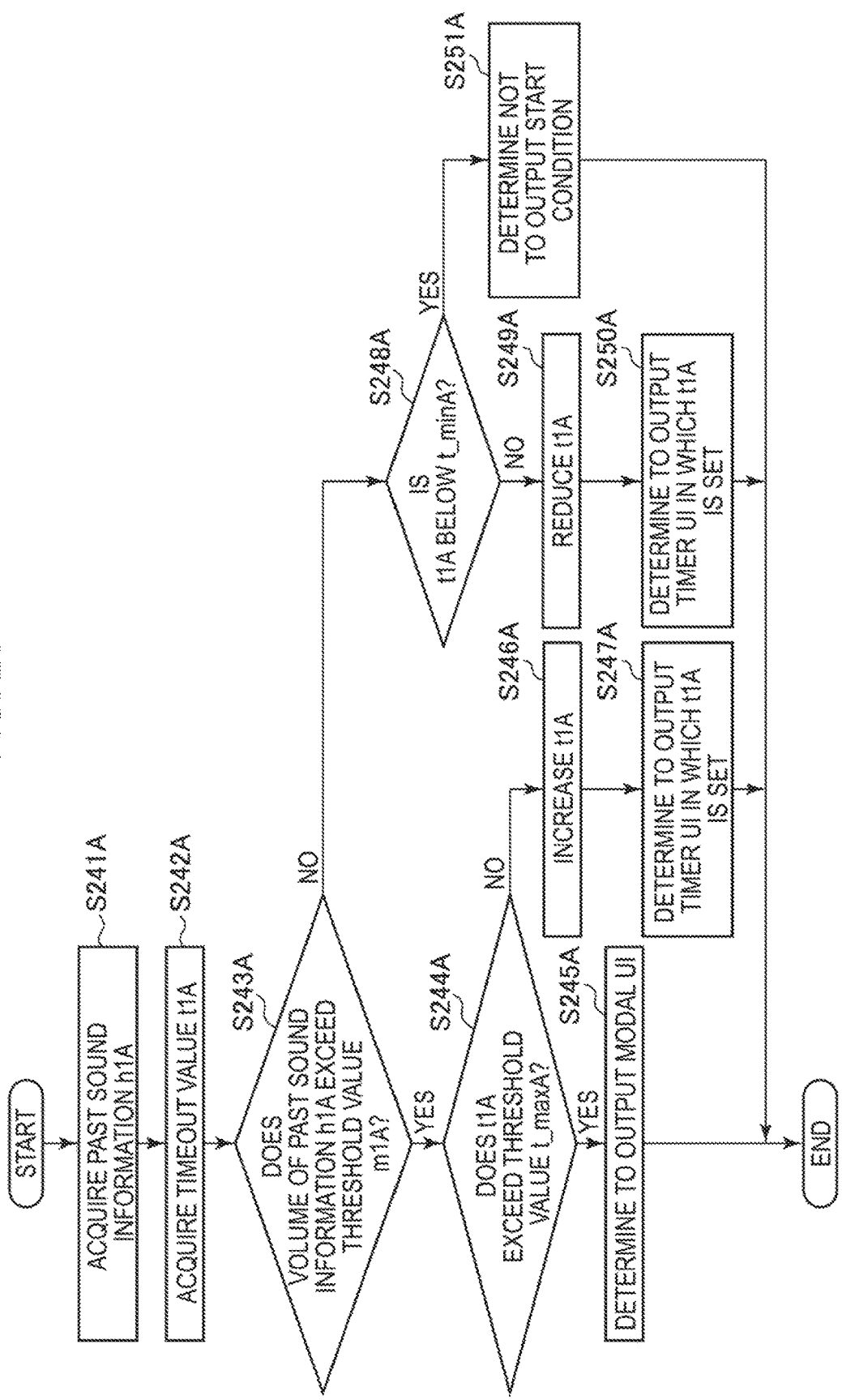
FIG. 21 is a flowchart showing an example of a flow of operations of dynamically changing the start condition to be output from the output portion on the basis of past sound information collected during the predetermined time before the speech recognition processing is started after the activation trigger has been detected in the past.

First, the operation detection portion 143A detects an activation trigger of speech recognition processing as illustrated in FIG. 20 (S21A). If there is past sound information h1A, the output controller 146A acquires the past sound information h1 (S22A) and starts acquisition of sound information v1A from the sound collecting portion 120A (S23A). Subsequently, the output controller 146A dynamically determines the start condition for the speech recognition processing in accordance with the past sound information h1A (S24A). Here, details of the operation of dynamically changing the start condition for the speech recognition processing on the basis of the past sound information h1A will be described with reference to FIG. 21.

First, the output controller 146A acquires the past sound information h1A (S241A), and acquires a timeout value t1A (the remaining time G23-1A until the speech recognition processing is started in the aforementioned example) (S242A). Subsequently, if the volume of the past sound information h1A exceeds a threshold value m1A ("Yes" in S243A), the output controller 146A moves on to the operation in S244A. In contrast, if the volume of the past sound information h1A does not exceed the threshold value m1A ("No" in S243A"), the output controller 146A moves on to the operation in S248A.

In the case of moving on to the operation in S244A, the output controller 146A determines to output a modal UI (the utterance start confirmation screen G24-1A in the aforementioned example) if the timeout value t1A exceeds a threshold value t_maxA ("Yes" in S244A) (S245A), or increases the timeout value t1A (S246A) and determines to output a timer UI (the remaining time notification screen G21-1A in the above description) in which the timeout value t1A is set (S247A) if the timeout value t1A does not exceed the threshold value t_maxA ("No" in S244A).

In the case of moving on to the operation in S248A in contrast, the output controller 146A determines not to output the start condition (S251A) if the timeout value t1A is below the threshold value t_minA ("Yes" in S248A), or reduces the timeout value t1A (S249A) and determines to output the timer UI (the remaining time notification screen G21-1A in the above description) in which the timeout value t1A is set if the timeout value t1A is not below the threshold value t_minA ("No" in S248A).

Returning to FIG. 20, the description will be continued. If the output controller 146A determines to omit the output of the start condition ("Yes" in S25A), the output controller 146A moves on to the operation in S30A. In contrast, if the output controller 146A determines not to omit the output of the start condition ("No" in S25A), the output controller 146A outputs the start condition (S26A). Thereafter, the operation detection portion 143A detects a start condition output stop trigger (S27A). The start condition output stop trigger can include a fact that the start condition has been satisfied and the operation of selecting the cancellation object G22A for stopping the output of the start condition.

Subsequently, the output controller 146A stops the output of the start condition and saves the sound information v1A continuously acquired as the past sound information h1A (S28A). If the start condition is not satisfied ("No" in S29A), then the speech recognition portion 145A completes the operation without starting the speech recognition processing (S31A). In contrast, if the start condition is satisfied ("Yes" in S29A), the speech recognition portion 145A starts the speech recognition processing (S30A).

An example in which the start condition to be output from the output portion 130A is dynamically changed on the basis of past sound information collected during the predetermined time before the speech recognition processing is started after the activation trigger has been detected in the past has been described hitherto.

Although an example in which the operations are performed irrespective of whether or not a filler is included in the sound information input from the sound collecting portion 120A has been described hitherto, different operations may be performed depending on whether or not filler is included in the sound information input from the sound collecting portion 120A. First, an example of a filler will be described. FIG. 22 is an example showing correspondence between a filler and a speech waveform thereof. As illustrated in FIG. 22, information of an associated filler and a speech waveform thereof is stored in advance. If the speech waveform is included in the sound information input from the sound collecting portion 120A, the filler corresponding to the speech waveform is acquired as a result of the speech recognition processing.

Figure 23:
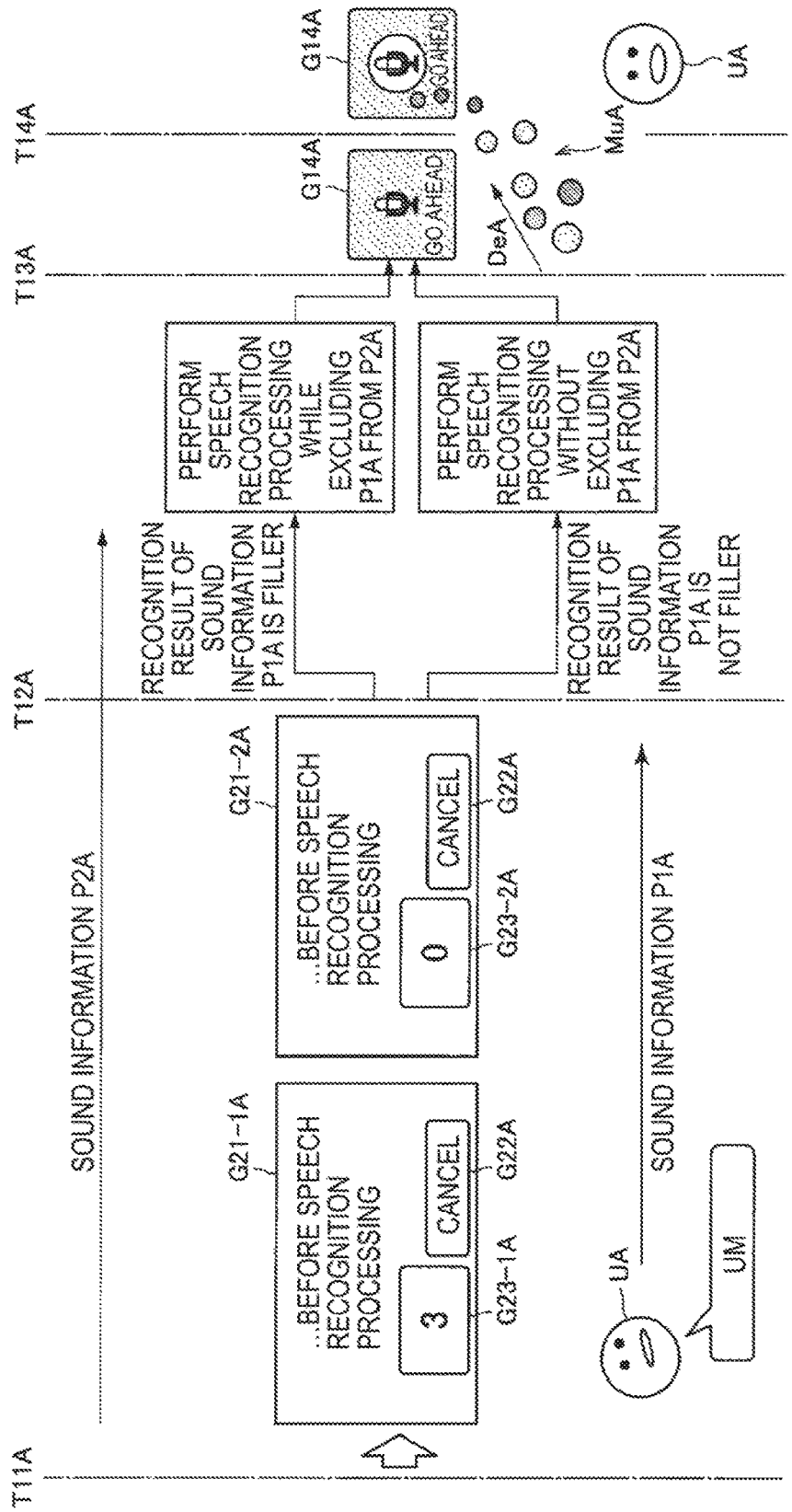
FIG. 23 is a diagram illustrating an example in which different operations are performed depending on whether or not a filler is included in the sound information input from the sound collecting portion.

FIG. 23 is a diagram illustrating an example in which different operations are performed depending on whether or not a filler is included in the sound information input from the sound collecting portion 120A. If the activation trigger of the speech recognition processing is detected, the output controller 146A starts the output of the remaining time notification screen G21-1A (time T11A). At this time, the recognition controller 144A starts accumulation of the sound information input from the sound collecting portion 120A.

Subsequently, if the start condition is satisfied (time T12A), the recognition controller 144A determines whether or not a recognition result of the sound information P1A accumulated until the start condition is satisfied is a filler. If the recognition result is a filler, the recognition controller 144A causes the speech recognition portion 145A to perform the speech recognition processing while excluding P1A accumulated until the start condition is satisfied from the sound information P2A accumulated until the current time. In contrast, if the recognition result is not a filler, the recognition controller 144A causes the speech recognition portion 145 to perform the speech recognition processing without excluding P1A accumulated until the start condition is satisfied from the sound information P2A accumulated until the current time. If the start condition is satisfied (time T12A), the output controller 146A stops the output of the start condition (time T13A). The following operations are as described above.

Although the example in which the start condition to be output from the output portion 130A is dynamically changed was described hitherto, the example in which the start condition is dynamically changed is not limited to the aforementioned example. For example, the output controller 146A may dynamically change the start condition to be output from the output portion 130A on the basis of the number of arrival directions of the sound information with likelihood of speech exceeding a threshold value to the sound collecting portion 120A. This is because there is a possibility that it may become difficult to perform the speech recognition processing if the number of arrival directions of the sound information with the likelihood of speech exceeding the threshold value to the sound collecting portion exceeds a predetermined value.

Thus, if the number of the arrival directions of the sound information with the likelihood of speech exceeding the threshold value to the sound collecting portion 120A exceeds the predetermined value, for example, the output controller 146A may output the utterance start confirmation screen G24-1A. If the number of the arrival directions of the sound information with the likelihood of speech exceeding the threshold value to the sound collecting portion 120A is equal to or less than the predetermined value, the output controller 146A may output the remaining time notification screen G21-1A. Although the predetermined value is not limited, the predetermined value may be "1".

The functional details of the information processing system 10A according to the embodiment of the present disclosure was described hitherto.

[1.4 Modification Example of System Configuration]

Figure 24:
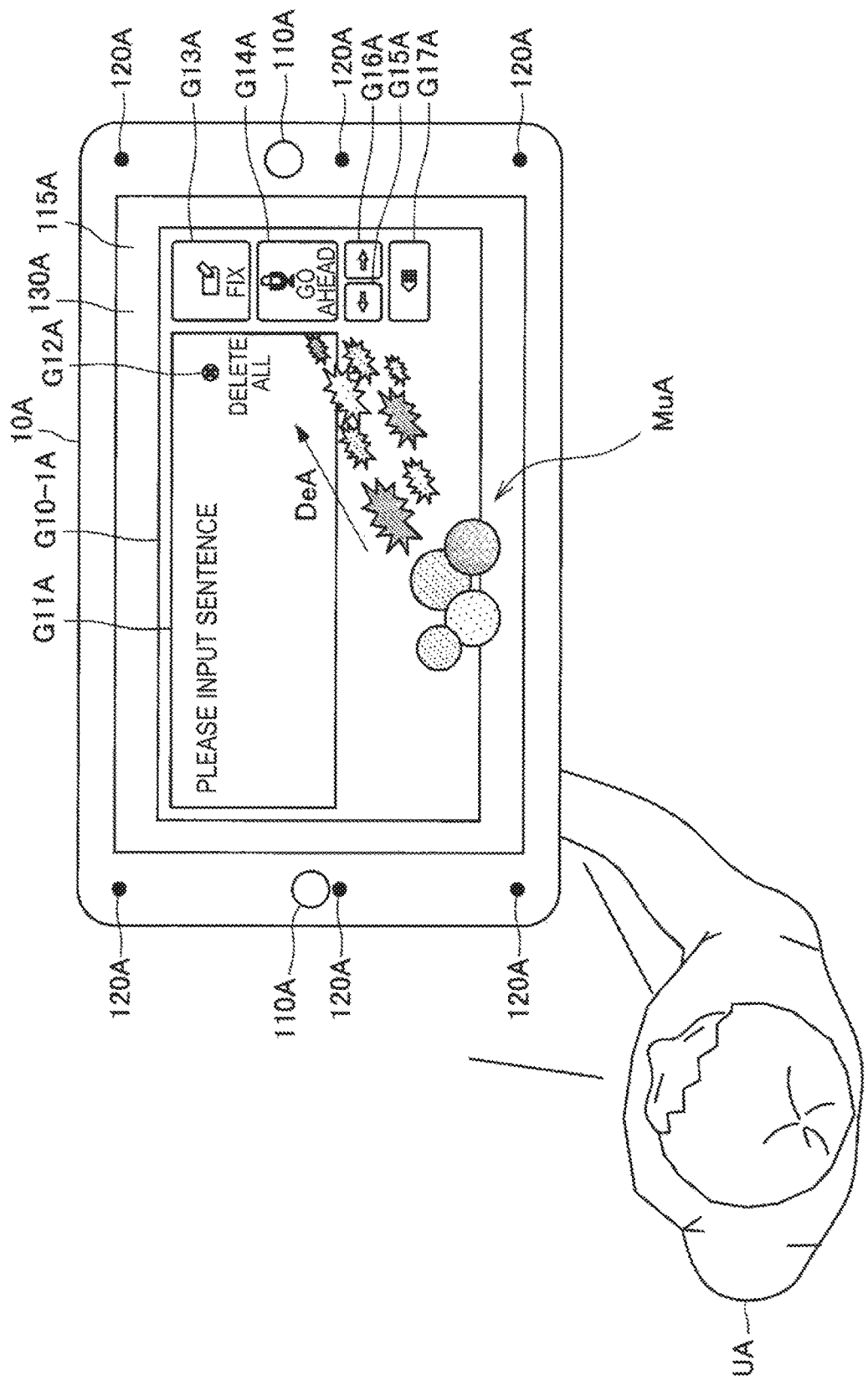
FIG. 24 is a diagram showing a modification example 1 of the configuration of the information processing system.

The example in which the output portion 130A was a projector capable of projecting a screen onto the top surface of the table TblA was described hitherto. However, the system configuration of the information processing system 10A is not limited to such an example. Modification examples of the system configuration of the information processing system 10A will be described below. FIG. 24 is a diagram showing a modification example 1 of a configuration of the information processing system 10A. If the information processing system 10A is a mobile terminal as illustrated in FIG. 24, the output portion 130A may be provided in the mobile terminal. The type of mobile terminal is not particularly limited, and the mobile terminal may be a tablet terminal, a smartphone, or a cellular phone.

FIGS. 25 to 28 are diagrams showing a modification example 2 of the configuration of the information processing system 10A. As illustrated in FIGS. 25 to 28, the output portion 130A may be a television device, the information processing device 140A may be a game console, and the operation input portion 115A may be a controller for operating the game console.

Figure 25:
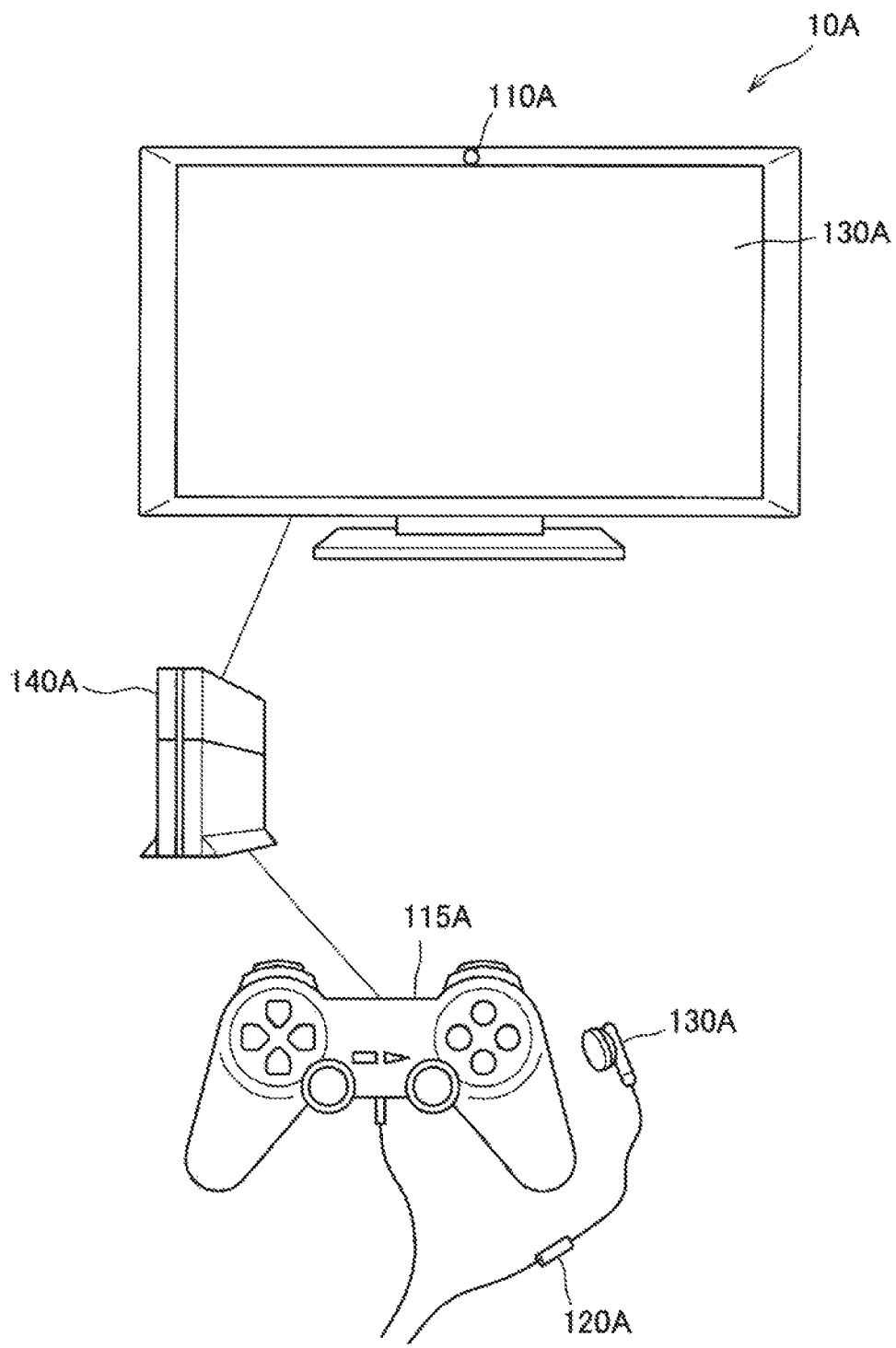
FIG. 25 is a diagram showing a modification example 2 of the configuration of the information processing system.
Figure 26:
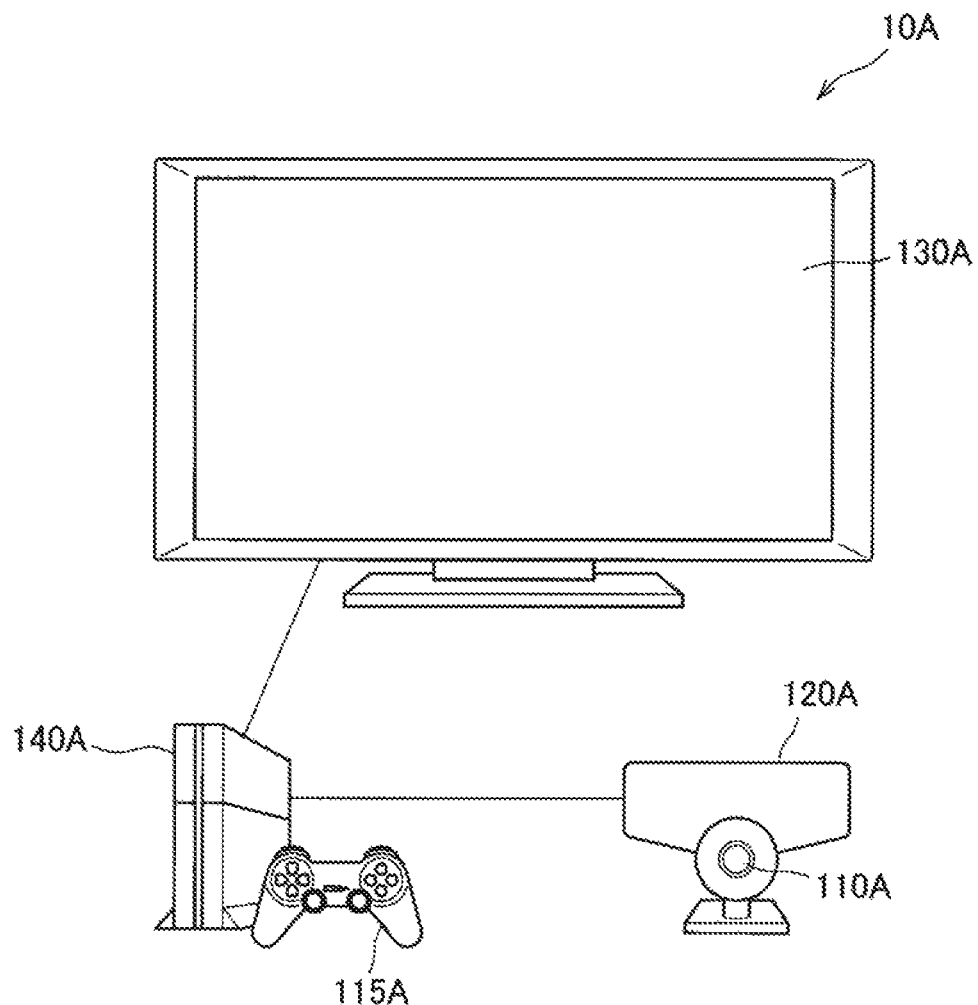
FIG. 26 is a diagram showing the modification example 2 of the configuration of the information processing system.
Figure 27:
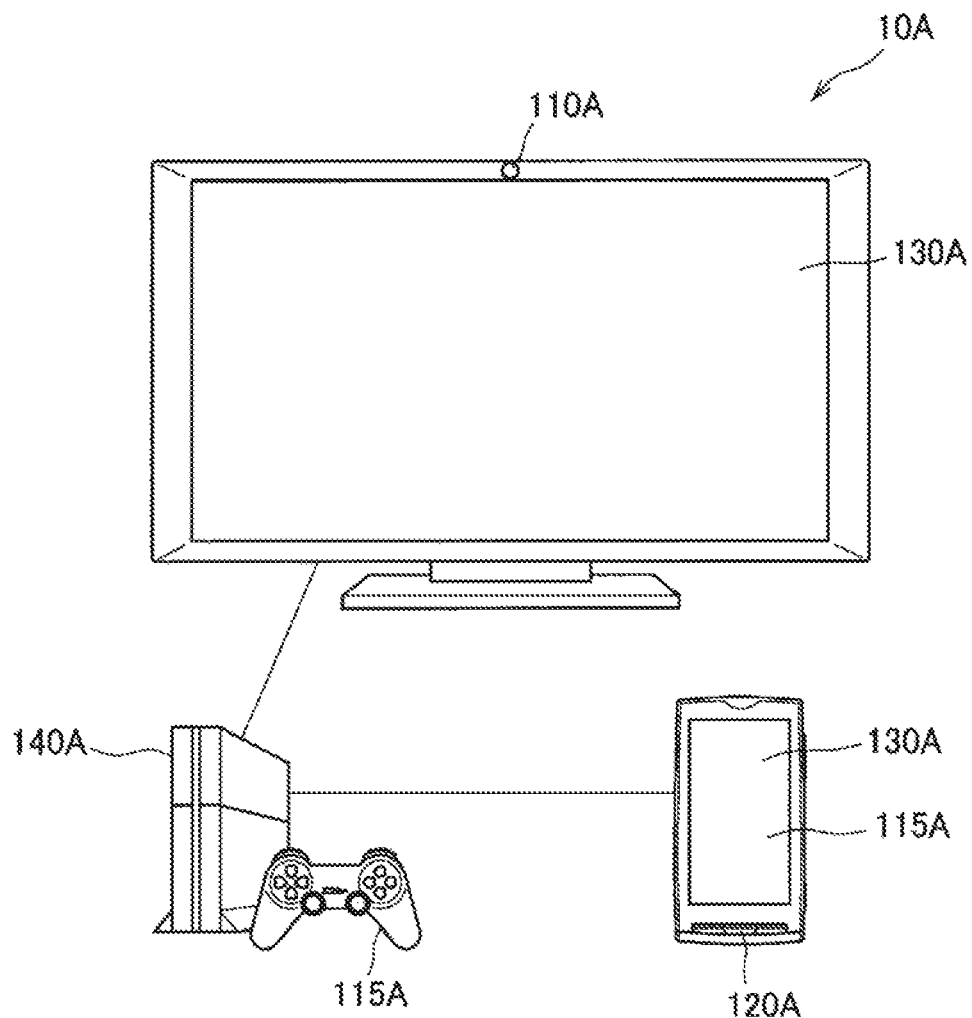
FIG. 27 is a diagram showing the modification example 2 of the configuration of the information processing system.
Figure 28:
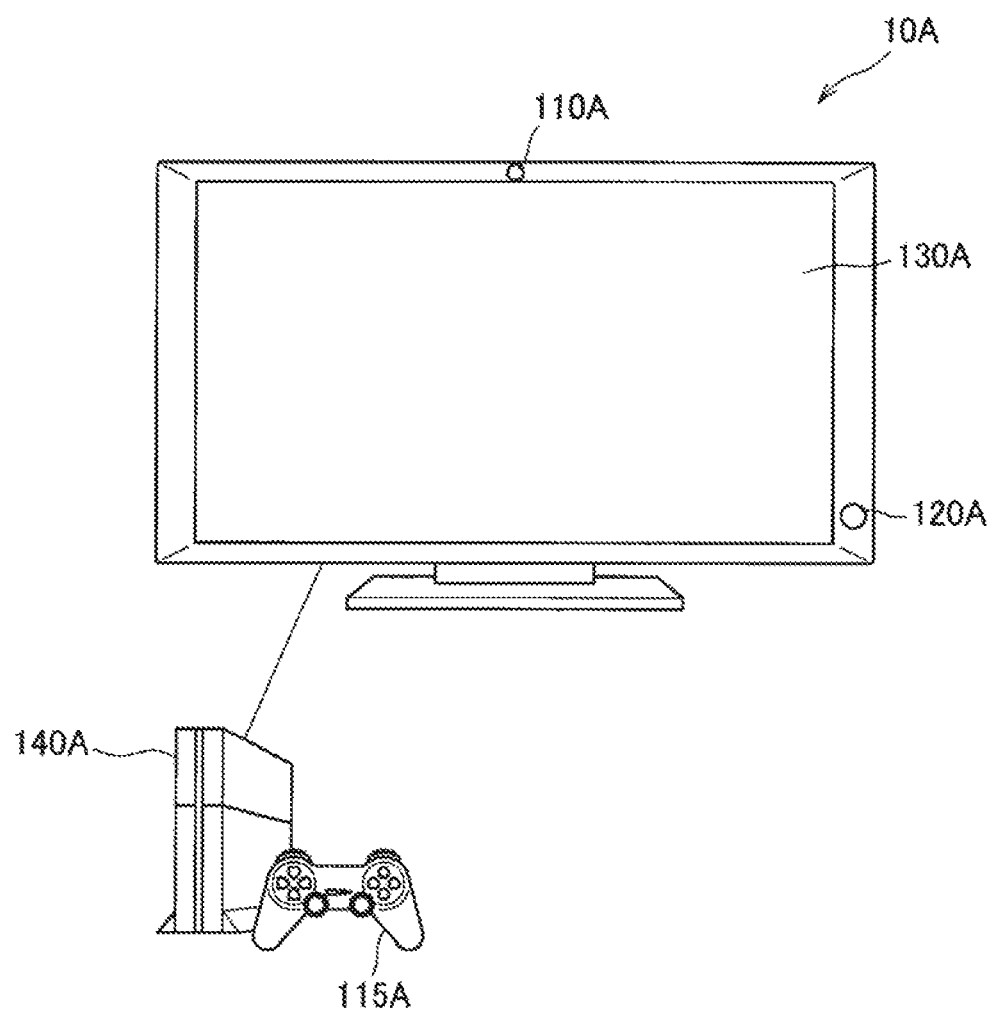
FIG. 28 is a diagram showing the modification example 2 of the configuration of the information processing system.

As illustrated in FIG. 25, the sound collecting portion 120A and the output portion 130A may be connected to the operation input portion 115A. As illustrated in FIG. 26, the image input portion 110A and the sound collecting portion 120A may be connected to the information processing device 140A. As illustrated in FIG. 27, the operation input portion 115A, the sound collecting portion 120A, and the output portion 130A may be provided in a smartphone connected to the information processing device 140A. As illustrated in FIG. 28, the sound collecting portion 120A may be provided in a television device.

Figure 29:
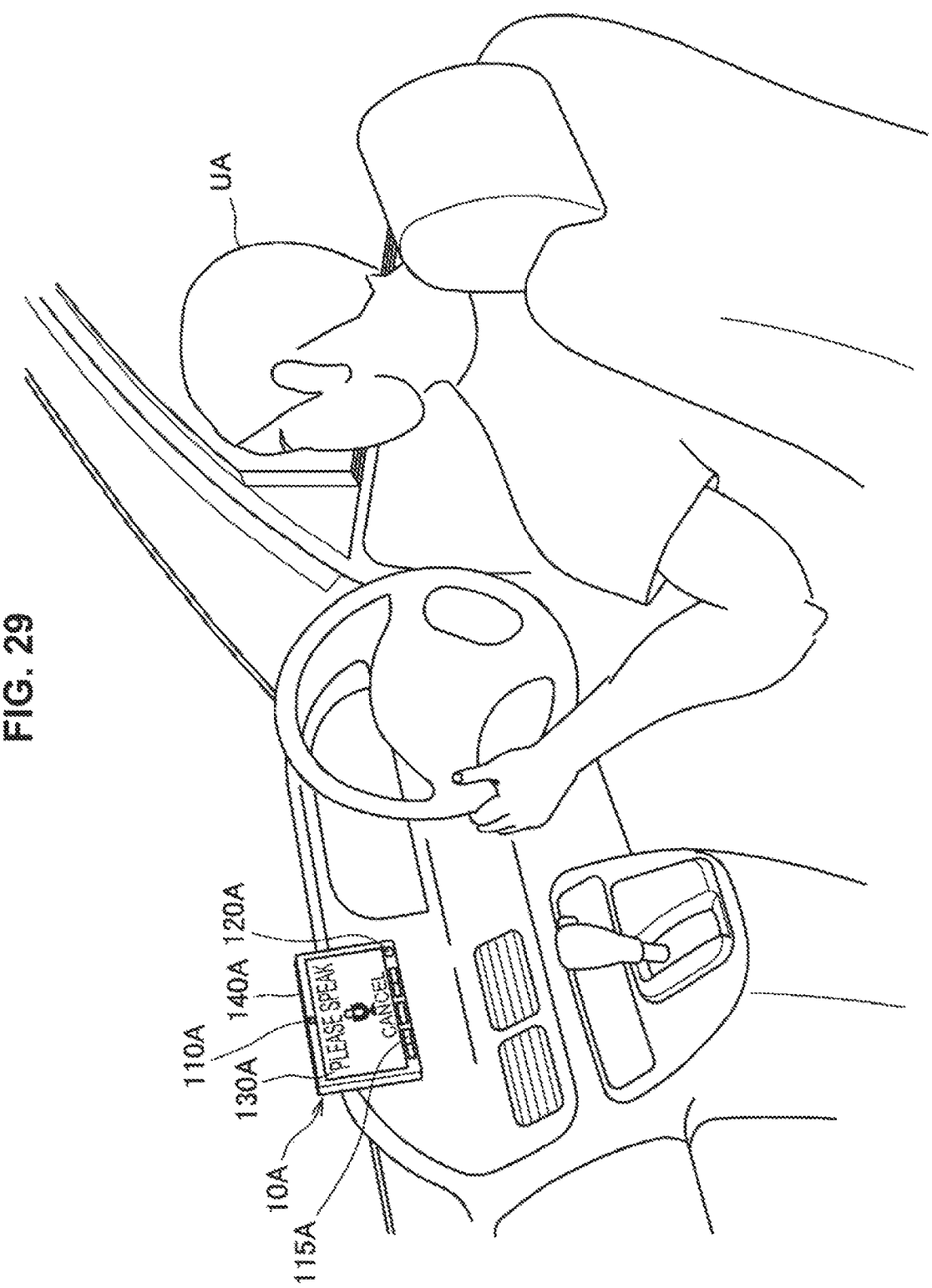
FIG. 29 is a diagram showing a modification example 3 of the configuration of the information processing system.
Figure 30:
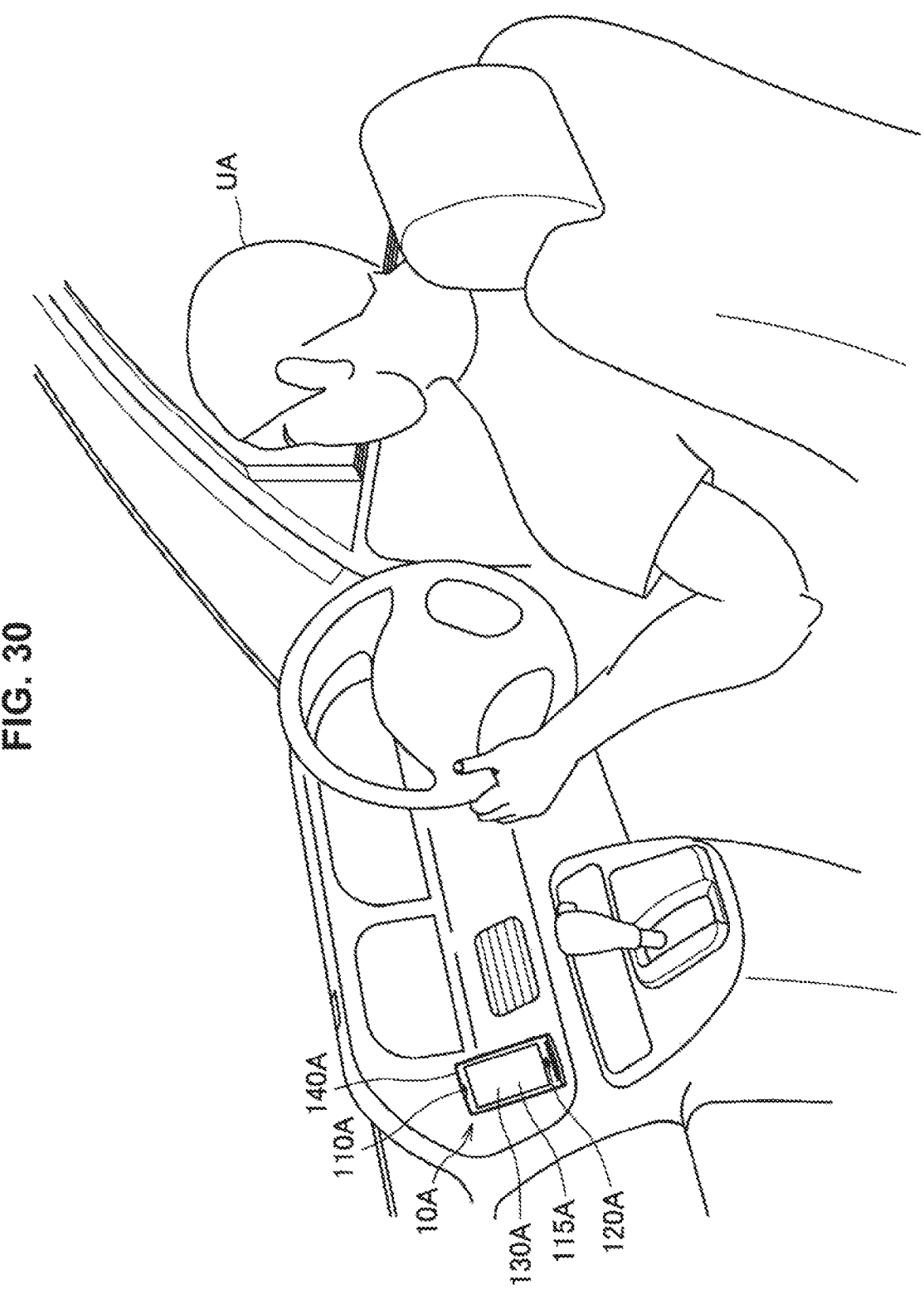
FIG. 30 is a diagram showing the modification example 3 of the configuration of the information processing system.

FIGS. 29 to 32 are diagrams showing modification examples of the configuration of the information processing system 10A. As illustrated in FIG. 29, the information processing system 10A may be installed in an in-vehicle navigation system capable of being attached to a vehicle and may be utilized by a user UA who is driving the vehicle. As illustrated in FIG. 30, the information processing system 10A may be installed in a mobile terminal and may be utilized by the user UA who is driving a vehicle. As described above, the type of mobile terminal is not particularly limited.

Figure 31:
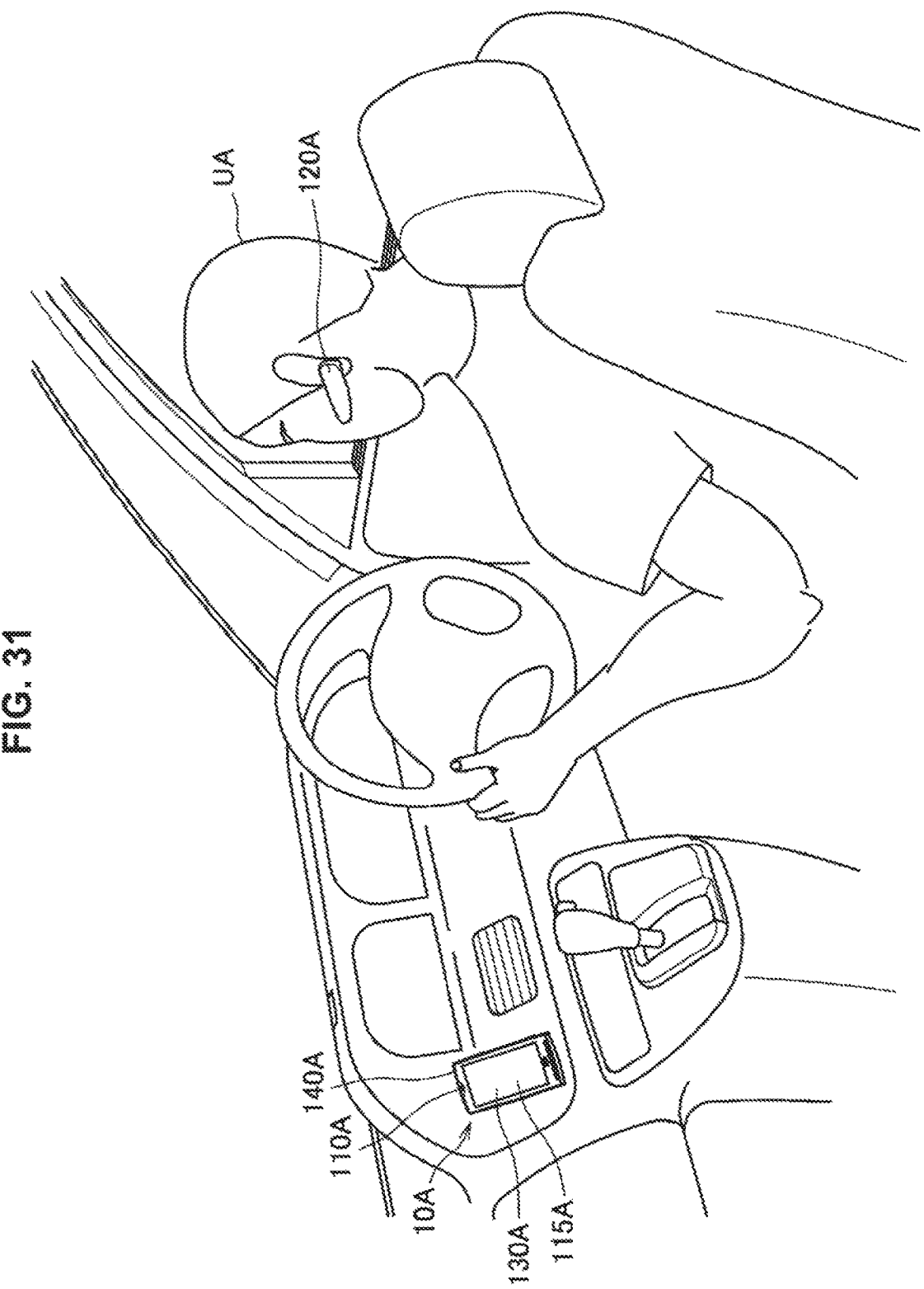
FIG. 31 is a diagram showing the modification example 3 of the configuration of the information processing system.
Figure 32:
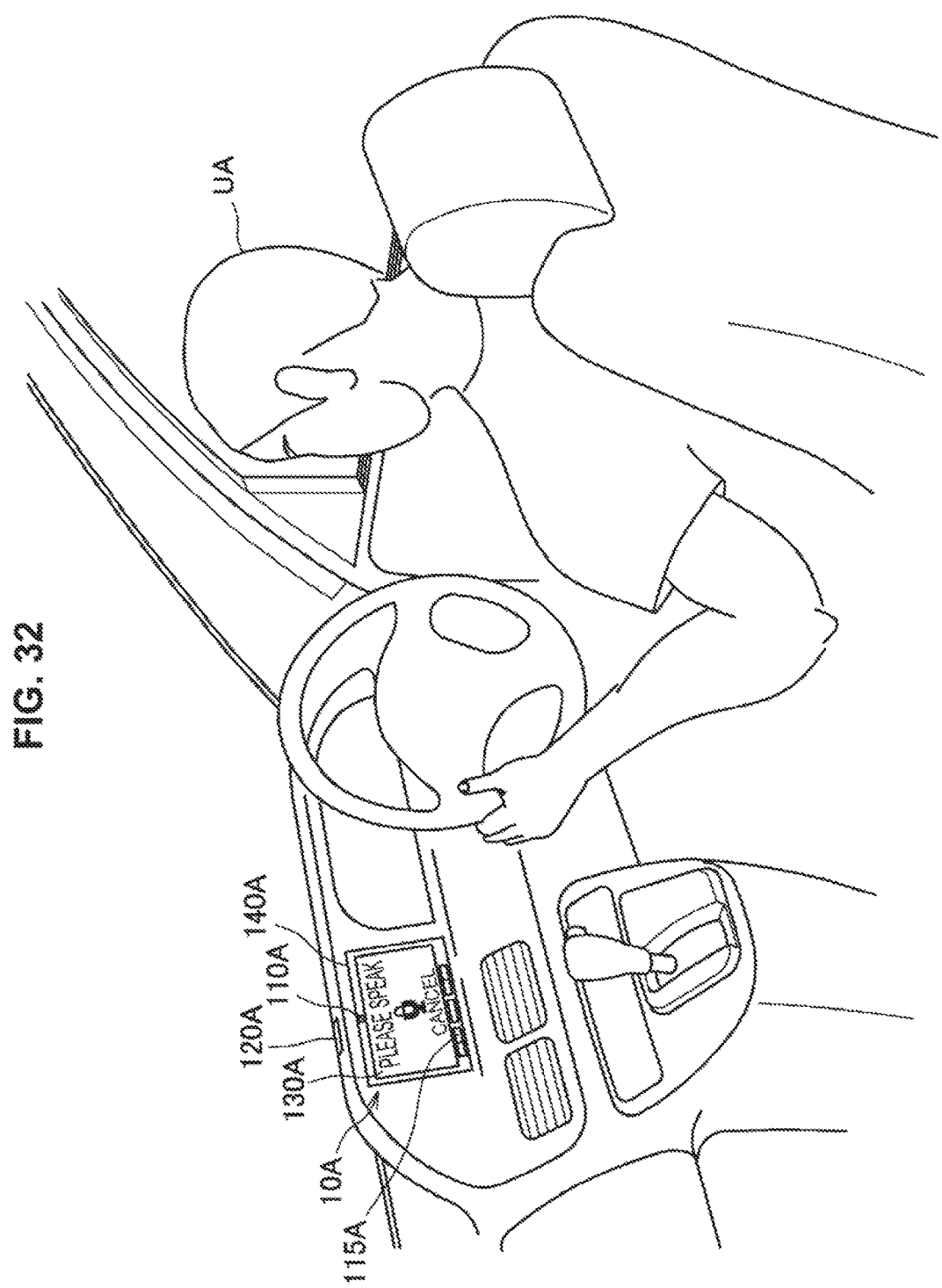
FIG. 32 is a diagram showing the modification example 3 of the configuration of the information processing system.

As illustrated in FIG. 31, the image input portion 110A, the operation input portion 115A, and the output portion 130A in the information processing system 10A may be provided in a mobile terminal, and the sound collecting portion 120A may be a microphone capable of being attached to the body of the user UA. As illustrated in FIG. 32, the information processing system 10A may be installed in an in-vehicle navigation system that is built into a vehicle and may be utilized by the user UA who is driving the vehicle.

[1.5. Hardware Configuration Example]

Figure 33:
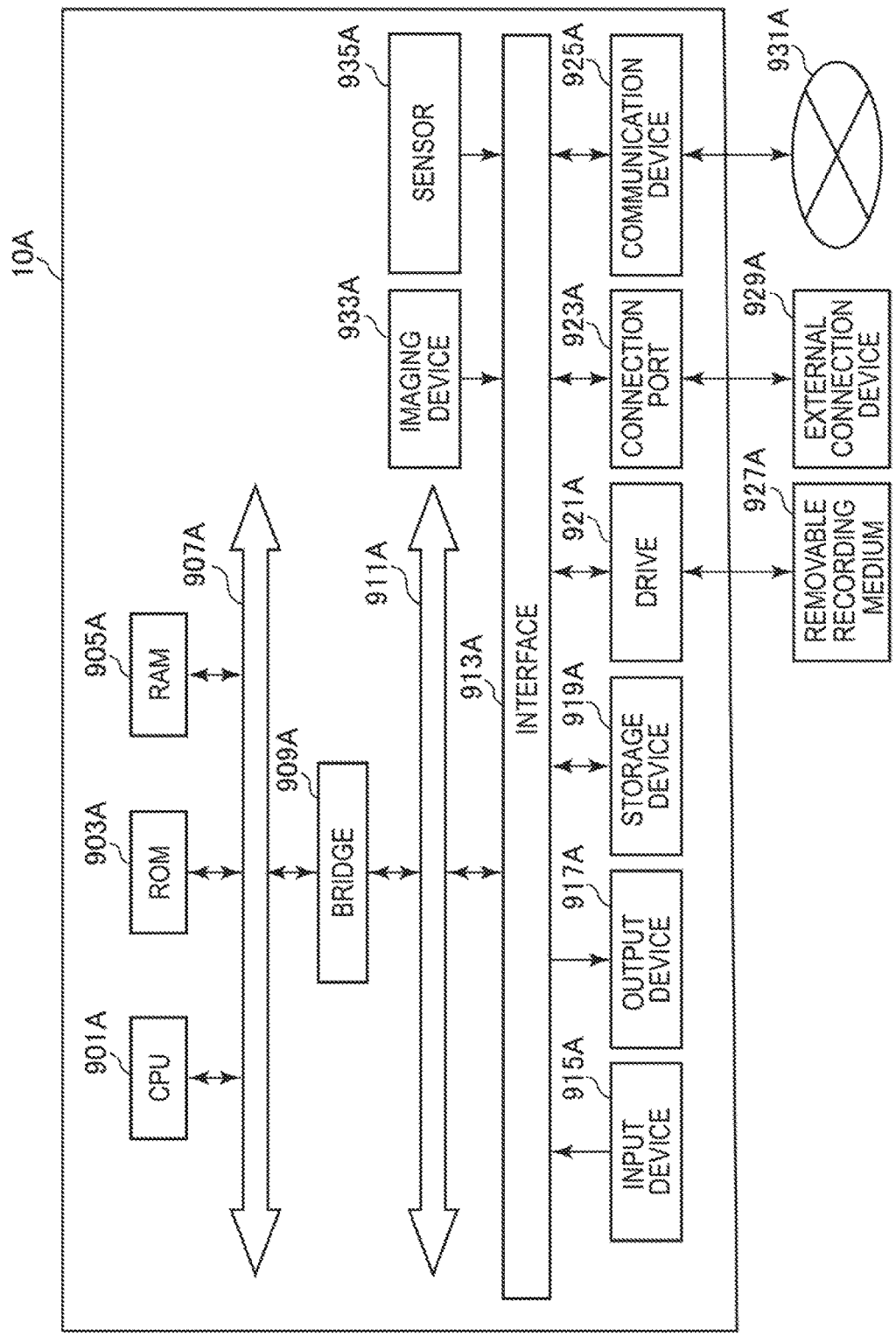
FIG. 33 is a block diagram showing a hardware configuration example of the information processing system.

Next, the hardware configuration of the information processing system 10A according to an embodiment of the present disclosure is described with reference to FIG. 33. FIG. 33 is a block diagram illustrating a hardware configuration example of the information processing system 10A according to an embodiment of the present disclosure.

As illustrated in FIG. 33, the information processing system 10A includes a central processing unit (CPU) 901A, a read only memory (ROM) 903A, and a random access memory (RAM) 905A. In addition, the information processing system 10A may include a host bus 907A, a bridge 909A, an external bus 911A, an interface 913A, an input device 915A, an output device 917A, a storage device 919A, a drive 921A, a connection port 923A, and a communication device 925A. The information processing system 10A may further include an image capturing device 933A and a sensor 935A as necessary. In conjunction with, or in place of, the CPU 901A, the information processing system 10A may have a processing circuit called a digital signal processor (DSP) or application specific integrated circuit (ASICA).

The CPU 901A functions as an arithmetic processing unit and a control device, and controls the overall operation in the information processing system 10A or a part thereof in accordance with various programs recorded in the ROM 903A, the RAM 905A, the storage device 919A, or the removable recording medium 927A. The ROM 903A stores, for example, programs and operation parameters used by the CPU 901A. The RAM 905A temporarily stores, for example, programs to be used in the execution by the CPU 901A and parameters that change as appropriate in executing the programs. The CPU 901A, the ROM 903A, and the RAM 905A are connected with each other via a host bus 907A that is composed of an internal bus such as a CPU bus. Furthermore, the host bus 907A is connected to an external bus 911A such as peripheral component interconnect (PCI)/interface bus via a bridge 909A.

The input device 915A is, for example, a device operated by a user, such as a mouse, a keyboard, a touch panel, a button, a switch, and a lever. The input device 915A may include a microphone for detecting user's voice. The input device 915A may be, for example, a remote control device using infrared rays or other radio waves, or may be an external connection device 929A such as a cellular phone conforming to the operation of the information processing system 10A. The input device 915A includes an input control circuit that generates an input signal on the basis of the information input by the user and outputs it to the CPU 901A. The user inputs various data to the information processing system 10A and instructs the information processing system 10A to perform a processing operation by operating the input device 915A. In addition, the image capturing device 933A, which will be described later, can also function as an input device by capturing the movement of the user's hand or finger, and the like. In this case, the pointing position may be determined depending on the motion of the hand or the orientation of the finger.

The output device 917A is composed of a device capable of notifying visually or audibly the user of the acquired information. The output device 917A may be a display device such as a liquid crystal display (LCD), a plasma display panel (PDP), an organic electro-luminescence (EL) display, and a projector, a hologram display device, an audio output device such as a speaker and a headphone, as well as printer devices or the like. The output device 917A outputs the result obtained by the processing of the information processing system 10A as a video such as a text or an image, or outputs it as audio such as a voice or sound. In addition, the output device 917A may include, for example, a light for lighting up the surroundings.

The storage device 919A is a data storage device configured as an example of a storage portion of the information processing system 10A. The storage device 919A is composed of, for example, a magnetic storage device such as hard disk drives (HDDs), a semiconductor storage device, an optical storage device, and a magneto-optical storage device. The storage device 919A stores programs executed by the CPU 901A, various data, various types of data obtained from the outside, and the like.

The drive 921A is a reader-writer for a removable recording medium 927A such as a magnetic disk, an optical disk, a magneto-optical disk, and a semiconductor memory, and is incorporated in the information processing system 10A or externally attached thereto. The drive 921A reads the information recorded in the attached removable recording medium 927A and outputs it to the RAM 905A. In addition, the drive 921A writes in the attached removable recording medium 927A.

The connection port 923A is a port for directly connecting the device to the information processing system 10A. The connection port 923A may be, for example, a universal serial bus (USB) port, an IEEE 1394 port, or a small computer system interface (SCSI) port. In addition, the connection port 923A may be, for example, an RS-232C port, an optical audio terminal, or high-definition multimedia interface (HDMI, registered trademark) port. The external connection device 929A is connected to the connection port 923A, and thus various kinds of data can be exchanged between the information processing system 10A and the external connection device 929A.

The communication device 925A is, for example, a communication interface composed of a communication device or the like, which is used to be connected to the communication network 931A. The communication device 925A may be, for example, a communication card for wired or wireless local area network (LAN), Bluetooth (registered trademark), or wireless USB (WUSB). In addition, the communication device 925A may be, for example, a router for optical communication, a router for asymmetric digital subscriber line (ADSL), or a modem for various communications. The communication device 925A transmits and receives signals or the like using a predetermined protocol such as TCP/IP, for example, with the Internet or other communication devices. In addition, the communication network 931A connected to the communication device 925A is a network connected by wire or wireless, and is, for example, the Internet, home LAN, infrared communication, radio wave communication, satellite communication, or the like.

The image capturing device 933A captures a real space and generates a captured image, by using an image sensor such as charge-coupled device (CCD) or complementary-metal-oxide semiconductor (CMOS) and various members such as a lens for controlling imaging of a subject image on the image sensor. The image capturing device 933A may capture a still image or a moving image.

The sensor 935A is, for example, various sensors such as an accelerometer, a gyro sensor, a geomagnetic sensor, a photosensor, and a sound sensor. The sensor 935A acquires information on the state of the information processing system 10A itself, such as the attitude of the casing of the information processing system 10A, and information on the surrounding environment of the information processing system 10A such as brightness or noise around the information processing system 10A. The sensor 935A may also include a GPS sensor, which receives global positioning system (GPS) signals and measures the latitude, longitude, and altitude of the device.

The above description is given as to the example of the hardware configuration of the information processing system 10A. Each of the components described above may be configured using a general-purpose member, or may be configured with hardware dedicated to the function of each component. Such a configuration can be changed appropriately depending on the technical level at the time of implementation.

2. CONCLUSION

According to the embodiment of the present disclosure, there is provided the information processing system 10A that includes the output controller 146A that causes the output portion 130A to output the start condition for the speech recognition processing performed by the speech recognition portion 145A on the sound information input from the sound collecting portion 120A, and the output controller 146A dynamically changes the start condition for the speech recognition processing to be output from the output portion 130A as described above. With such a configuration, it is possible to flexibly start the speech recognition processing in accordance with a situation.

With such a configuration, it is possible to allow the user to consider the content of utterance before the speech recognition processing is started. In other words, it is possible to start the speech recognition processing after the user decides the content of utterance. With such a configuration, it is possible to exclude noise and the like included in the collected sound information from the target of the speech recognition processing. Also, it is possible to increase the success rate of the speech recognition processing by presenting the start condition for the speech recognition processing to the user.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Although the system configuration example and the modification examples of the system configuration of the information processing system 10A were described above, for example, the system configuration examples of the information processing system 10A are not limited to these examples. For example, the output portion 130A may be a display provided in a wearable terminal (for example, a watch or glasses) other than a head-mounted display. For example, the output portion 130A may be a display utilized in the field of healthcare.

Furthermore, it is possible to create a program for causing the hardware such as CPU, ROM and RAM incorporated in the computer to execute functions equivalent to those of the information processing device 140A as described above. In addition, a computer-readable recording medium on which the program is recorded can also be provided.

Furthermore, the output controller 146A generates display control information for displaying the display content on the output portion 130A and outputs the generated display control information to the output portion 130A, and thus can control the output portion 130A so that the output portion 130A displays the display content. The contents of the display control information may be changed appropriately in accordance with the system configuration.

Specifically, the program used to implement the information processing device 140A may be, for example, a web application. In such a case, the display control information may be created using markup languages such as hypertext markup language (HTML), standard generalized markup language (SGML), and extensible markup language (XML).

Note that the position of each component is not limited to a particular position as long as the operation of the information processing system 10A described above is performed. In one specific example, the image input portion 110A, the operation input portion 115A, and the sound collecting portion 120A, the output portion 130A, and the information processing device 140A may be provided in different devices connected via a network. In this case, the information processing device 140 corresponds to, for example, a server such as a web server or a cloud server, and the image input portion 110A, the operation input portion 115A, and the sound collecting portion 120A and the output portion 130A may correspond to a client connected to the server via a network.

Further, all the components included in the information processing device 140A may not be accommodated in the same device. For example, a part of the input image acquisition portion 141A, the sound information acquisition portion 142A, the operation detection portion 143A, the recognition controller 144A, the speech recognition portion 145A, and the output controller 146A may be present in a device that is different from the information processing device 140A. For example, the speech recognition portion 145A may be present in a server that is different from the information processing device 140A that includes the input image acquisition portion 141A, the sound information acquisition portion 142A, the operation detection portion 143A, the recognition controller 144A, and the output controller 146A.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing system including:

an output controller that causes an output portion to output a start condition for speech recognition processing to be performed by a speech recognition portion on sound information input from a sound collecting portion, in which the output controller dynamically changes the start condition for the speech recognition processing to be output from the output portion.

(2)

The information processing system according to (1), in which the output controller causes the output portion to output the start condition in a case where an activation trigger of the speech recognition processing is detected.

(3)

The information processing system according to (1) or (2), further including:

a recognition controller that causes the speech recognition portion to start the speech recognition processing in a case where the start condition is satisfied.

(4)

The information processing system according to any one of (1) to (3), in which the output controller stops the output of the start condition in a case where the start condition is satisfied or in a case where an operation of stopping the output of the start condition is detected.

(5)

The information processing system according to (2), in which the output controller dynamically changes the start condition for the speech recognition processing to be output from the output portion on the basis of predetermined information.

(6)

The information processing system according to (5), in which the output controller dynamically changes the start condition to be output from the output portion on the basis of sound information input from the sound collecting portion after the activation trigger is detected.

(7)

The information processing system according to (6), in which the output controller dynamically changes the start condition to be output from the output portion on the basis of first type sound information included in the sound information input from the sound collecting portion.

(8)

The information processing system according to (7), in which the output controller changes the start condition to information related to a user operation required for starting the speech recognition processing in a case where volume of the first type sound information exceeds a first threshold value.

(9)

The information processing system according to (8), in which the output controller changes the start condition to remaining time until the speech recognition processing is started in a case where the volume of the first type sound information is below the first threshold value.

(10)

The information processing system according to (8) or (9), in which the output controller omits causing the output portion to output the start condition in a case where the volume of the first type sound information is below a second threshold value that is less than the first threshold value.

(11)

The information processing system according to any one of (7) to (10), in which the first type sound information includes at least noise.

(12)

The information processing system according to (6), in which the output controller dynamically changes the start condition to be output from the output portion on the basis of past sound information collected during predetermined time before the speech recognition processing is started after the activation trigger has been detected in the past.

(13)

The information processing system according to (12), in which the output controller dynamically changes the start condition to be output from the output portion on the basis of second type sound information included in the past sound information.

(14)

The information processing system according to (13), in which the output controller sets remaining time until the speech recognition processing is started, which is to be output as the start condition, to be longer than remaining time at the time of previous speech recognition processing in a case where volume of the second type sound information exceeds a threshold value.

(15)

The information processing system according to (14), in which the output controller sets the remaining time until the speech recognition processing is started, which is to be output as the start condition, to be shorter than remaining time at the time of previous speech recognition processing in a case where the volume of the second type sound information is below the threshold value.

(16)

The information processing system according to any one of (13) to (15), in which the second type sound information includes at least noise.

(17)

The information processing system according to (1), in which the output controller dynamically changes the start condition to be output from the output portion on the basis of the number of arrival directions of sound information with likelihood of speech exceeding a threshold value to the sound collecting portion.

(18)

The information processing system according to any one of (1) to (17), in which the output controller causes the output portion to output at least one of predetermined display information and predetermined speech information as the start condition.

(19)

The information processing system according to (3), in which the recognition controller starts the speech recognition processing before the start condition is started and causes the speech recognition portion to start the speech recognition processing on sound information after a portion corresponding to a filler is excluded in a case where the start condition is satisfied and the filler is included in a result of the speech recognition processing.

(20)

An information processing method including:

causing an output portion to output a start condition for speech recognition processing performed by a speech recognition portion on sound information input from a sound collecting portion; and dynamically changing, by a processor, the start condition for the speech recognition processing to be output from the output portion.

Next, another embodiment will be described. The description will be given in the following order.

3. Background
4. Embodiment of the present disclosure
4.1. System configuration example
4.2 Functional configuration example
4.3 Functional details of information processing system
4.4 Modification examples of display form
4.5 Modification examples of system configuration
4.6 Hardware configuration example
5. Conclusion

3. BACKGROUND

In recent years, a technology of obtaining recognition results by performing speech recognition processing on information collected by a microphone (hereinafter, also simply referred to as "collected sound information") has existed. For example, a technology of reducing a possibility that an end of collected sound information on which the speech recognition processing is performed becomes short even if a user misses timing for performing a stop operation for stopping the speech recognition processing has been disclosed (see JP 2004-94077A, for example).

Here, a predetermined operation to be executed is executed on the basis of the recognition result of the speech recognition processing performed on the collected sound information. However, it is difficult for the user to recognize timing at which the operation to be executed is started in some cases. Thus, it is desirable to provide a technology of allowing the user to easily recognize the timing at which the operation to be executed is started.

According to the present disclosure, an information processing device that includes an output controller that causes an output portion to output a start condition for starting a predetermined operation to be executed by a speech recognition portion on the basis of a recognition result of speech recognition processing performed by the speech recognition portion on collected sound information collected by a sound collecting portion is provided.

According to the present disclosure, there is provided an information processing method that includes, by a processor, causing an output portion to output a start condition for starting a predetermined operation to be executed by a speech recognition portion on the basis of a recognition result of speech recognition processing performed by the speech recognition portion on collected sound information collected by a sound collecting portion.

According to the present disclosure, a program that causes a computer to function as an information processing device that includes an output controller that causes an output portion to output a start condition for starting a predetermined operation to be executed by a speech recognition portion on the basis of a recognition result of speech recognition processing performed by the speech recognition portion on collected sound information collected by a sound collecting portion is provided.

According to the present disclosure, the technology capable of allowing the user to easily recognize the timing at which the operation to be executed is started is provided as described above. The above effect is not necessarily limitative, and any effects described in the specification or other effects that can be recognized from the specification may be achieved in addition to or instead of the aforementioned effect.

Figure 34:
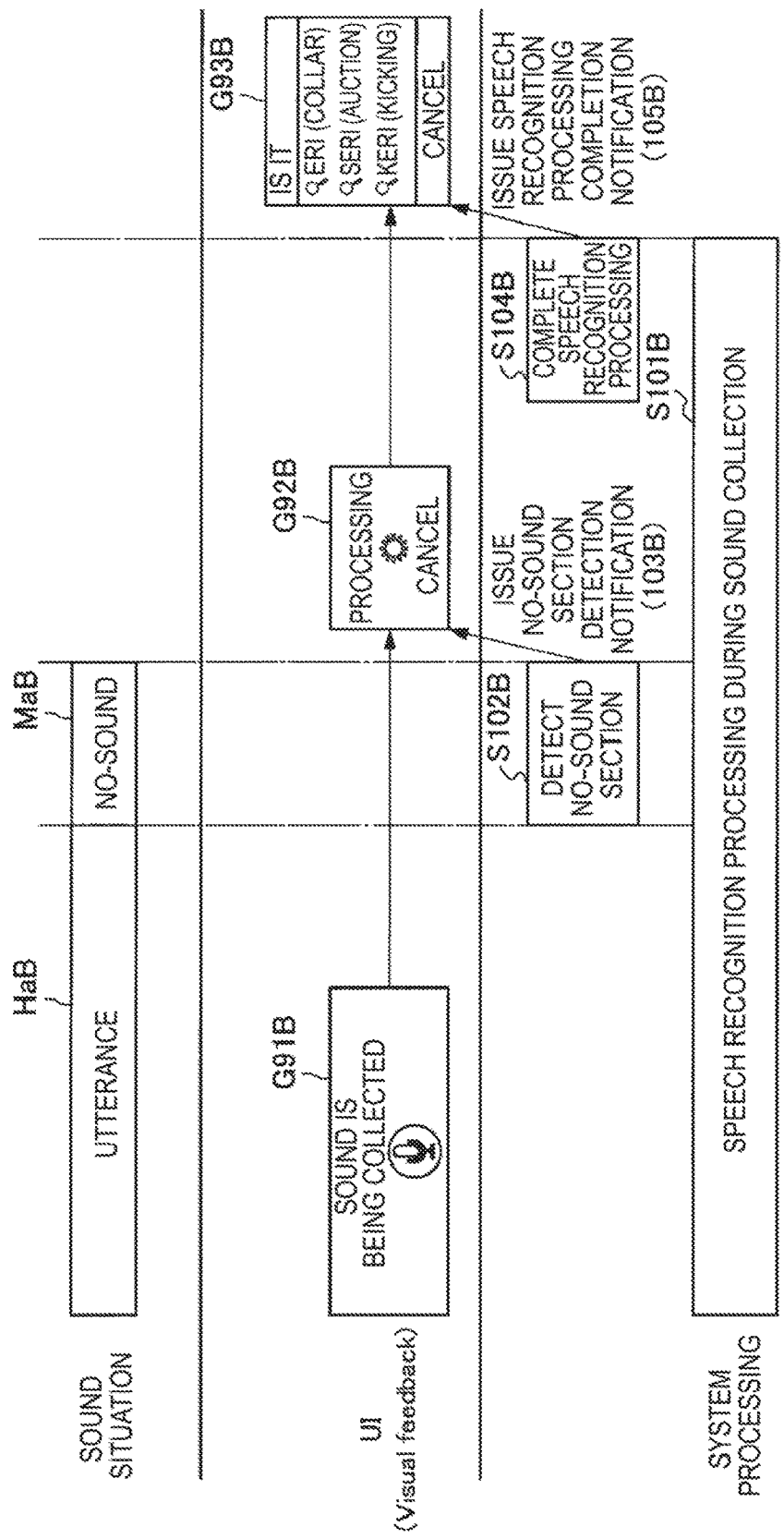
FIG. 34 is a diagram illustrating speech recognition processing in the typical system.

FIG. 34 is a diagram illustrating speech recognition processing in a typical system. In the following description, utterance indicates a state in which the volume of collected sound information exceeds a threshold value. Also, no-sound indicates a state in which sound information with volume below a threshold value is collected.

As illustrated in FIG. 34, speech recognition processing is performed while sound is collected in a typical system (S101B). First, a screen G91B indicating that sound is being corrected is displayed in an utterance section HaB. If a section of duration time, in which volume of the collected sound information is continuously below reference volume after the speech recognition processing is started, reaching predetermined target time (hereinafter, also referred to as a "no-sound section") is detected (S102B), then no-sound section detection notification is issued from the system (S103B). If the no-sound section detection notification is issued, a predetermined operation to be executed is executed on the basis of the recognition result of the speech recognition processing performed on the sound information collected in the utterance section HaB.

Here, the operation to be executed on the basis of the recognition result of the speech recognition processing is not particularly limited. For example, the operation to be executed on the basis of the recognition result of the speech recognition processing may include any one of an operation of outputting a search result in accordance with a character string which is the recognition result, an operation of outputting the character string which is the recognition result, an operation of outputting recognition result candidates obtained in the recognition process of the recognition result, and an operation of outputting a character string for responding to the content of utterance extracted from the character string which is the recognition result. Although a method of extracting the content of utterance from the character string which is the recognition result is not limited, the content of utterance may be extracted by performing natural language processing (for example, language analysis or semantic analysis) on the character string which is the recognition result, for example.

A screen indicating that the processing of the operation to be executed is being performed is displayed during the processing of the operation to be executed. If the speech recognition processing is completed (S104B), then the system issues speech recognition processing completion notification (S105B). If the speech recognition processing completion notification is issued, a screen G93B indicating a result of the operation to be executed is displayed. The screen G93 indicating the result of the operation to be executed includes "eri (collar)", "seri (auction)" and "keri (kicking)" as search results in accordance with a character string which is the recognition result.

Figure 35:
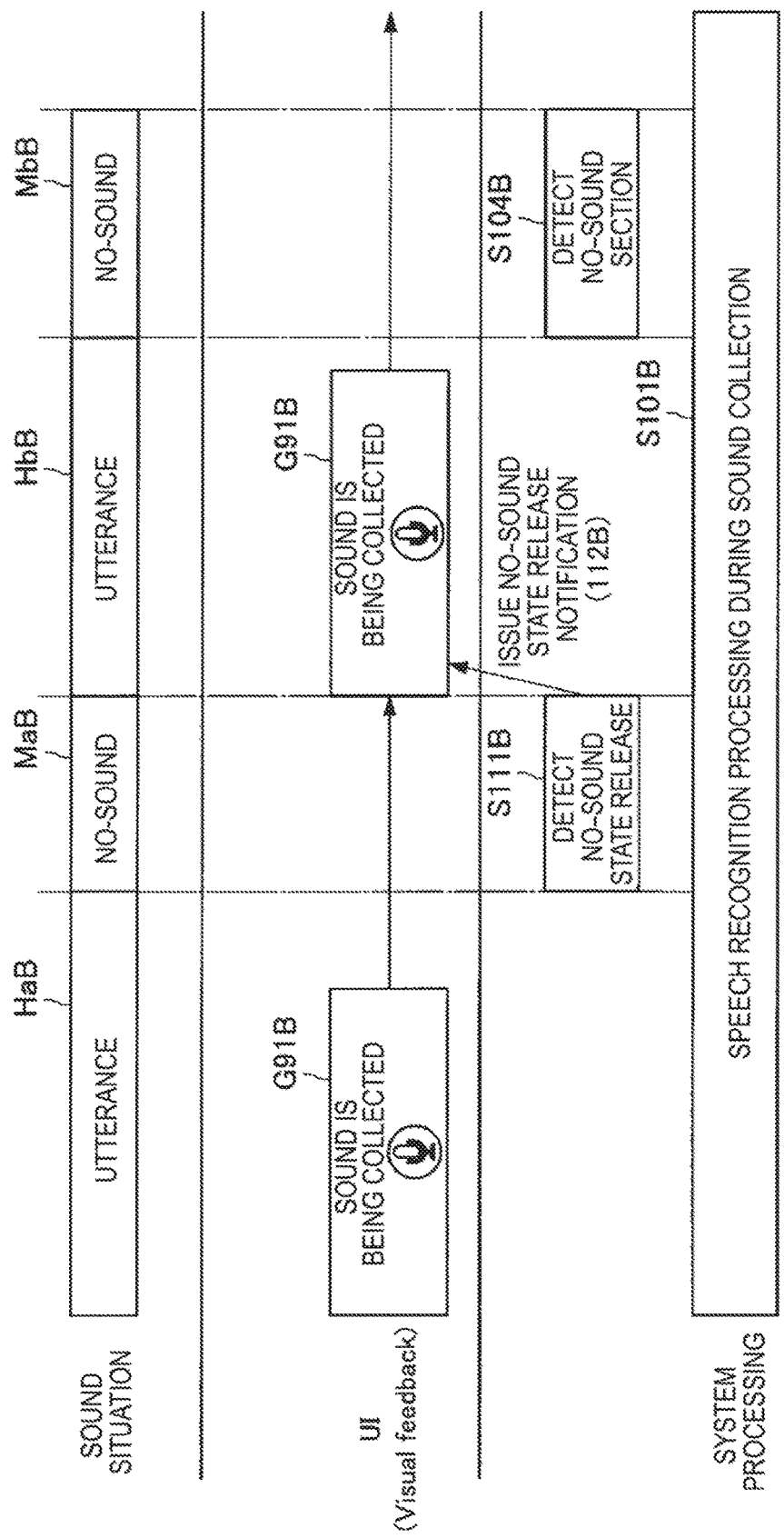
FIG. 35 is another diagram illustrating the speech recognition processing in the typical system.

FIG. 35 is another diagram illustrating speech recognition processing in the typical system. Here, if the screen G91B indicating that the sound is being collected is switched to the screen G92B indicating that the processing of the operation to be executed is being performed as in FIG. 35, the user may not notice the switching in some cases. There is also a case where the operation to be executed is started before speech uttered by the user is actually collected even if the screen G91B indicating that the sound is being collected is displayed when the user is about to start the utterance. Furthermore, there is also a case where it is difficult for the user to recognize the switching timing.

Therefore, there is a case where the user utters (utterance section HbB) even after the no-sound section MaB is detected and the operation to be executed is started as illustrated in FIG. 35. In such a case, opportunity loss in which the speech uttered in the utterance section HbB is not reflected to the operation to be executed can occur although release of the no-sound state is detected (S111B), the no-sound state release notification is issued (S112B), and the screen G91B indicating that sound is being collected is continuously displayed If the user stops the utterance thereafter, a no-sound section MbB is detected (S104B), and the same operation as the operation at the time of detecting the no-sound section is executed.

4. EMBODIMENT OF PRESENT DISCLOSURE

[4.1. System Configuration Example]

Figure 36:
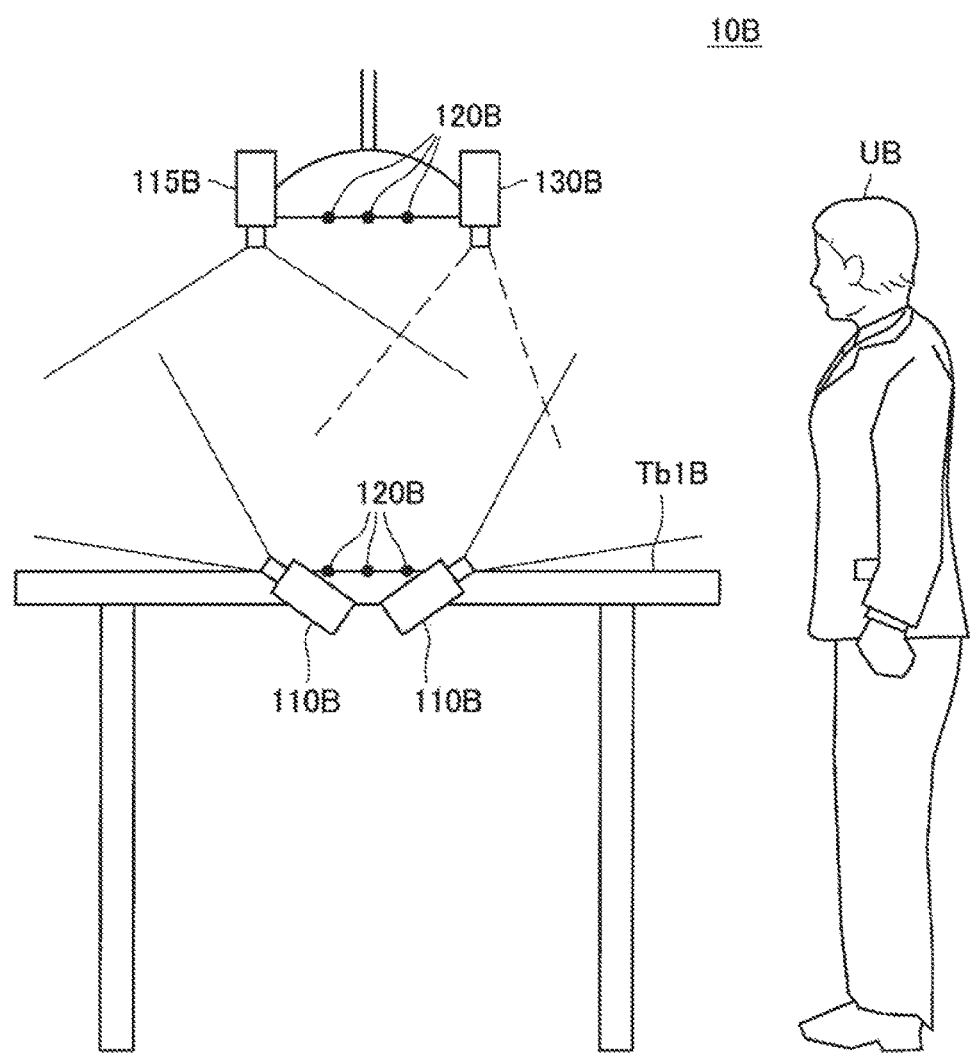
FIG. 36 is a diagram showing a configuration example of the information processing system according to the present disclosure.

Subsequently, a configuration example of an information processing system 10B according to an embodiment of the present disclosure is described with reference to the drawings. FIG. 36 is a diagram illustrating a configuration example of the information processing system 10B according to an embodiment of the present disclosure. As illustrated in FIG. 36, the information processing system 10B according to the embodiment of the present disclosure is configured to include an image input portion 110B, an operation input portion 115B, a sound collecting portion 120B, and an output portion 130B. The information processing system 10B is capable of performing speech recognition processing on the speech uttered by a user UB (hereinafter also simply referred to as "user"). In the following description, voice or speech and sound are distinctly used.

The image input portion 110B has a function of inputting an image. In the example illustrated in FIG. 36, the image input portion 110B includes two cameras embedded in a table TblB. However, the number of cameras included in the image input portion 110B is not limited to the particular number as long as it is one or more. In such a case, the position where each of one or more cameras included in the image input portion 110B is provided is also not limited to a particular position. In addition, one or more cameras may include a monocular camera or a stereo camera.

The operation input portion 115B has a function of inputting an operation of the user U. In the example illustrated in FIG. 36, the operation input portion 115B includes one camera suspended from the ceiling above the table TblB. However, the position at which the camera included in the operation input portion 115B is provided is not limited to a particular position. In addition, the camera may include a monocular camera or a stereo camera. In addition, the operation input portion 115B may be anything other than a camera as long as it has a function of inputting the operation of the user UB, and may be, for example, a touch panel or a hardware button.

The output portion 130B has a function of displaying a screen on the table TblB. In the example illustrated in FIG. 36, the output portion 130B is suspended from the ceiling above the table TblB. However, the position at which the output portion 130B is provided is not limited to a particular position. In addition, the output portion 130B may typically be a projector capable of projecting a screen onto the top surface of the table TblB, but it may be other types of display as long as it has a function of displaying a screen.

Moreover, although the case where the top surface of the table TblB is the display surface of the screen is mainly described herein, the display surface of the screen may be other than the top surface of the table TblB. An example of the display surface of the screen may include a wall, a building, a floor surface, a ground surface, a ceiling, or a surface at other place. In addition, in the case where the output portion 130 has its own display surface, the display surface of the screen may be a display surface of the output portion 130B.

The sound collecting portion 120B has a function of collecting sound. In the example illustrated in FIG. 36, the sound collecting portion 120B includes a total of six microphones, that is, three microphones above the table TblB and three microphones present on the upper surface of the table TblB. However, the number of microphones included in the sound collecting portion 120B is not limited to the particular number as long as it is one or more. In such a case, the position where one or more microphones included in the sound collecting portion 120B are provided is also not limited to a particular position.

However, if the sound collecting portion 120B includes a plurality of microphones, an arrival direction of sound can be estimated on the basis of collected sound information collected by each of the plurality of microphones. If the sound collecting portion 120B includes a microphone with directivity, the arrival direction of sound can be estimated on the basis of collected sound information collected by the microphone with directivity.

The above description is given as to the configuration example of the information processing system 10B according to an embodiment of the present disclosure.

[4.2. Functional Configuration Example]

Figure 37:
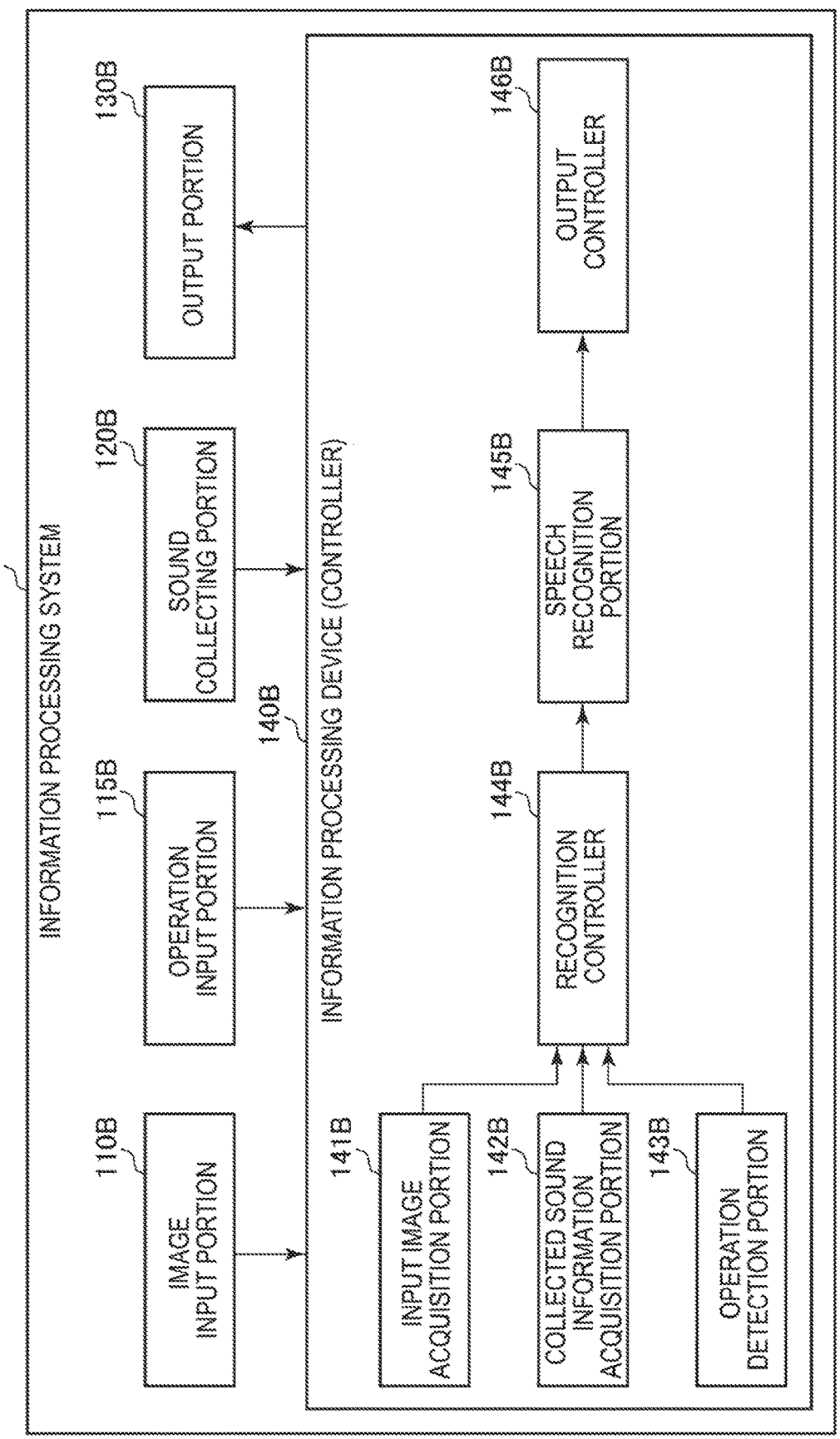
FIG. 37 is a block diagram showing a functional configuration example of the information processing system according to the present disclosure.

Subsequently, a functional configuration example of the information processing system 10B according to an embodiment of the present disclosure is described. FIG. 37 is a block diagram illustrating a functional configuration example of the information processing system 10B according to an embodiment of the present disclosure. As illustrated in FIG. 37, the information processing system 10B according to an embodiment of the present disclosure is configured to include the image input portion 110B, the operation input portion 115B, the sound collecting portion 120B, the output portion 130B, and an information processing device 140B (hereinafter also referred to as "controller 140B").

The information processing device 140B controls each component of the information processing system 10B. In one example, the information processing device 140B generates information to be output from the output portion 130B. In addition, in one example, the information processing device 140B incorporates the information, which is input by each of the image input portion 110B, the operation input portion 115B, and the sound collecting portion 120, in the information to be output from the output portion 130B. As illustrated in FIG. 37, the information processing device 140B includes an input image acquisition portion 141B, a collected sound information acquisition portion 142B, an operation detection portion 143B, a recognition controller 144B, a speech recognition portion 145B, and an output controller 146B. These respective functional blocks will be described later in detail.

Moreover, the information processing device 140B may be composed of, for example, a central processing unit (CPU). In the case where the information processing device 140B is composed of a processing device such as CPU, this processing device can be composed of an electronic circuit.

The above description is given as to the functional configuration example of the information processing system 10B according to an embodiment of the present disclosure.

[4.3 Functional Details of Information Processing System]

Figure 38:
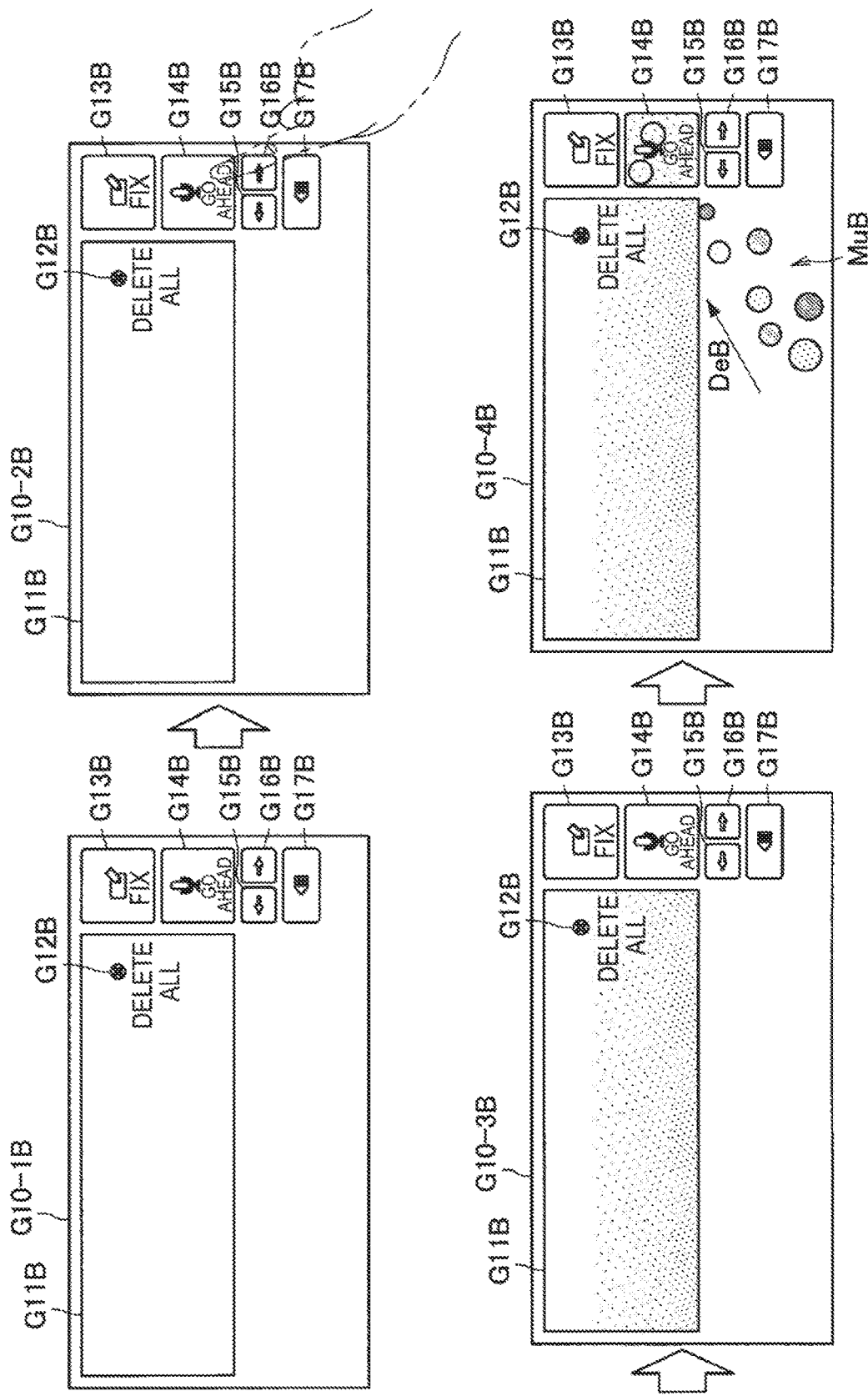
FIG. 38 is a diagram showing an example of a screen transition displayed during execution of the speech recognition process from display of an initial screen.

Next, functional details of the information processing system 10B according to the embodiment of the present disclosure will be described. FIG. 38 is a diagram showing an example of a screen transition that is displayed during execution of speech recognition processing from display of an initial screen. Referring to FIG. 38, the output controller 146B causes an initial screen G10-1B to be displayed. The initial screen G10-1B include a speech recognition start operation object G14B for starting the speech recognition and a recognized character string display section G11B as a display section of a character string acquired by the speech recognition (hereinafter, also referred to as a "recognized character string").

Also, the initial screen G10-1B include an all-deletion operation object G12B for deleting the entirety of the recognized character string and a decision operation object G13B for deciding the recognized character string. Also, the initial screen G10-1B includes a moving operation object G15B for moving a cursor position at the recognized character string backward, a moving operation object G16B for moving the cursor position at the recognized character string forward, and a deletion operation object G17B for deleting a character or a word at the cursor position.

First, the user performs an operation of selecting the speech recognition start operation object G14B as illustrated as the screen G10-2B, and if the operation of selecting the speech recognition start operation object G14B is input through the operation input portion 115B, then the operation is detected by the operation detection portion 143B, and the output controller 146B causes the sound collection start screen G10-3B to be displayed. If the output controller 146B causes the sound collection start screen G10-3B to be displayed, the user starts to utter toward the sound collecting portion 120B.

If the collected sound information collected by the sound collecting portion 120B is acquired by the collected sound information acquisition portion 142B, the output controller 146B causes a predetermined object (hereinafter, also referred to as a "display object") MuB to be displayed as illustrated as a screen G10-4B during the sound collection. The display object MuB may remain stationary or may have movement as illustrated as the screen G10-4B. When the display object MuB has movement, for example, a moving direction DeB of the display object MuB may depend on an arrival direction of voice of utterance by the user from a sound source to the sound collecting portion 120B. A method of estimating the arrival direction of the voice of utterance by the user is also not particularly limited.

For example, the recognition controller 144B may estimate one arrival direction that coincides with or is similar to a direction of a finger of the user (a direction from the root to the tip of the finger, for example) who has performed the operation of selecting the speech recognition start operation object G14B as the arrival direction of the voice of utterance by the user. A range of similarity may be determined in advance. The direction of the finger may be acquired by analyzing an input image.

Alternatively, the recognition controller 144B may estimate an arrival direction of sound input by the sound collecting portion 120B as the arrival direction of the voice of utterance by the user. If there are a plurality of arrival directions of sound, an arrival direction of sound initially input from among the plurality of arrival directions may be estimated as the arrival direction of the voice of utterance by the user, or one arrival direction that coincides with or is similar to the direction of the finger of the user who has performed the operation of selecting the speech recognition start operation object G14B from among the plurality of arrival directions may be estimated as the arrival direction of the voice of utterance by the user.

Alternatively, the recognition controller 144B may estimate an arrival direction of sound with the largest volume input by the sound collecting portion 120B from among the plurality of arrival directions as the arrival direction of the voice of utterance by the user. In this manner, the arrival direction of the voice of utterance by the user can be estimated. In contrast, the recognition controller 144B may acquire, as noise, sound input by the sound collecting portion 120B from directions other than the arrival direction of the voice of utterance by the user.

In addition, FIG. 38 illustrates an example in which the output controller 146B moves the display objects MuB in the arrival direction (moving direction DeB) of the voice of utterance by the user. In this manner, the user can intuitively recognize that the voice of utterance by the user themselves is being collected by the sound collecting portion 120B. However, the movement of the display objects MuB is not limited to such movement. FIG. 38 illustrates an example in which the destination of the display objects MuB is the speech recognition start operation object G14B. However, the destination of the display objects MuB is not limited to such an example.

In addition, although FIG. 38 illustrates the example in which the output controller 146B causes the circular display objects MuB that have appeared one after another to be moved in accordance with the sound collection performed by the sound collecting portion 120B, the display state of the display objects MuB is not limited to such an example. For example, the output controller 146B may control various parameters of the display objects MuB on the basis of predetermined information (likeliness of speech of the collected sound information and volume, for example) in accordance with the collected sound information. The collected sound information used at this time may be collected sound information from the arrival direction of the voice of utterance by the user. The parameters of the display objects MuB may include at least any one of the shape, the transparency, the color, the size, and the motion of the display objects MuB.

Note that a method of evaluating the likelihood of speech in the collected sound information is not particularly limited. For example, it is also possible to employ a method described in a patent literature (JP 2010-38943A) as the method of evaluating the likelihood of speech in the collected sound information. In addition, for example, it is also possible to employ a method described in a patent literature (JP 2007-328228A) as the method of evaluating the likelihood of speech in the collected sound information. Although an example in which the evaluation of the likelihood of speech is performed by the output controller 146 will be described herein, the evaluation of the likelihood of speech may be performed by a server which is not illustrated in the drawing.

The recognition controller 144B causes the speech recognition portion 145 to start speech recognition for the collected sound information acquired by the collected sound information acquisition portion 142B. Timing at which the speech recognition is started is not limited. For example, the recognition controller 144B may cause the speech recognition portion 145B to start the speech recognition for the collected sound information corresponding to the display objects MuB after the display objects MuB arrive the speech recognition start operation object G14B.

Figure 39:
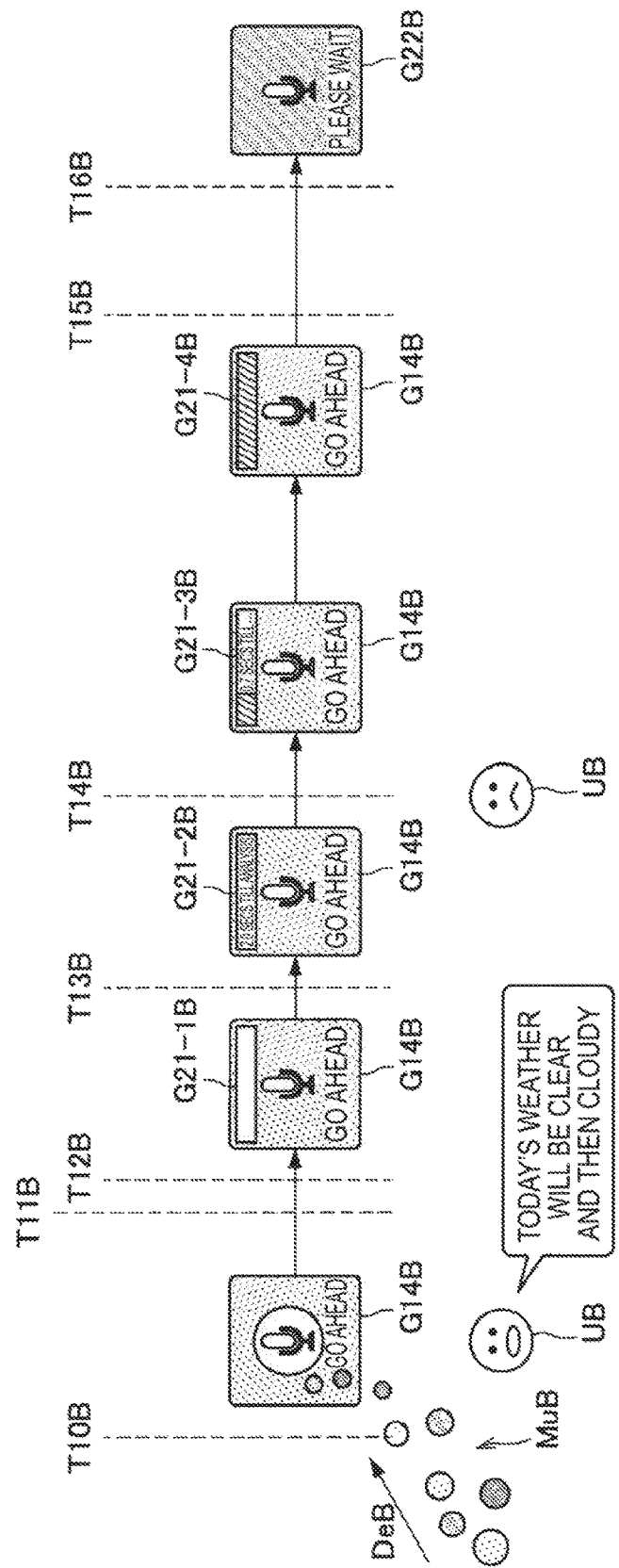
FIG. 39 is a diagram illustrating functional details of the information processing system according to the embodiment of the present disclosure.

The example of the screen transition displayed during the execution of the speech recognition processing from the display of the initial screen was described hitherto. FIG. 39 is a diagram illustrating functional details of the information processing system 10B according to the embodiment of the present disclosure. As illustrated in FIG. 39, if the user starts utterance and sound information with likelihood of speech exceeding a predetermined threshold value is collected, the speech recognition processing is started, and the output controller 146B displays the display object MuB (time T10B).

If the user completes the utterance (time T11B) and no-sound is detected, the output controller 146B causes the output portion 130B to output the start of the duration time (for example, a timeout bar G21-1B) (time T12B). Then, the output controller 146B causes the output portion 130B to output the start condition for starting the operation to be executed by the speech recognition portion 145B (time T13B). With such a configuration, it is possible to allow the user to easily recognize the timing at which the operation to be executed is started.

As the start condition, information related to remaining time until the no-sound duration time reaches target time may be displayed. The information related to the remaining time may include a display object (timeout bar G21-2B) indicating a rate of the remaining time with respect to the target time as illustrated in FIG. 39. Alternatively, the information related to the remaining time may include the remaining time itself. Alternatively, the start condition may include information related to a user operation required for starting the operation to be executed.

Subsequently, if newly collected sound information with volume exceeding reference volume is not collected before the no-sound duration time reaches the target time, the output controller 146B updates the start condition as illustrated in a timeout bar G21-3B (time T14B). At this time, likelihood of speech may be taken into consideration. That is, if newly collected sound information with likelihood of speech exceeding predetermined likelihood of speech is not collected before the no-sound duration time reaches the target time, the output controller 146B may update the start condition.

If the no-sound duration time reaches the target time (the start condition is satisfied), the output controller 146B stops the output of the start condition (timeout bar G21-4B) by the output portion 130B (time T15B) and causes the output portion 130B to output the fact that the no-sound duration time has reached the target time (time T16B). In the example illustrated in FIG. 39, "Please wait" is displayed in the speech recognition start operation object G22B. The recognition controller 144B causes the speech recognition portion 145B to perform the speech recognition processing, and causes the speech recognition portion 145B to start the operation to be executed if the no-sound duration time reaches the target time.

Figure 40:
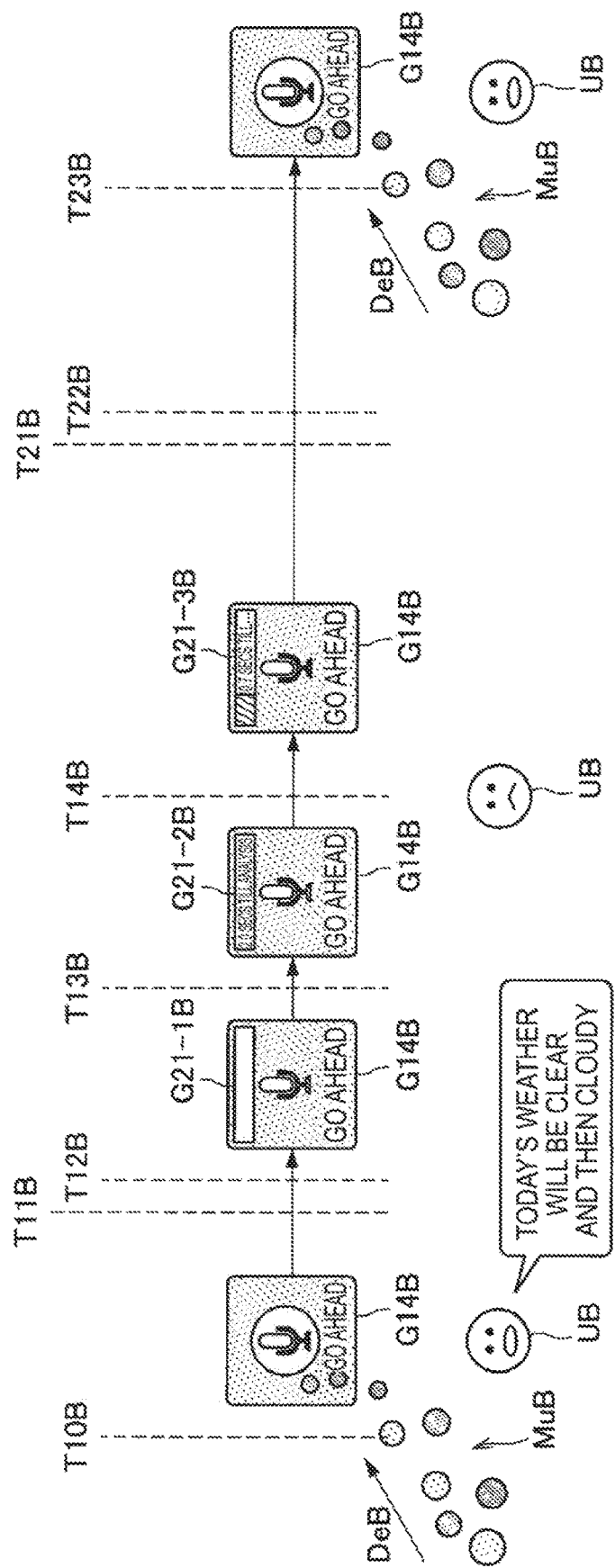
FIG. 40 is another diagram illustrating the functional details of the information processing system according to the embodiment of the present disclosure.

FIG. 40 is another diagram illustrating functional details of the information processing system 10B according to the embodiment of the present disclosure. The example illustrated in FIG. 40 is different from the example illustrated in FIG. 39 in that newly collected sound information with volume exceeding reference volume is collected before the no-sound duration time reaches the target time. As illustrated in FIG. 40, the user restarts utterance (time T21B), and if newly sound information with volume exceeding the reference volume is collected before the no-sound duration time reaches the target time (time T22B), the output controller 146B stops the output of the start condition (timeout bar G21-3B).

The likelihood of speech may be taken into consideration. That is, if newly collected sound information with likelihood of speech exceeding predetermined likelihood of speech is collected before the no-sound duration time reaches the target time, the output controller 146B may stops the output of the start condition (timeout bar G21-3B). If the speech recognition processing is restarted (time T23B), the output controller 146B displays the display object MuB.

If the target time is shorter than the predetermined reference time, the output controller 146B may not cause the output portion 130B to output the start condition. The output controller 146B may control the length of the remaining time in accordance with the amount of the recognition result. For example, it is considered that a large amount of a result of the speech recognition processing is less suitable for the operation to be executed on the basis of the recognition result of the speech recognition processing. Therefore, the output controller 146B may shorten the length of the remaining time as the result of the speech recognition processing increases.

Figure 41:
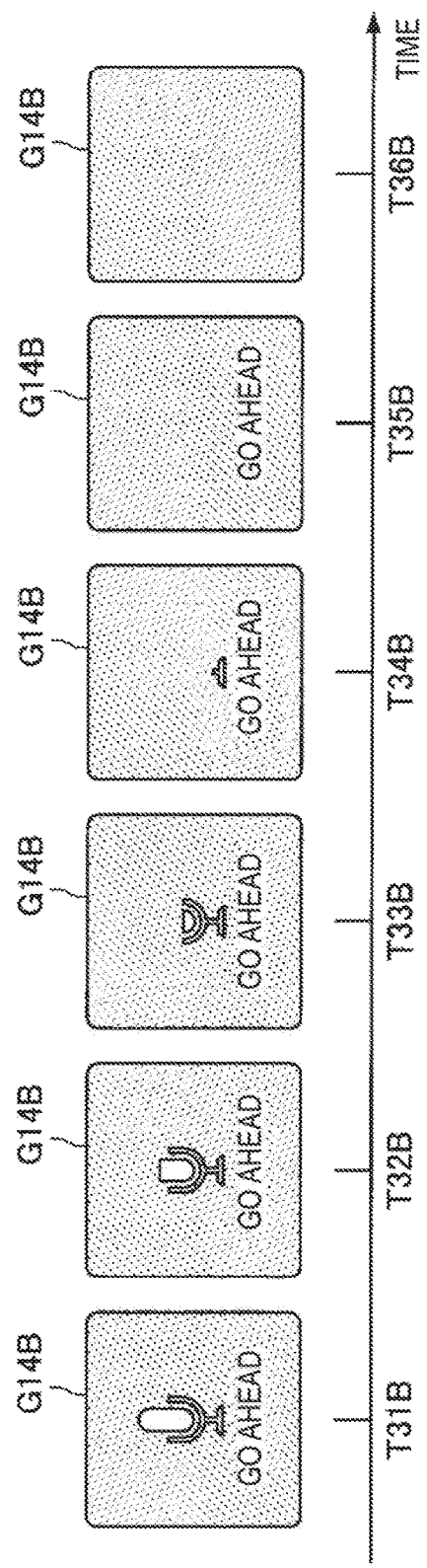
FIG. 41 is a diagram showing an example in which the output portion is made to output the display information as the start condition.
Figure 42:
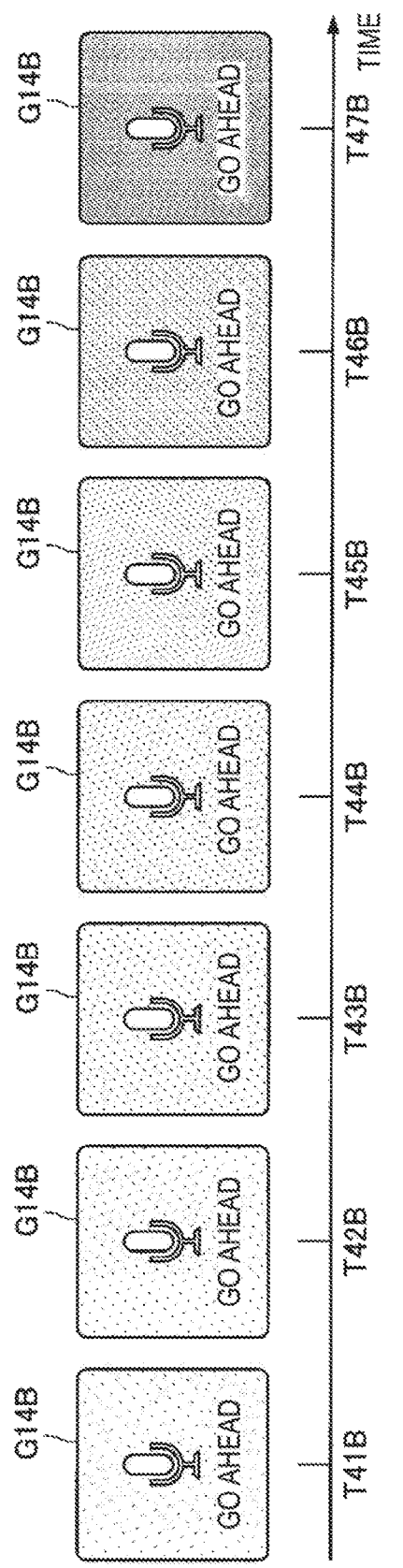
FIG. 42 is a diagram showing an example in which the output portion is made to output the display information as the start condition.

The output controller 146B may cause the output portion 130B to output predetermined display information as the start condition. FIGS. 41 and 42 are diagrams showing examples in which the output portion 130B is made to output display information as the start condition. FIG. 41 shows an example in which content of display included in the speech recognition start operation object G14B is slowly deleted. FIG. 42 shows an example in which the color of the speech recognition start operation object G14B is slowly changed.

Figure 43:
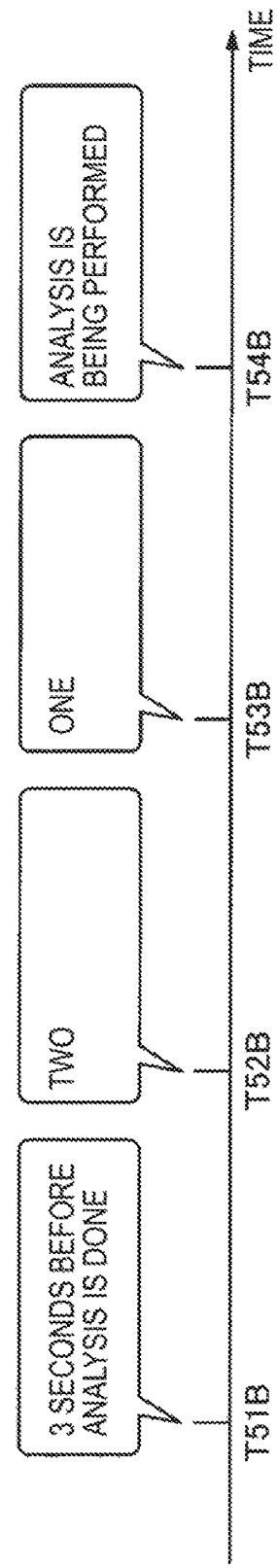
FIG. 43 is a diagram showing an example in which the output portion is made to output the speech information as the start condition.
Figure 44:
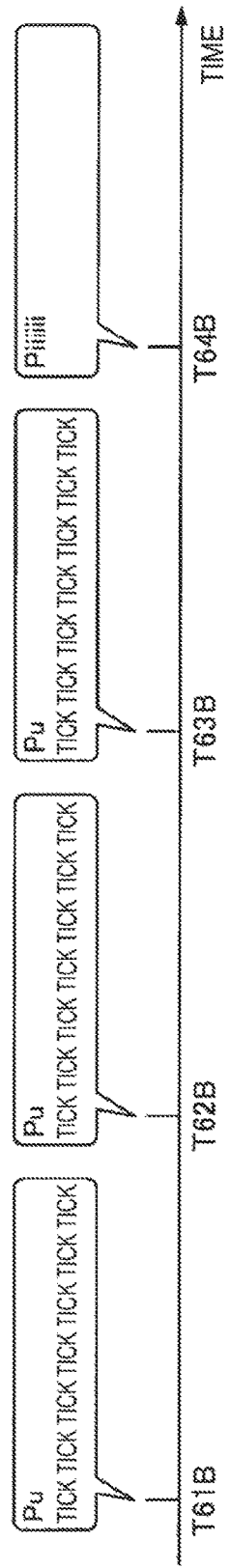
FIG. 44 is a diagram showing an example in which the output portion is made to output the speech information as the start condition.

The output controller 146B may cause the output portion 130B to output predetermined display information as the start condition. FIGS. 43 and 44 are diagrams showing examples in which the output portion 130B is made to output speech information as the start condition. FIG. 43 shows an example in which speech information indicating start timing (time T54B) of the speech recognition processing is output from time T51B to time T54B. FIG. 44 shows an example in which speech information indicating start timing (time T64B) of the speech recognition processing is output from time T61B to time T64B.

The functional details of the information processing system 10B according to the embodiment of the present disclosure were described hitherto.

Figure 45:
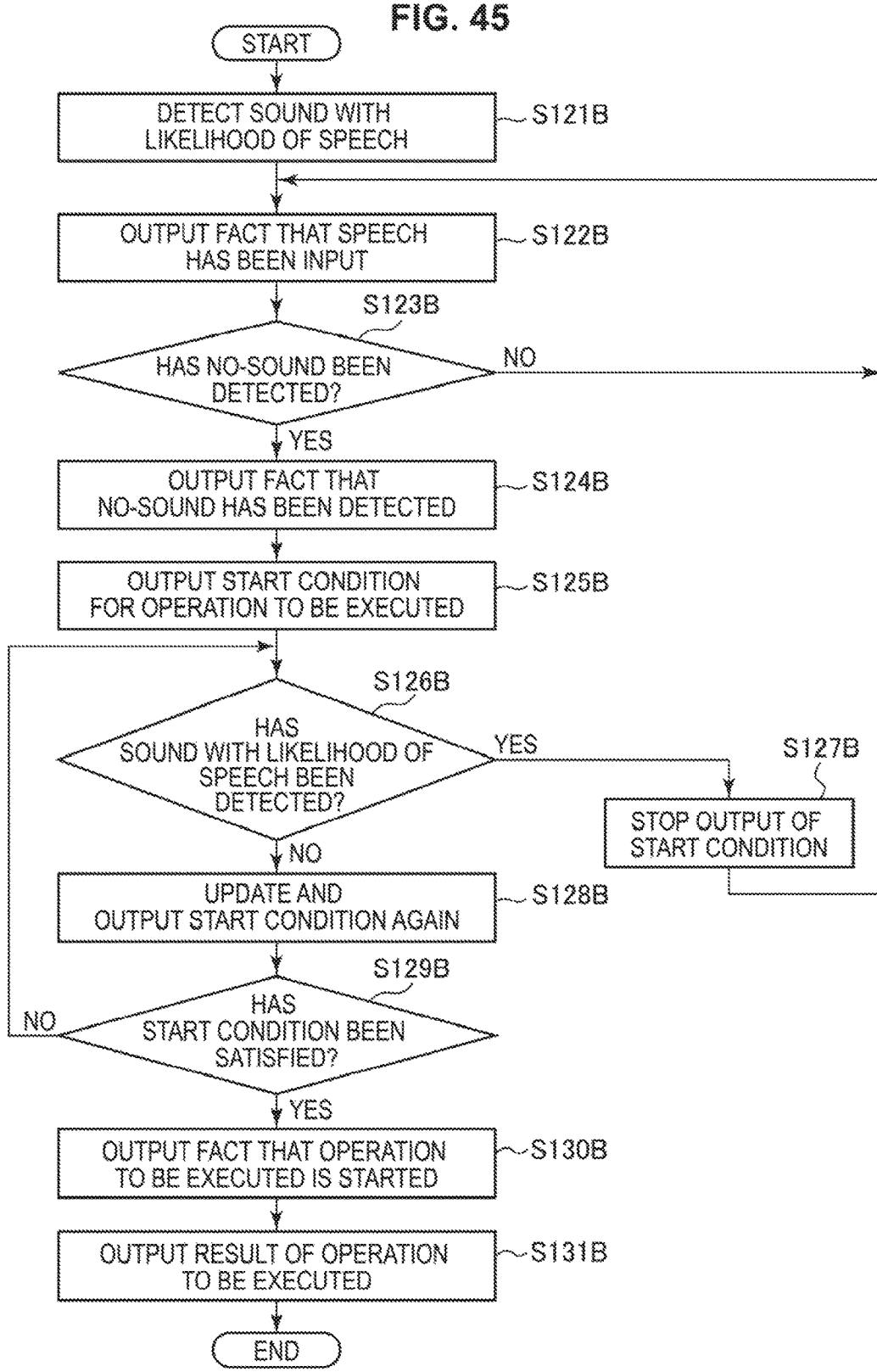
FIG. 45 is a flowchart showing an example of an overall flow of operations of the information processing system according to the embodiment of the present disclosure.

Subsequently, an overall flow of operations of the information processing system 10B according to the embodiment of the present disclosure will be described. FIG. 45 is a flowchart illustrating an example of an overall flow of operations of the information processing system 10B according to the embodiment of the present disclosure. The flowchart of FIG. 45 illustrates only an example of the overall flow of the operations of the information processing system 10B according to the embodiment of the present disclosure, the entire flow of the operations of the information processing system 10B according to the embodiment of the present disclosure is not limited to the example illustrated in the flowchart in FIG. 45.

First, if sound with likelihood of speech is detected (S121B), the output controller 146B outputs the fact that speech has been input (S122B). The output controller 146B moves onto the operation in S122B if no-sound is detected ("No" in S123B), or outputs detection of the no-sound (S124B) and outputs the start condition for the operation to be executed (S125B) if the no-sound is detected ("Yes" in S123).

Subsequently, the output controller 146B stops the output of the start condition (S127B) and moves on to the operation in S128B if sound with likelihood of speech is detected ("Yes" in S126B), or updates the start condition and outputs the start condition again (S128B) if sound with likelihood of speech is not detected ("No" in S126B). Subsequently, the output controller 146B moves on to the operation in S126B if the start condition is not satisfied ("No" in S129B) or outputs the fact that the operation to be executed is started (S130B) and outputs the result of the operation to be executed (S131B) if the start condition is satisfied ("Yes" in S129B).

The overall flow of operations of the information processing system 10B was described hitherto.

[4.4. Modified Example of Display Form]

Figure 46:
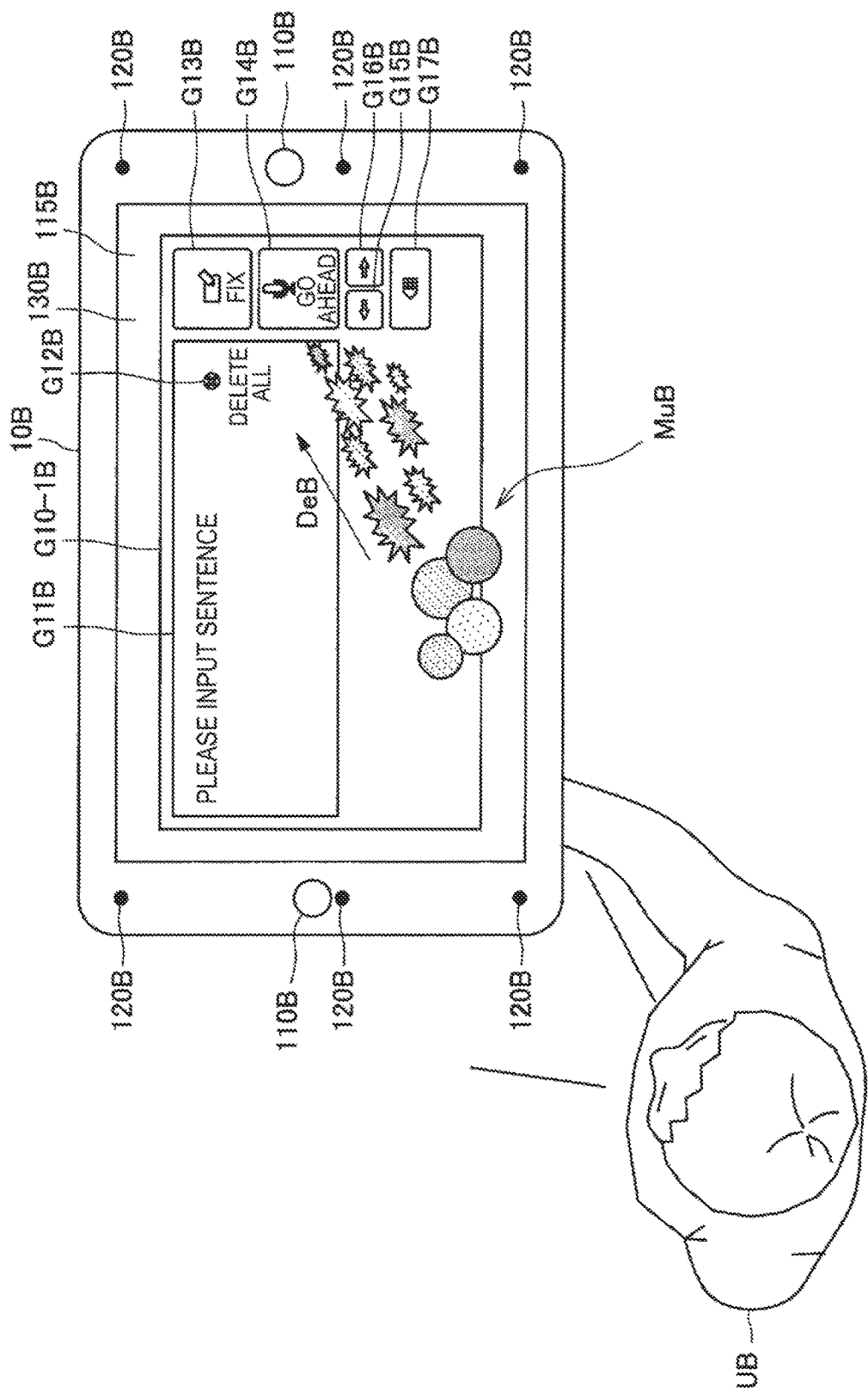
FIG. 46 is a diagram showing a modification example of a display form of the output portion.

The above description is given as to the example in which the output portion 130B is a projector capable of projecting a screen onto the top surface of the table TblB. However, the display form of the output portion 130B is not limited to this example. Hereinafter, a modification example of the display form of the output portion 130B will be described. FIG. 46 is a diagram illustrating a modified example of the display form of the output portion 130B. As illustrated in FIG. 46, in the case where the information processing system 10B is a mobile terminal, the output portion 130B may be provided in the mobile terminal. The type of the mobile terminal is not limited to a particular type, and it may be a tablet terminal, a smartphone, or a cellular phone.

[4.5. Modification Examples of System Configuration]

The example in which the output portion 130B was a projector capable of projecting a screen on a top surface onto the top surface of the table TblB was described hitherto. However, the configuration of the information processing system 10B is not limited to such an example. FIGS. 47 to 50 are diagrams showing a modification example 1 of the system configuration of the information processing system 10B. As illustrated in FIGS. 47 to 50, the output portion 130B may be a television device, the information processing device 140B may be a game console, and the operation input portion 115B may be controller for operating the game console.

Figure 47:
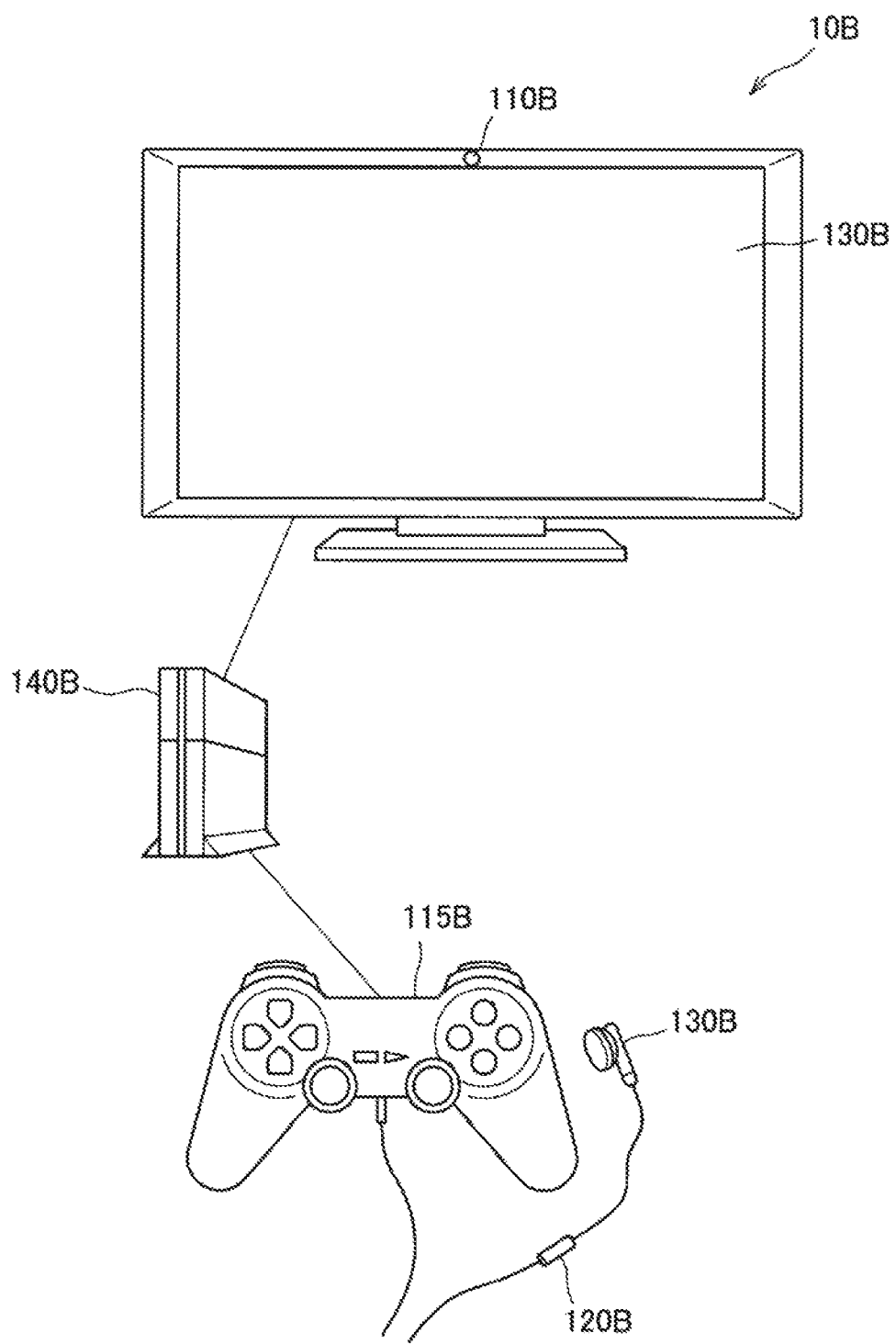
FIG. 47 is a flowchart showing an example of an overall flow of operations of the information processing system according to the embodiment of the present disclosure.
Figure 48:
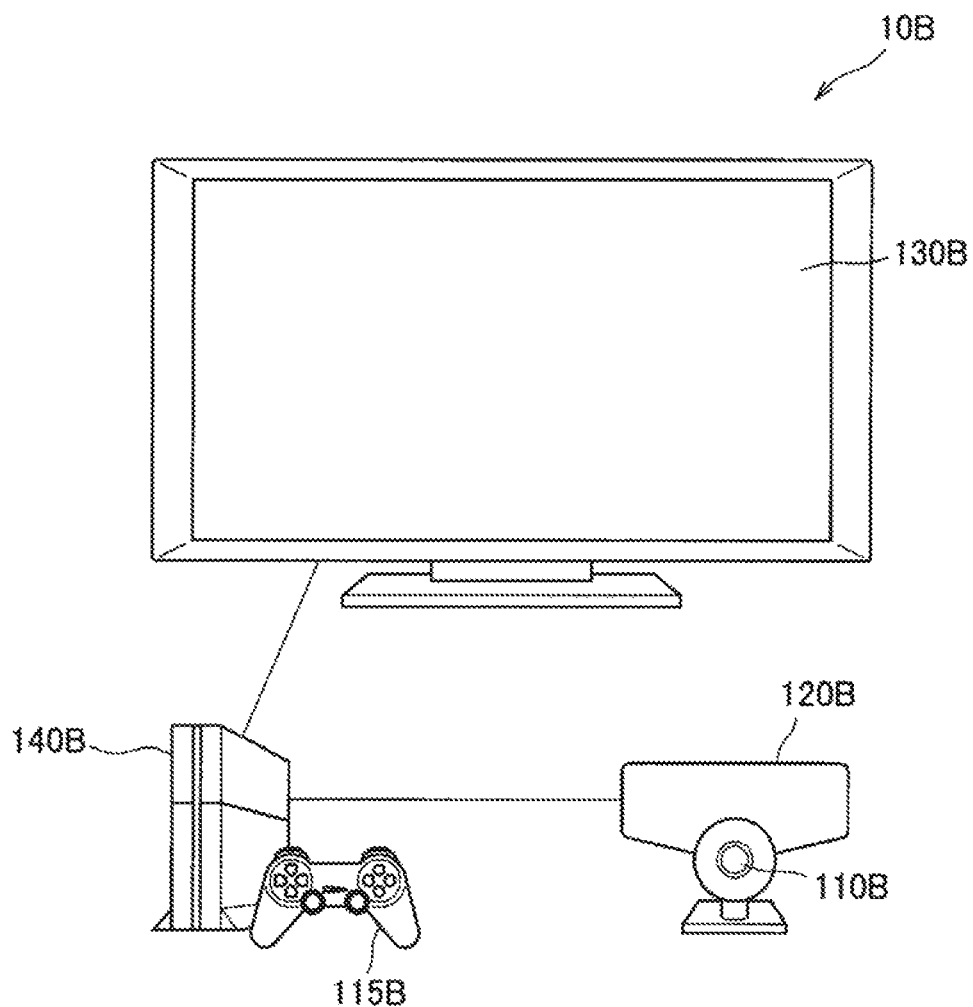
FIG. 48 is a diagram showing a modification example of a system configuration of the information processing system.
Figure 49:
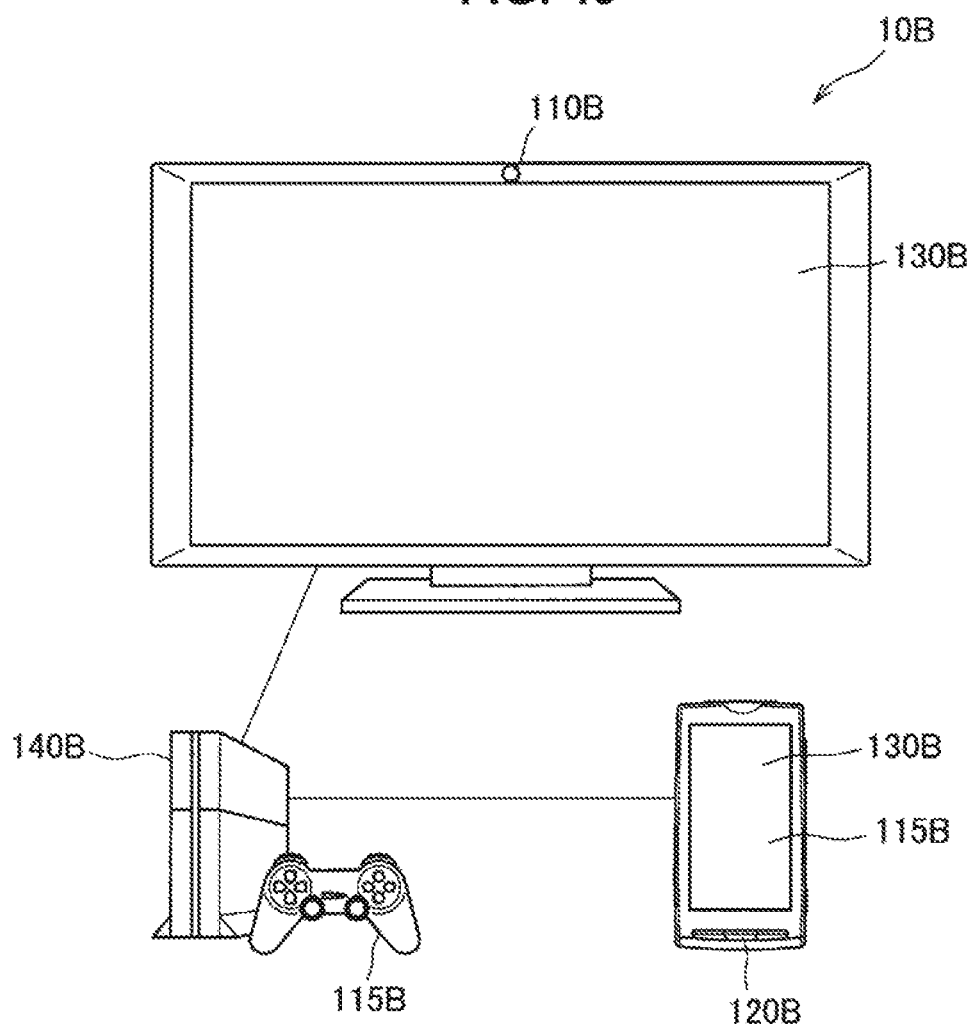
FIG. 49 is a diagram showing a modification example of a system configuration of the information processing system.
Figure 50:
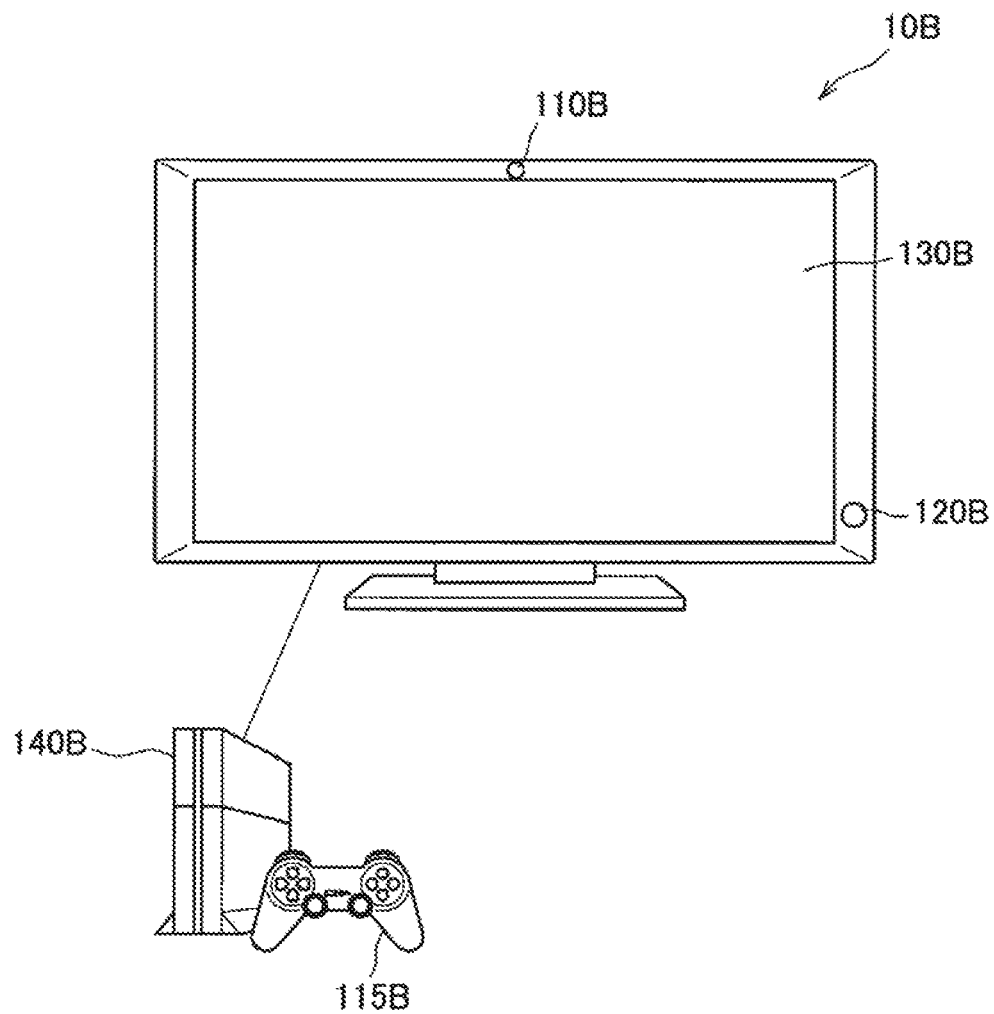
FIG. 50 is a diagram showing a modification example of a system configuration of the information processing system.

As illustrated in FIG. 47, the sound collecting portion 120B and the output portion 130B may be connected to the operation input portion 115B. As illustrated in FIG. 48, the image input portion 110B and the sound collecting portion 120B may be connected to the information processing device 140B. As illustrated in FIG. 49, the operation input portion 115B, the sound collecting portion 120B, and the output portion 130B may be provided in a smartphone connected to the information processing device 140B. As illustrated in FIG. 50, the sound collecting portion 120B may be provided in a television device.

[4.6. Hardware Configuration Example]

Figure 51:
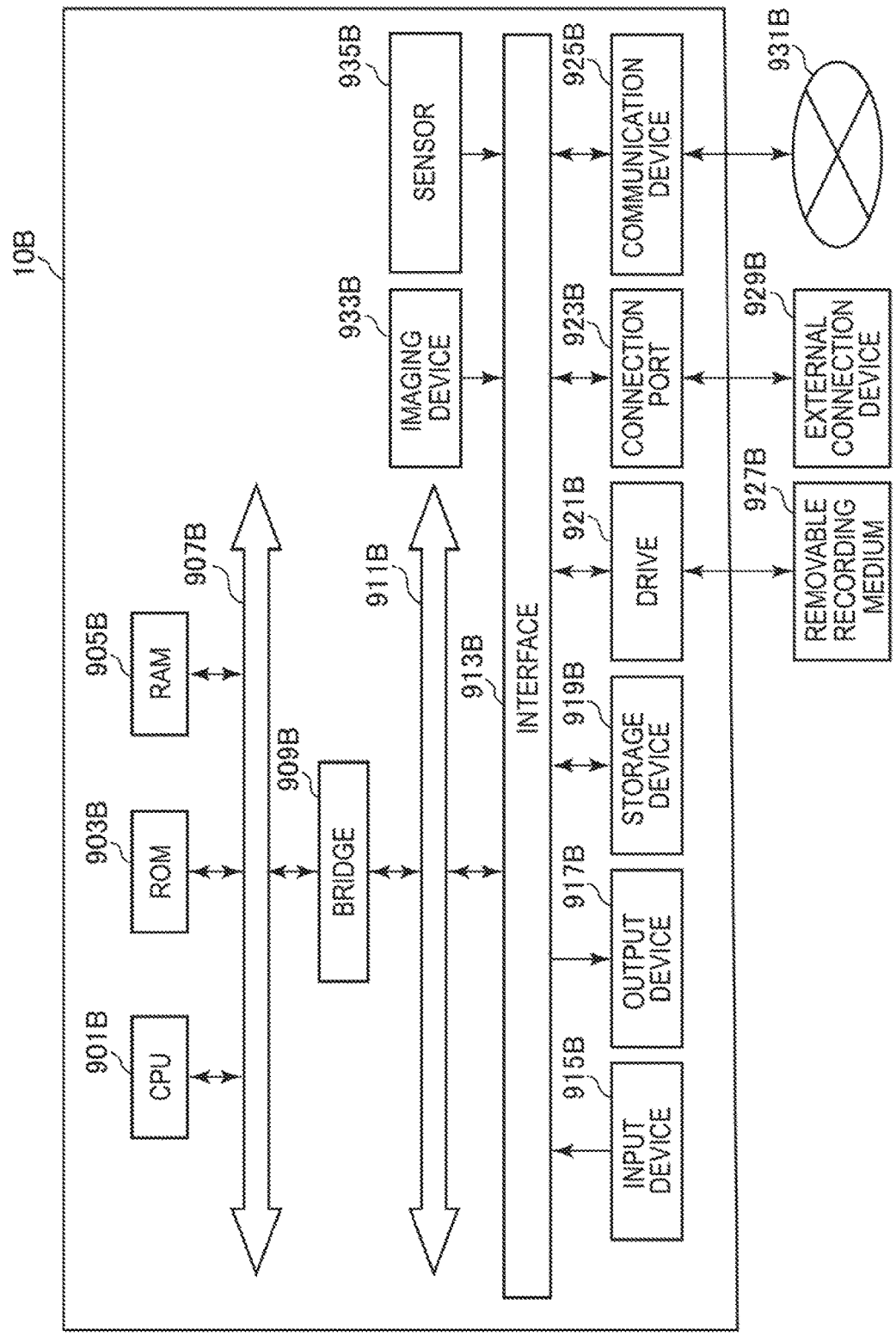
FIG. 51 is a block diagram showing a hardware configuration example of the information processing system.

Next, the hardware configuration of the information processing system 10B according to an embodiment of the present disclosure is described with reference to FIG. 51. FIG. 51 is a block diagram illustrating a hardware configuration example of the information processing system 10B according to an embodiment of the present disclosure.

As illustrated in FIG. 51, the information processing system 10B includes a central processing unit (CPU) 901B, a read only memory (ROM) 903B, and a random access memory (RAM) 905B. In addition, the information processing system 10B may include a host bus 907B, a bridge 909B, an external bus 911B, an interface 913B, an input device 915B, an output device 917B, a storage device 919B, a drive 921B, a connection port 923B, and a communication device 925B. The information processing system 10B may further include an image capturing device 933B and a sensor 935B as necessary. In conjunction with, or in place of, the CPU 901B, the information processing system 10B may have a processing circuit called a digital signal processor (DSP) or application specific integrated circuit (ASIC).

The CPU 901B functions as an arithmetic processing unit and a control device, and controls the overall operation in the information processing system 10B or a part thereof in accordance with various programs recorded in the ROM 903B, the RAM 905B, the storage device 919B, or the removable recording medium 927B. The ROM 903B stores, for example, programs and operation parameters used by the CPU 901. The RAM 905B temporarily stores, for example, programs to be used in the execution by the CPU 901B and parameters that change as appropriate in executing the programs. The CPU 901B, the ROM 903B, and the RAM 905B are connected with each other via a host bus 907B that is composed of an internal bus such as a CPU bus. Furthermore, the host bus 907B is connected to an external bus 911B such as peripheral component interconnect (PCI)/ interface bus via a bridge 909B.

The input device 915B is, for example, a device operated by a user, such as a mouse, a keyboard, a touch panel, a button, a switch, and a lever. The input device 915B may include a microphone for detecting user's voice. The input device 915B may be, for example, a remote control device using infrared rays or other radio waves, or may be an external connection device 929B such as a cellular phone conforming to the operation of the information processing system 10B. The input device 915B includes an input control circuit that generates an input signal on the basis of the information input by the user and outputs it to the CPU 901B. The user inputs various data to the information processing system 10B and instructs the information processing system 10B to perform a processing operation by operating the input device 915B. In addition, the image capturing device 933B, which will be described later, can also function as an input device by capturing the movement of the user's hand or finger, and the like. In this case, the pointing position may be determined depending on the motion of the hand or the orientation of the finger.

The output device 917B is composed of a device capable of notifying visually or audibly the user of the acquired information. The output device 917B may be a display device such as a liquid crystal display (LCD), a plasma display panel (PDP), an organic electro-luminescence (EL) display, and a projector, a hologram display device, an audio output device such as a speaker and a headphone, as well as printer devices or the like. The output device 917B outputs the result obtained by the processing of the information processing system 10B as a video such as a text or an image, or outputs it as audio such as a voice or sound. In addition, the output device 917B may include, for example, a light for lighting up the surroundings.

The storage device 919B is a data storage device configured as an example of a storage portion of the information processing system 10B. The storage device 919B is composed of, for example, a magnetic storage device such as hard disk drives (HDDs), a semiconductor storage device, an optical storage device, and a magneto-optical storage device. The storage device 919B stores programs executed by the CPU 901B, various data, various types of data obtained from the outside, and the like.

The drive 921B is a reader-writer for a removable recording medium 927B such as a magnetic disk, an optical disk, a magneto-optical disk, and a semiconductor memory, and is incorporated in the information processing system 10B or externally attached thereto. The drive 921B reads the information recorded in the attached removable recording medium 927B and outputs it to the RAM 905B. In addition, the drive 921B writes in the attached removable recording medium 927B.

The connection port 923B is a port for directly connecting the device to the information processing system 10B. The connection port 923B may be, for example, a universal serial bus (USB) port, an IEEE 1394 port, or a small computer system interface (SCSI) port. In addition, the connection port 923B may be, for example, an RS-232C port, an optical audio terminal, or high-definition multimedia interface (HDMI, registered trademark) port. The external connection device 929B is connected to the connection port 923B, and thus various kinds of data can be exchanged between the information processing system 10B and the external connection device 929B.

The communication device 925B is, for example, a communication interface composed of a communication device or the like, which is used to be connected to the communication network 931B. The communication device 925B may be, for example, a communication card for wired or wireless local area network (LAN), Bluetooth (registered trademark), or wireless USB (WUSB). In addition, the communication device 925B may be, for example, a router for optical communication, a router for asymmetric digital subscriber line (ADSL), or a modem for various communications. The communication device 925B transmits and receives signals or the like using a predetermined protocol such as TCP/IP, for example, with the Internet or other communication devices. In addition, the communication network 931B connected to the communication device 925B is a network connected by wire or wireless, and is, for example, the Internet, home LAN, infrared communication, radio wave communication, satellite communication, or the like.

The image capturing device 933B captures a real space and generates a captured image, by using an image sensor such as charge-coupled device (CCD) or complementary-metal-oxide semiconductor (CMOS) and various members such as a lens for controlling imaging of a subject image on the image sensor. The image capturing device 933B may capture a still image or a moving image.

The sensor 935B is, for example, various sensors such as an accelerometer, a gyro sensor, a geomagnetic sensor, a photosensor, and a sound sensor. The sensor 935B acquires information on the state of the information processing system 10B itself, such as the attitude of the casing of the information processing system 10B, and information on the surrounding environment of the information processing system 10B such as brightness or noise around the information processing system 10B. The sensor 935B may also include a GPS sensor, which receives global positioning system (GPS) signals and measures the latitude, longitude, and altitude of the device.

The above description is given as to the example of the hardware configuration of the information processing system 10B. Each of the components described above may be configured using a general-purpose member, or may be configured with hardware dedicated to the function of each component. Such a configuration can be changed appropriately depending on the technical level at the time of implementation.

5. CONCLUSION

According to the embodiment of the present disclosure, the information processing device 140B that includes the output controller 146B that causes the output portion 130B to output the start condition for starting the predetermined operation to be executed by the speech recognition portion 145B on the basis of the recognition result of the speech recognition processing performed by the speech recognition portion 145B on the sound information collected by the sound collecting portion 120B is provided as described above. With such a configuration, it is possible to allow the user to easily recognize the timing at which the operation to be executed is started.

With such a configuration, it is possible to reduce the possibility that the user utters during the operation to be executed. With such a configuration, it is possible to allow the user to recognize the timing at which the utterance becomes effective and thereby it is expected that it will become easier to input speech of a plurality of sentences. With such a configuration, it is possible to allow the user to utter while paying attention to the timing at which the operation to be executed is performed.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

The above description is given as to the modified example of the display form of the output portion 130B, but the display form of the output portion 130B is not limited to the above example. The output portion 130B may be, for example, a display provided in a wearable terminal (e.g., a watch or glasses) other than the head mounted display. In addition, the output portion 130B may be, for example, a display provided in an in-vehicle navigation system. In addition, the output portion 130B may be, for example, a display used in the healthcare field.

Furthermore, it is possible to create a program for causing the hardware such as CPU, ROM and RAM incorporated in the computer to execute functions equivalent to those of the information processing system 10B as described above. In addition, a computer-readable recording medium on which the program is recorded can also be provided.

Furthermore, the output controller 146B generates display control information for displaying the display content on the output portion 130B and outputs the generated display control information to the output portion 130B, and thus can control the output portion 130B so that the output portion 130B displays the display content. The contents of the display control information may be changed appropriately in accordance with the system configuration.

Specifically, the program used to implement the information processing device 140B may be, for example, a web application. In such a case, the display control information may be created using markup languages such as hypertext markup language (HTML), standard generalized markup language (SGML), and extensible markup language (XML).

The position of each component is not limited to a particular position as long as the operation of the information processing system 10B described above is performed. In one specific example, the image input portion 110B, the operation input portion 115B, and the sound collecting portion 120B, the output portion 130B, and the information processing device 140B may be provided in different devices connected via a network. In this case, the information processing device 140B corresponds to, for example, a server such as a web server or a cloud server, and the image input portion 110B, the operation input portion 115B, and the sound collecting portion 120B and the output portion 130B may correspond to a client connected to the server via a network.

All the components included in the information processing device 140B may not be accommodated in the same device. For example, a part of the input image acquisition portion 141B, the collected sound information acquisition portion 142B, the operation detection portion 143B, the recognition controller 144B, the speech recognition portion 145B, and the output controller 146B may be present in a device that is different from the information processing device 140B. For example, the speech recognition portion 145B may be present in a server that is different from the information processing device 140B that includes the input image acquisition portion 141B, the collected sound information acquisition portion 142B, the operation detection portion 143B, the recognition controller 144B, and the output controller 146B.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1) An information processing device including:

an output controller that causes an output portion to output a start condition for starting a predetermined operation to be executed by a speech recognition portion on the basis of a recognition result of speech recognition processing performed by the speech recognition portion on collected sound information collected by a sound collecting portion.

(2) The information processing device according to (1), further including:

a recognition controller that causes the speech recognition portion to perform the speech recognition processing.

(3) The information processing device according to (2), in which the recognition controller causes the speech recognition portion to start the operation to be executed in a case where the start condition is satisfied.

(4) The information processing device according to (2) or (3), in which the recognition controller causes the speech recognition portion to start the operation to be executed in a case where duration time in which volume of the collected sound information is continuously below reference volume after the speech recognition processing is started reaches predetermined target time.

(5) The information processing device according to (4), in which the start condition includes information related to remaining time until the duration time reaches the target time.

(6) The information processing device according to (5), in which the information related to the remaining time includes at least one of a predetermined display object indicating a rate of the remaining time with respect to the target time and the remaining time itself.

(7) The information processing device according to (2) or (3), in which the output controller stops the output of the start condition from the output portion in a case where duration time in which volume of collected sound information is continuously below reference volume after the speech recognition processing is started reaches a predetermined target time.

(8) The information processing device according to any one of (4) to (7), in which the output controller causes the output portion to output the start of the duration time in a case where the volume of the collected sound information is below the reference volume after the speech recognition processing is started.

(9) The information processing device according to any one of (4) to (8), in which the output controller updates the start condition output from the output portion in a case where newly collected sound information with volume exceeding the reference volume is not collected before the duration time reaches the target time.

(10) The information processing device according to any one of (4) to (8), in which the output controller updates the start condition output from the output portion in a case where newly collected sound information with likelihood of speech exceeding predetermined likelihood of speech is not collected before the duration time reaches the target time.

(11) The information processing device according to any one of (4) to (8), in which the output controller stops the output of the start condition from the output portion in a case where newly collected sound information with volume exceeding the reference volume is collected before the duration time reaches the target time.

(12) The information processing device according to any one of (4) to (8), in which the output controller stops the output of the start condition from the output portion in a case where newly collected sound information with likelihood of speech exceeding predetermined likelihood of speech is collected before the duration time reaches the target time.

(13) The information processing device according to any one of (4) to (12), in which the output controller does not cause the output portion to output the start condition in a case where the target time is shorter than predetermined reference time.

(14) The information processing device according to (5) or (6), in which the output controller controls a length of the remaining time in accordance with an amount of the recognition result.

(15) The information processing device according to any one of (2) to (14), in which the recognition controller causes the speech recognition processing to be performed on the sound information in a case where likelihood of the collected sound information exceeds a threshold value.

(16) The information processing device according to any one of (1) to (15), in which the output controller causes the output portion to output at least one of predetermined display information and predetermined speech information as the start condition.

(17) The information processing device according to any one of (1) to (16), in which the operation to be executed includes at least one of an operation of outputting a search result in accordance with a character string which is the recognition result, an operation of outputting the character string which is the recognition result, an operation of outputting recognition result candidates obtained in a recognition process of the recognition result, and an operation of outputting a character string for responding to the content of utterance extracted from the character string which is the recognition result.

(18) The information processing device according to any one of (1) to (3), in which the start condition includes information related to a user operation required for starting the operation to be executed.

(19) An information processing method including:

causing, by a processor, an output portion to output a start condition for starting a predetermined operation to be executed by a speech recognition portion on the basis of a recognition result of speech recognition processing performed by the speech recognition portion on collected sound information collected by a sound collecting portion.

(20) A program for causing a computer to function as an information processing device including:

an output controller that causes an output portion to output a start condition for starting a predetermined operation to be executed by a speech recognition portion on the basis of a recognition result of speech recognition processing performed by the speech recognition portion on collected sound information collected by a sound collecting portion.

REFERENCE SIGNS LIST 10A information processing system
110A image input portion
115A operation input portion
120A sound collecting portion
130A output portion
140A information processing device (controller)
141A input image acquisition portion
142A collected sound information acquisition portion
143A operation detection portion
144A recognition controller
145A speech recognition portion
146A output controller
10B information processing system
110B image input portion
115B operation input portion
120B sound collecting portion
130B output portion
140B information processing device (controller)
141B input image acquisition portion
142B sound information acquisition portion
143B operation detection portion
144B recognition controller
145B speech recognition portion
146B output controller
G10B initial screen
G11B recognized character string display section
G12B all-deletion operation object
G13B decision operation object
G15B forward moving operation object
G16B backward moving operation object
G17B deletion operation object

The invention claimed is:

1. An information processing system, comprising:
an output circuitry;
a sound collecting circuitry; and
a controller configured to:
    detect a start condition for a first speech recognition process;
    acquire first sound information from the sound collecting circuitry based on the detected start condition;
    change the start condition for the first speech recognition process based on specific information in the acquired first sound information, wherein the changed start condition corresponds to first information indicative of a start of the first speech recognition process;
control the output circuitry to output the first information for execution of the first speech recognition process on the acquired first sound information;
control the output circuitry to output second information, wherein
the second information is output based on a detection of an activation trigger of the first speech recognition process,
the second information corresponds to the detected start condition, and
the start condition is changed after the detection of the activation trigger;
acquire second sound information before the start of the first speech recognition process and after the detection of the activation trigger; and
change the start condition based on the acquired second sound information.

2. The information processing system according to claim 1, wherein
the controller is further configured to start the first speech recognition process based on the changed start condition is satisfied.

3. The information processing system according to claim 1, wherein
the controller is further configured to stop the output of the first information based on one of the changed start condition is satisfied or a detection of a stop operation of the changed start condition.

4. The information processing system according to claim 1, wherein
the acquired first sound information includes first type sound information, and
the controller is further configured to change the start condition based on the first type sound information.

5. The information processing system according to claim 4, wherein
the controller is further configured to start the first speech recognition process based on
user operation information, and
a volume of the first type sound information exceeds a first threshold value.

6. The information processing system according to claim 5, wherein
the controller is further configured to start the first speech recognition process after a time period based on the volume of the first type sound information is below the first threshold value.

7. The information processing system according to claim 5, wherein
the controller is further configured to control the output circuitry to omit the output of the first information,
the output of the first information is omitted based on the volume of the first type sound information that is below a second threshold value, and
the second threshold value is less than the first threshold value.

8. The information processing system according to claim 4, wherein
the first type sound information includes at least noise.

9. The information processing system according to claim 1, wherein
the second sound information includes second type sound information, and the controller is further configured to change the start condition based on the second type sound information.

10. The information processing system according to claim 9, wherein
the controller is further configured to:
set a first time period; and
start the first speech recognition process after the first time period, wherein
the first time period is longer than a second time period based on a volume of the second type sound information exceeds a threshold value, and
the second time period is associated with a second speech recognition process.

11. The information processing system according to claim 10, wherein
the controller is further configured to:
set a third time period; and
start the first speech recognition process after the third time period, wherein
the third time period is shorter than a fourth time period based on the volume of the second type sound information is below the threshold value, and
the fourth time period is associated with the second speech recognition process.

12. The information processing system according to claim 9, wherein
the second type sound information includes at least noise.

13. The information processing system according to claim 1, wherein
the controller is further configured to change the start condition based on a number of arrival directions of the acquired first sound information.

14. The information processing system according to claim 1, wherein
the controller is further configured to control the output circuitry to output at least one of display information or speech information as the first information.

15. The information processing system according to claim 1, wherein
the controller is further configured to:
start the first speech recognition process before the changed start condition is satisfied, wherein
the first speech recognition process is started based on the acquired first sound information; and
exclude a filler from a result of the first speech recognition process after the changed start condition is satisfied.

16. An information processing method, comprising:
detecting a start condition for a speech recognition process;
acquiring first sound information from a sound collecting circuitry based on the detected start condition;
changing the start condition for the speech recognition process based on specific information in the acquired first sound information, wherein
the changed start condition corresponds to first information indicative of a start of the speech recognition process;
controlling an output circuitry to output the first information for execution of the speech recognition process on the acquired first sound information;
controlling the output circuitry to output second information, wherein
the second information is output based on a detection of an activation trigger of the speech recognition process, the second information corresponds to the detected start condition, and the start condition is changed after the detection of the activation trigger;

acquiring second sound information before the start of the speech recognition process and after the detection of the activation trigger; and changing the start condition based on the acquired second sound information.

* * * * *